United States Patent
Yaginuma et al.

(10) Patent No.: US 6,477,538 B2
(45) Date of Patent: Nov. 5, 2002

(54) DATA DISPLAY APPARATUS AND METHOD FOR DISPLAYING DATA MINING RESULTS AS MULTI-DIMENSIONAL DATA

(75) Inventors: Yoshinori Yaginuma; Tatsuya Shindo; Junichi Hagiwara; Katsuhiko Taguchi; Kazuhiro Matsumoto, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/922,773

(22) Filed: Aug. 7, 2001

(65) Prior Publication Data

US 2001/0055018 A1 Dec. 27, 2001

Related U.S. Application Data

(63) Continuation of application No. 08/986,031, filed on Dec. 5, 1997, now abandoned.

(30) Foreign Application Priority Data

Jun. 19, 1997 (JP) .............................................. 9-163049

(51) Int. Cl.[7] .............................................. G06F 17/30
(52) U.S. Cl. ........................ 707/102; 707/5; 707/526; 345/334; 345/356
(58) Field of Search .......................... 707/5, 102, 526; 709/203, 219; 345/334, 356, 359

(56) References Cited

U.S. PATENT DOCUMENTS

| | | | |
|---|---|---|---|
| 5,546,516 A | 8/1996 | Austel et al. .................. 395/140 |
| 5,884,016 A | 3/1999 | Allen et al. .................. 345/419 |
| 5,929,863 A * | 7/1999 | Tabei et al. .................. 345/440 |
| 5,937,408 A | 8/1999 | Shoup et al. ................. 707/102 |
| 5,970,464 A | 10/1999 | Apte et al. ....................... 704/4 |
| 5,970,482 A * | 10/1999 | Pham et al. ................... 706/16 |
| 5,970,493 A * | 10/1999 | Shoup et al. ................ 707/100 |
| 6,073,115 A | 6/2000 | Marshall ........................ 705/35 |
| 6,112,194 A | 8/2000 | Bigus .......................... 706/11 |
| 6,326,962 B1 * | 12/2001 | Szabo ......................... 345/348 |

FOREIGN PATENT DOCUMENTS

JP 7-334656 12/1995

OTHER PUBLICATIONS

Rakesh Agrawal, et al., "Fast Algorithms for Mining Association Rules", Proceedings of the 20th VLDB Conference, Santiago, Chile, 1994.
Craig Stanfill, et al., "Toward Memory–Based Reasoning", Communication of the ACM, vol. 29, No. 12, 1986.
Alfred Inselberg, et al, "Parallel Coordinates A Tool for Visualizing Multi–Dimensional Geometry", CH2913–2/90 IEEE.
U.S. patent application Ser. No. 08/986,031, Yaginuma et al., filed Dec. 5, 1997.

* cited by examiner

Primary Examiner—Jean R. Homere
(74) Attorney, Agent, or Firm—Staas & Halsey LLP

(57) ABSTRACT

A data display apparatus and method for displaying the result of a data mining process as multi-dimensional data. In one embodiment, the multi-dimensional data is displayed on a parallel coordinate axis. An engine unit executes the data mining process on displayed multi-dimensional data according to an instruction from a visual data mining tool and transfers the result to the visual data mining tool. The user interface unit of the visual data mining tool generates an axis corresponding to the result of the data mining process, adds the axis to the parallel coordinate axis and displays the result of the data mining process on the added axis.

20 Claims, 53 Drawing Sheets

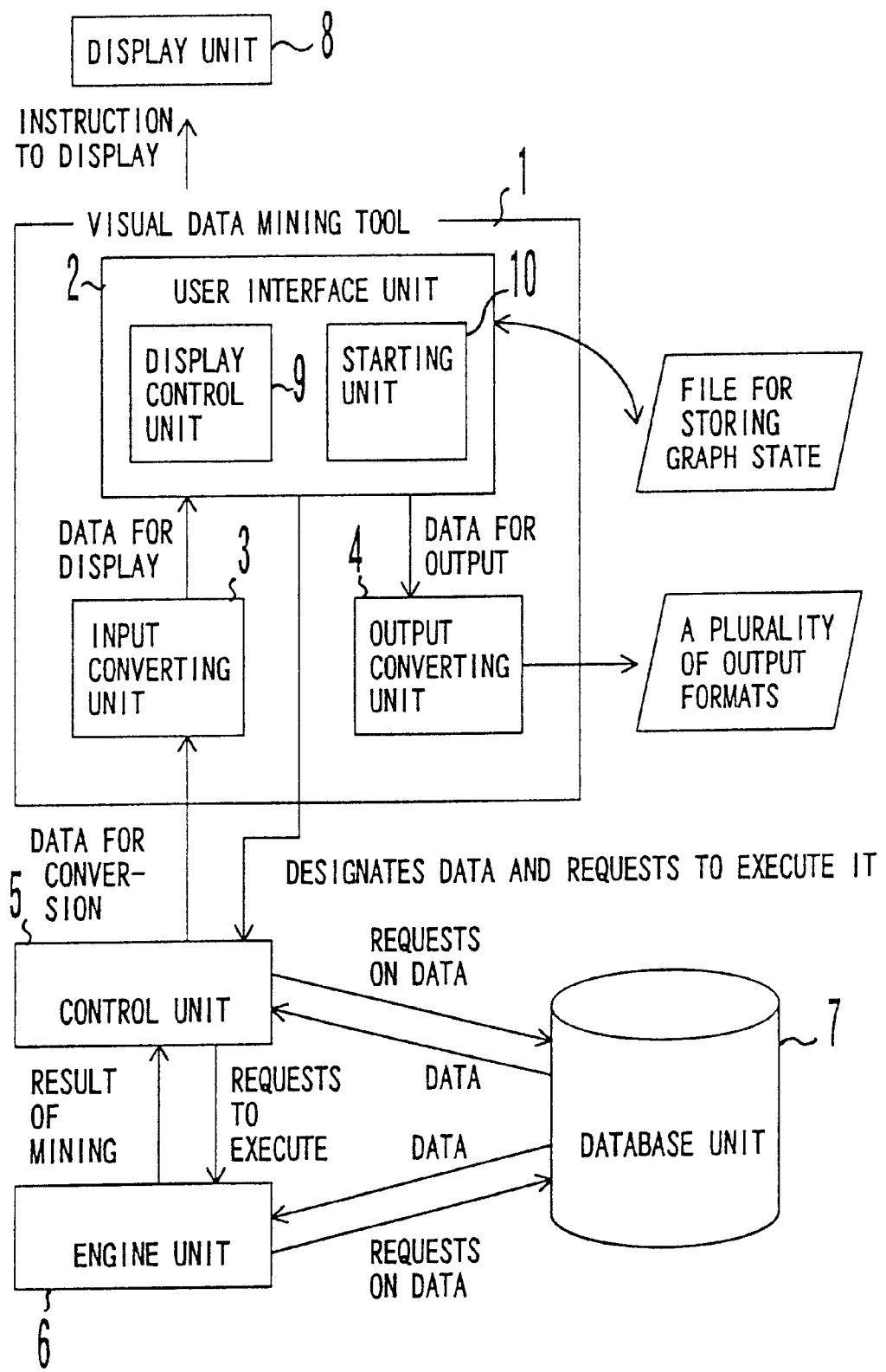
F I G. 1

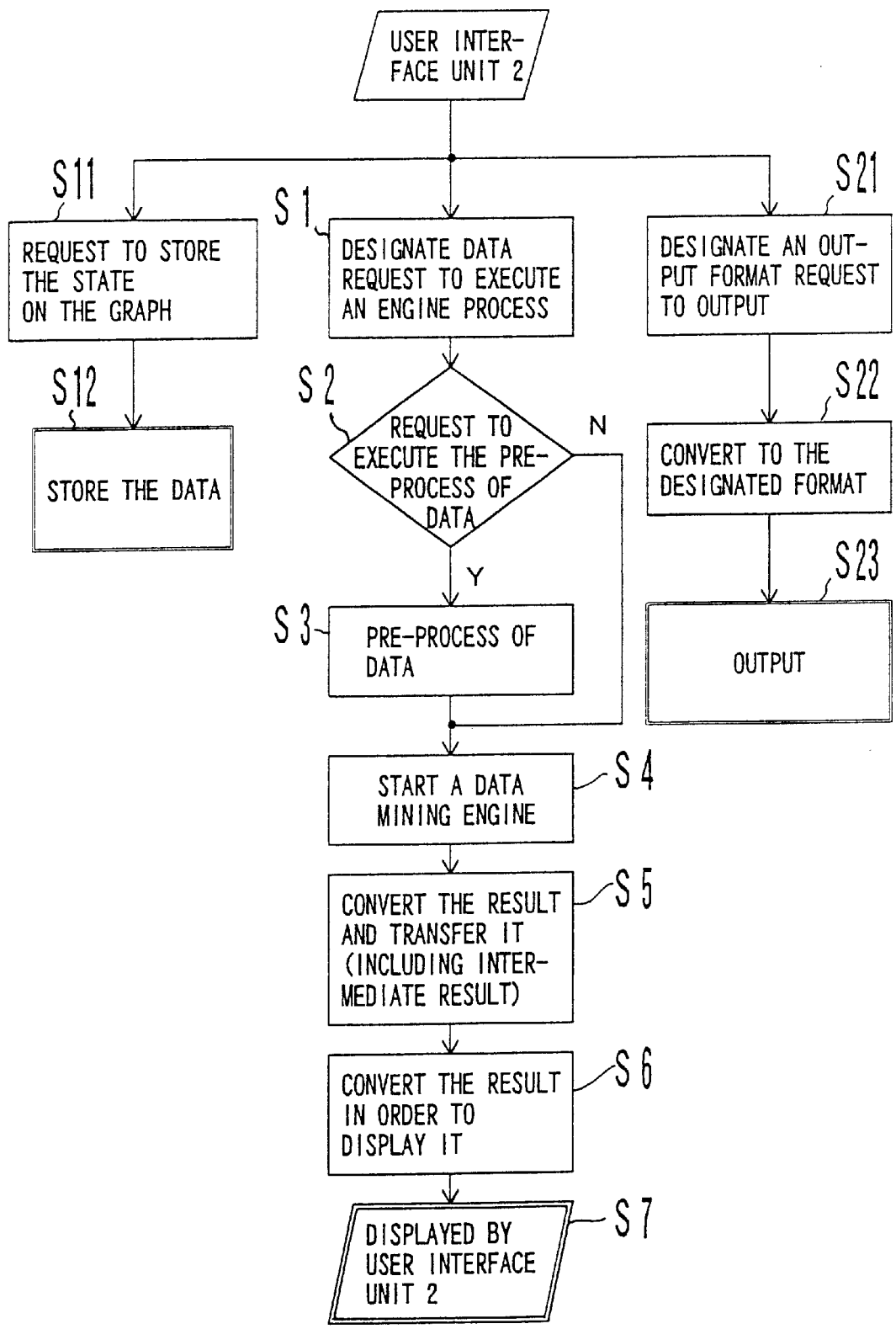
F I G. 4

FIG. 5

| | FUEL CON-SUMPTION | NUMBER OF CYLINDERS | HORSE POWER | WEIGHT | YEAR | COUNTRY |
|---|---|---|---|---|---|---|
| MODEL 1 | 11.5 | 4 | 120 | 980 | 1993 | JAPAN |
| MODEL 2 | 8.0 | 6 | 145 | 1250 | 1996 | JAPAN |
| MODEL 3 | 6.0 | 8 | 130 | 1600 | 1995 | U.S.A |
| ......... | | | | | | |

FIELD(ITEM)

RECORD

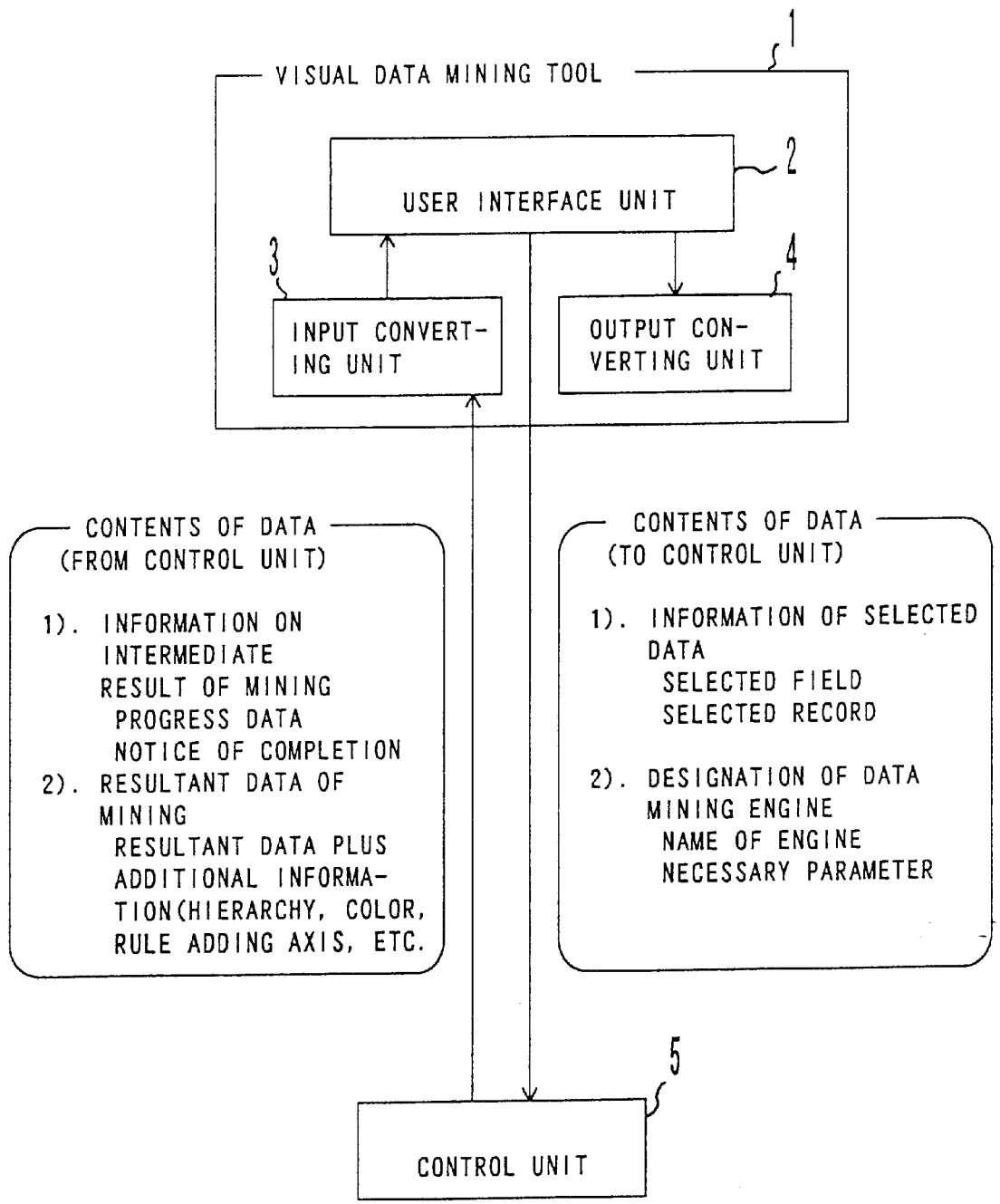
F I G. 9

MODEL 1, 11.5km/l, 980kg, 4 CYLINDERS, 120hp, JAPAN
MODEL 2, 8.0km/l, 1250kg, 6 CYLINDERS, 145hp, JAPAN
MODEL 3, 6.0km/l, 1600kg, 8 CYLINDERS, 130hp, USA
. . .

(SEE FIG. 6)

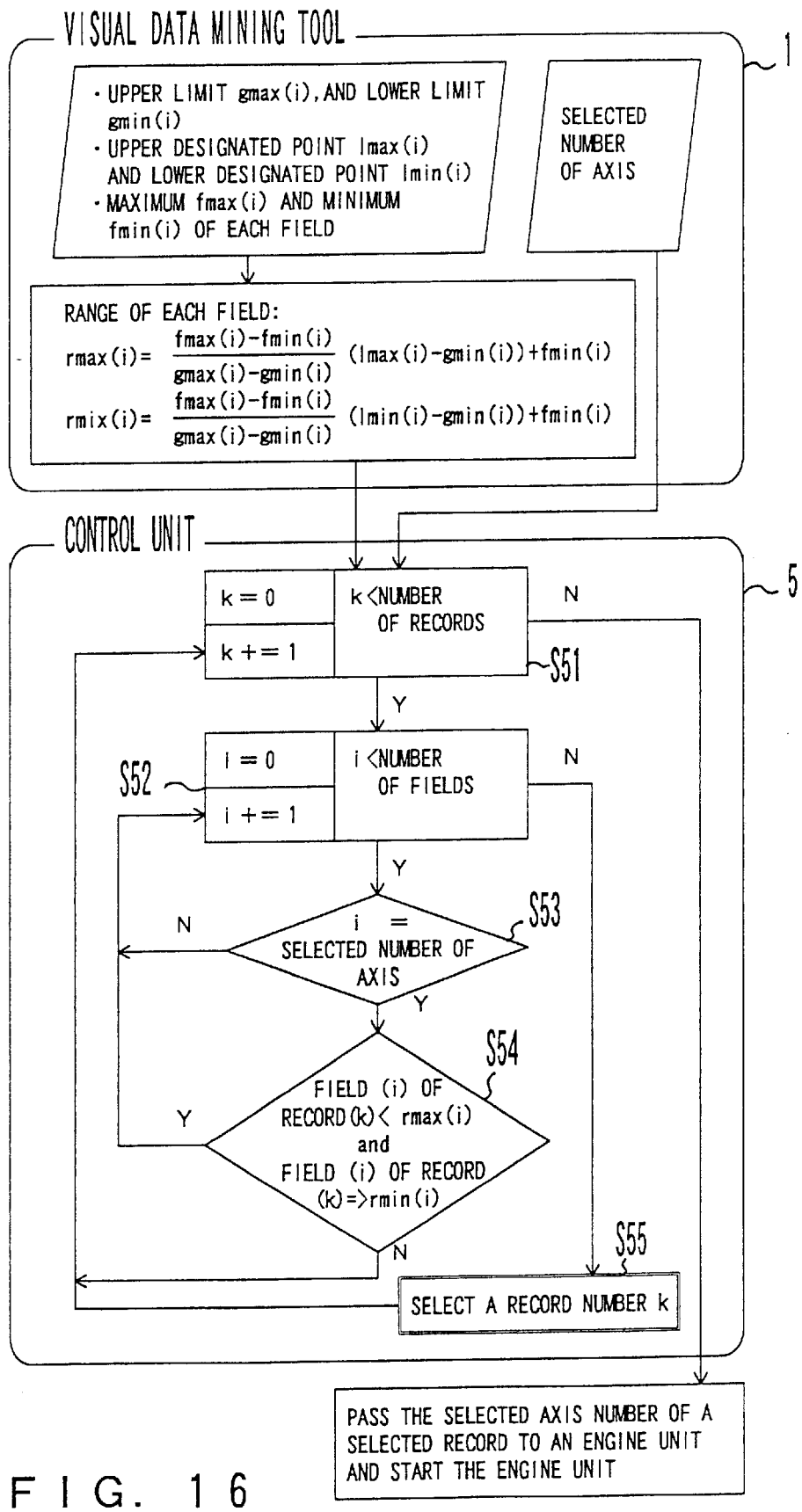
F I G. 1 6

FIG. 27

| CONDITION | | RESULT | SUPPORT | DEGREE OF CONFIDENCE |
|---|---|---|---|---|
| BREAD, BUTTER | → | MILK, JAM | 0.40 | 0.50 |
| BREAD, PAPER DIAPER | → | CANNED BEER | 0.20 | 0.60 |

↓ INTRODUCES A RULE NUMBER AND DEVELOPS THE ITEM

| CONDITION | | RESULT | SUPPORT | DEGREE OF CONFIDENCE | RULE NUMBER |
|---|---|---|---|---|---|
| BREAD | → | MILK | 0.40 | 0.50 | 1 |
| BREAD | → | JAM | 0.40 | 0.50 | 1 |
| BUTTER | → | MILK | 0.40 | 0.50 | 1 |
| BUTTER | → | JAM | 0.40 | 0.50 | 1 |
| BREAD | → | CANNED BEER | 0.20 | 0.60 | 2 |
| PAPER DIAPER | → | CANNED BEER | 0.20 | 0.60 | 2 |

ADDED FIELD

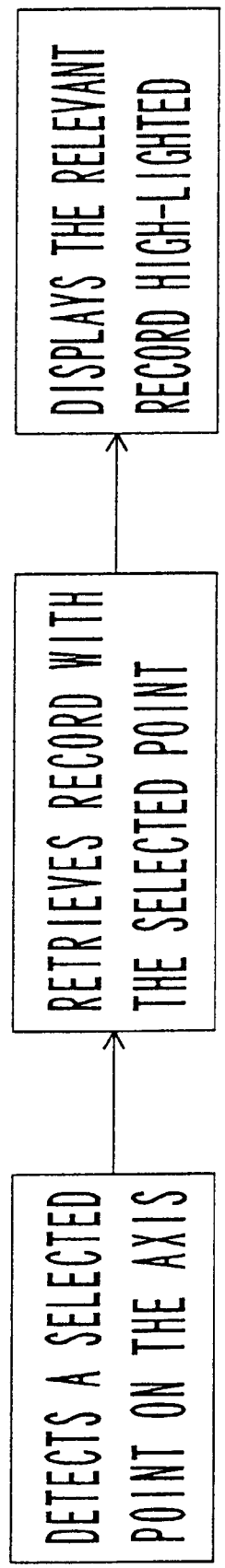
F I G. 30

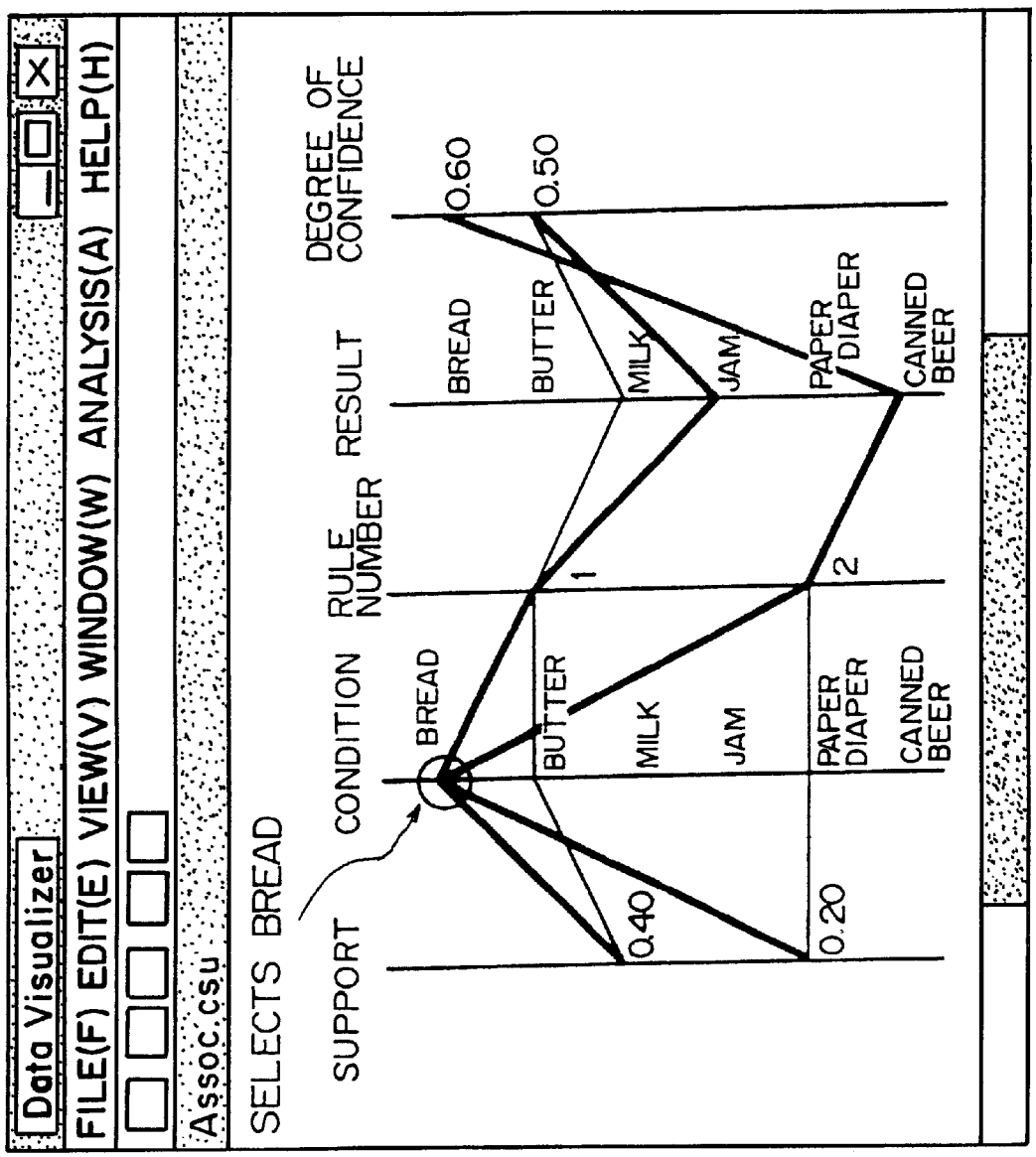
F I G. 32

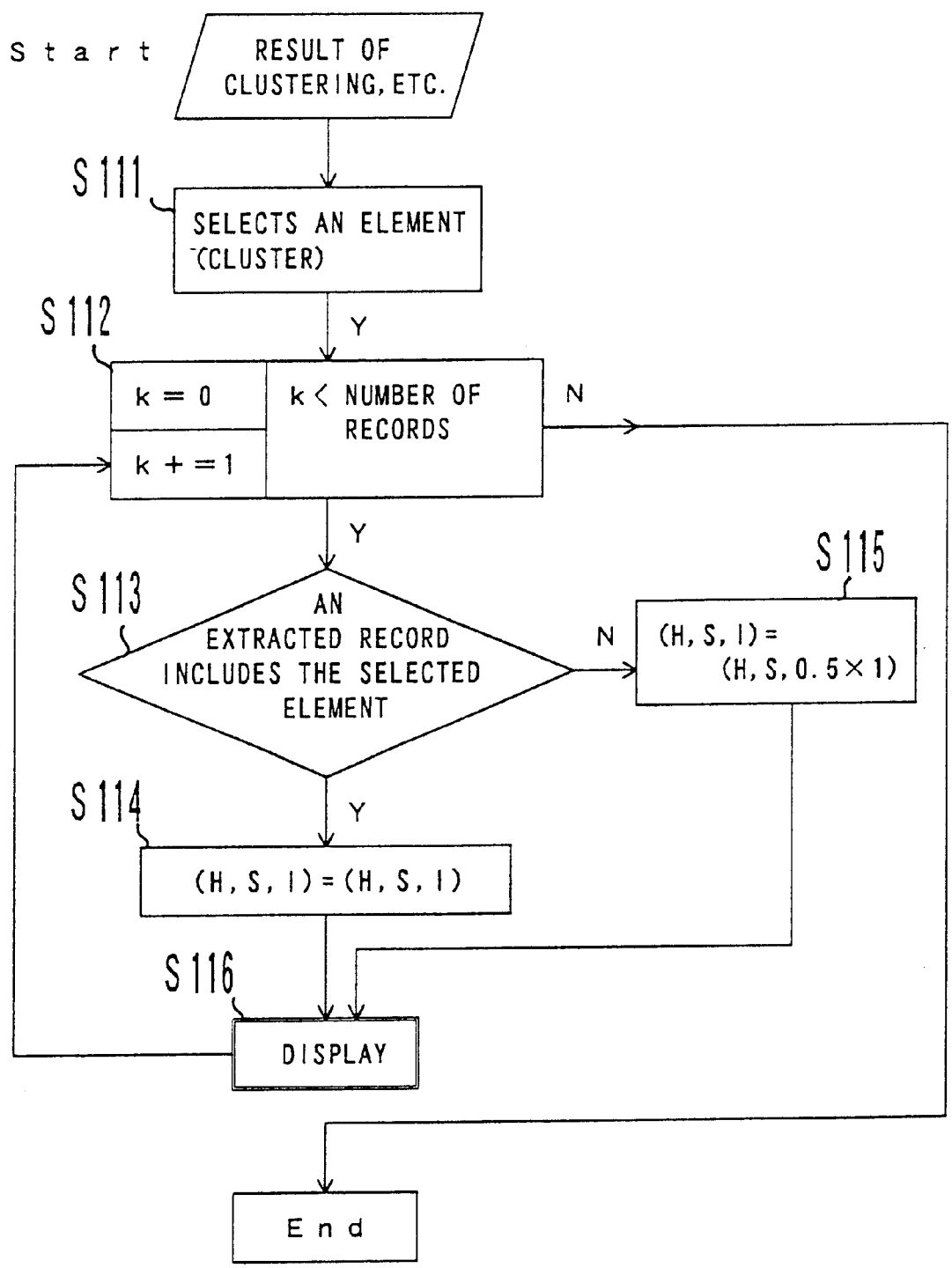
F I G. 3 8

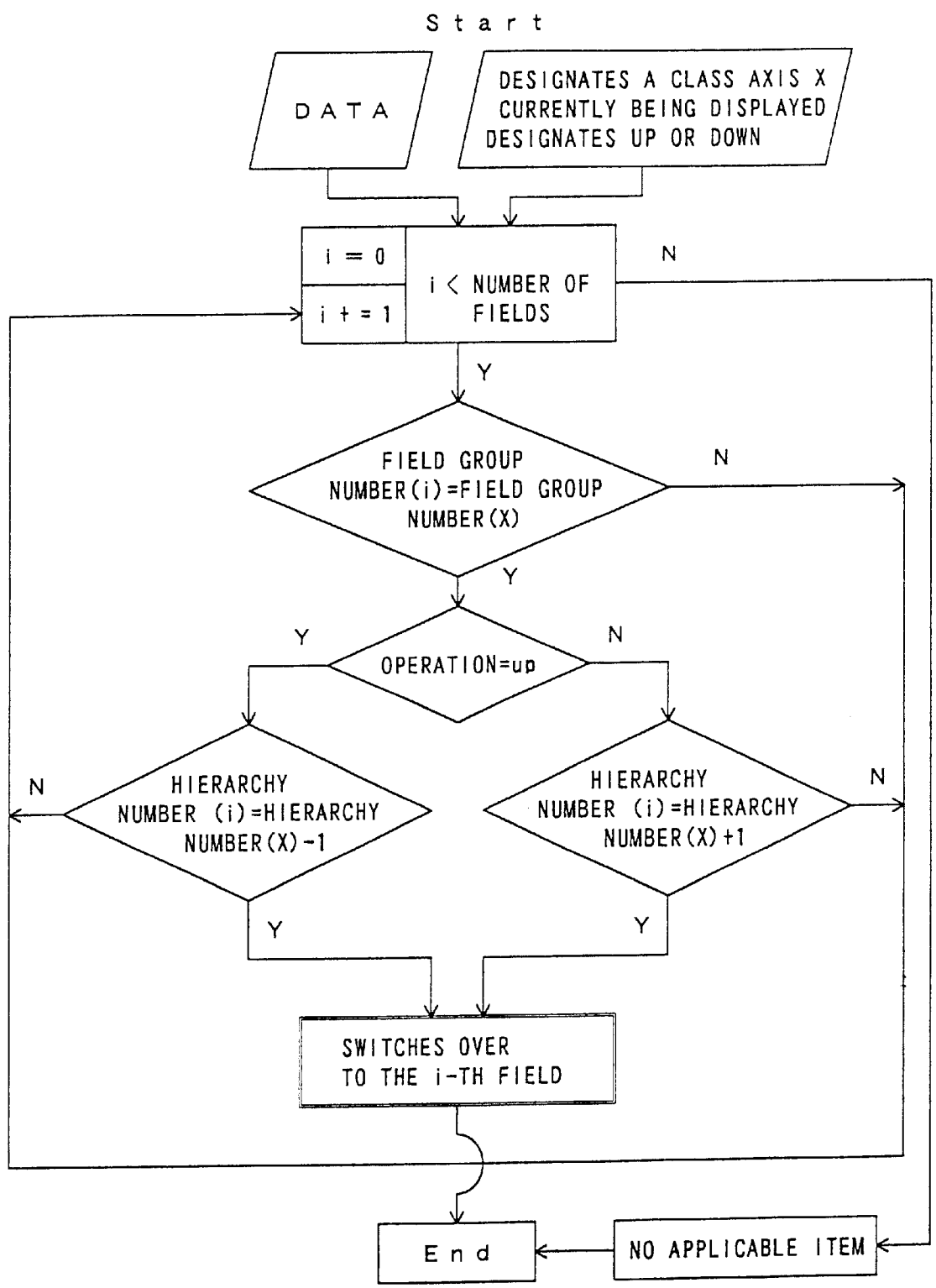
F I G. 4 1

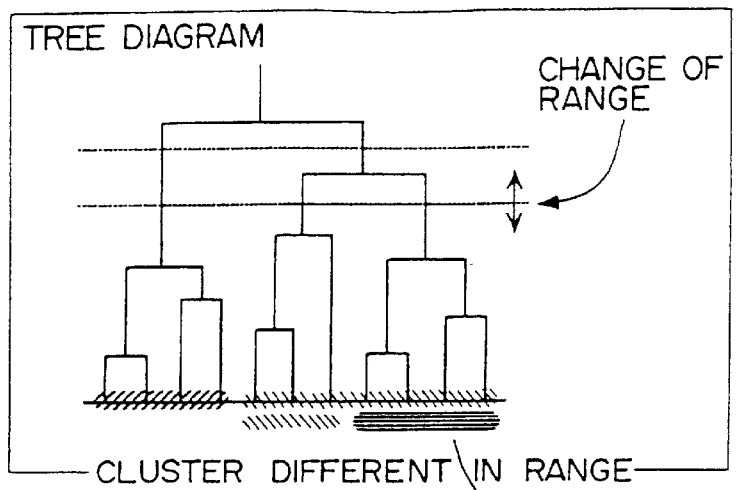
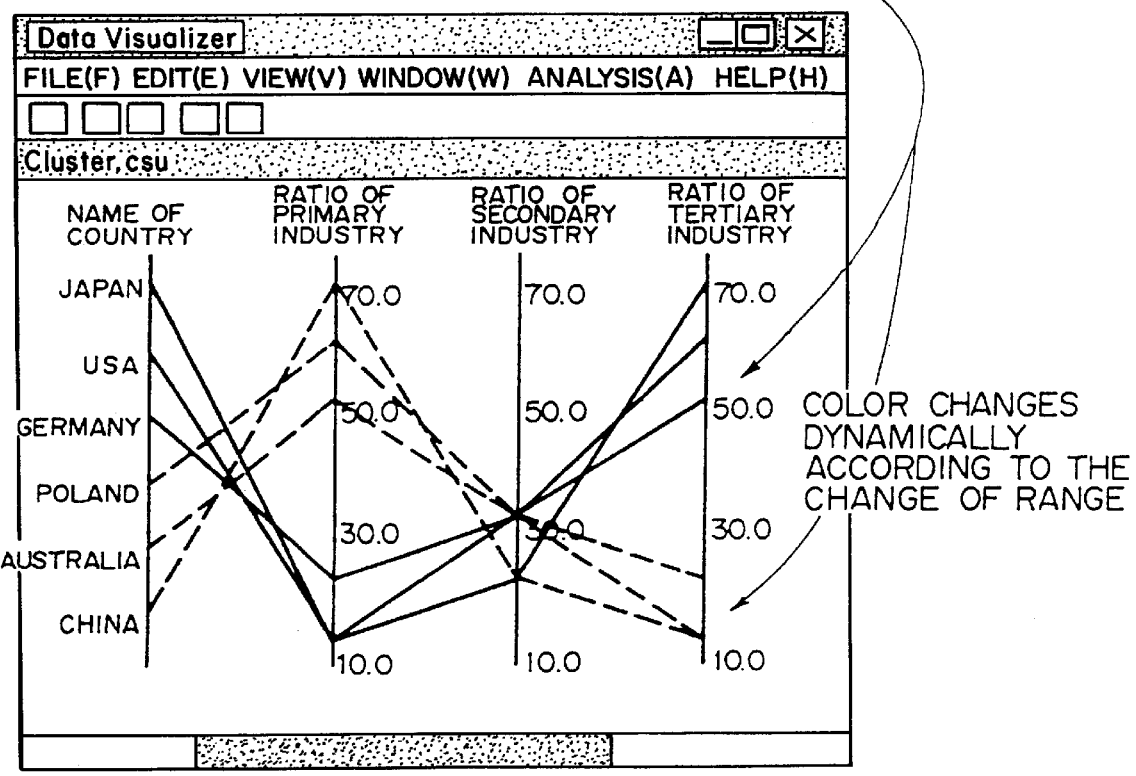
FIG. 42

DATA DISPLAY APPARATUS AND METHOD FOR DISPLAYING DATA MINING RESULTS AS MULTI-DIMENSIONAL DATA

This application is a continuation of application Ser. No. 08/986,031, filed Dec. 5, 1997, now abandoned.

BACKGROUND OF THE INVENTION

1. Field of the Invention

The present invention relates t o an apparatus and its method for displaying multi-dimensional data, and more particularly to a display tool provided with the function of a front-end for a data mining process.

2. Description of the Related Art

With the development of computers and the Internet, and the appearance of high-density and low-cost memory devices, a large volume of various kinds of information has become available and is able to be stored easily. For example, in the distribution industry, information on the relation. between the sales by retailers across the country and the time of the day is collected using a point of sale (POS) system. In the same way in the financial and insurance industries, information is collected on the used states of credit cards for each customer, and the individual data on each of the insured and used states of insurance, respectively.

Today the research and development of data mining technology has become popular as one kind of technology for extracting information useful to work out business strategies using a large volume of stored information. Data mining means a technology for deriving the rule, trend, pattern, regularity, correlation, etc. from a large volume of collected data, and it is often based on artificial intelligence (AI), neuro-technology, statistical technology, etc.

For the data mining process, for example, methods such as neuro-analysis, clustering, decision tree, memory based reasoning (MBR), and association rule generation are used. Software for realizing each of these analysis methods is often called a data mining engine. This software may be referred to as a "data mining engine" or simply an "engine" hereinafter.

However, since the most suitable analysis method differs depending on the purpose of information extraction and the nature of the information to be analyzed, an expected analysis result often cannot be obtained easily. In this case, a user has to continue working by trial and error until the expected analysis result is obtained.

To reduce the work load for obtaining an expected analysis result, it is considered desirable to display the results obtained by each kind of analysis method in a common format. However, in-the conventional data mining technology, a front-end display apparatus, including the software for display has been developed individually for each analyzing method. Although the front-end display apparatus produced for each analyzing method is superior in clearly displaying the results analyzed by that method, it often requires some expertise to understand each analyzing method, and it needs some experience to have a good command of a plurality of analyzing methods.

Conventionally, the result of a data mining process is often output in a table format, and the regularity of data, correlation between data, etc. are not necessarily displayed in an easy to understand manner.

Furthermore, a technology for connecting or unifying these analysis methods has not been provided yet. Namely, the sending and receiving methods of data between a user interface unit and a data mining engine, the starting method of the data mining engine, the displaying method of the result of the data mining process, etc. were different- for each data mining engine. For this reason, it was necessary for a user to use a different data mining tool according to the contents of the work. Therefore, the work load for obtaining an expected result was heavy, except for the case where the most suitable analysis method was known beforehand.

SUMMARY OF THE INVENTION

It is an object of the present invention to provide a data display apparatus and its method for displaying the result of a data mining process which is easy to understand. It is another object of the present invention to provide a data display apparatus and its method for handling a plurality of data mining engines uniformly without requiring any expertise of them.

The data display apparatus of the present invention is configured so as to display multi-dimensional data on a display apparatus in the predetermined format of a graph, and comprising the following units: a starting unit which receives an instruction to start a data mining engine in order to execute a data mining process, and starts the data mining engine according to the instruction; and a display controlling unit which receives the result obtained by the data mining engine, and displays the results on the display apparatus in the same format as the predetermined format of a graph.

Another form of a data display apparatus of the present invention comprises the following units: an input converting unit which receives the data mining analysis result on multi-dimensional data, and incorporates the analysis result into the multi-dimensional data to be displayed; and a display controlling unit which displays the analysis result on the display apparatus based on the output of the converting unit in the predetermined format of a graph.

For the data mining process, methods such as association rule generation, clustering, MBR, decision tree analysis, and neuro-analysis are used. The result obtained by this data mining process is displayed in the predetermined form of a graph. As a result, a user can obtain results by various kinds of analysis methods in a common graph.

BRIEF DESCRIPTION OF THE DRAWINGS

FIG. 1 is a diagram showing the theory of the present invention.

FIG. 4 is a flowchart of the entire processing of the data display tool.

FIG. 5 shows an example of the target data of a data mining process.

FIG. 9 is a diagram showing the contents of data sent and received between a visual data mining tool and a control unit.

FIG. 16 is a diagram explaining the process of extracting a record contained in a data range designated by a user.

FIG. 27 is a diagram explaining the converting process of displaying the result of an association rule generation as a graph.

FIG. 30 is a diagram explaining the flow of the process of displaying a record with a predetermined value high-lighted in a specific field.

FIG. 32 shows an example (No.1) of the high-lighted display.

FIG. 38 is a flowchart showing the process of displaying a record distinguished according to a selected element.

FIG. 41 is a flowchart showing the process of switching over between and displaying a plurality of clustering results.

FIG. 42 shows an example-of changing a graphic display in conjunction with a change of the set limit on a tree diagram.

DETAILED DESCRIPTION OF THE INVENTION

Figure 2:
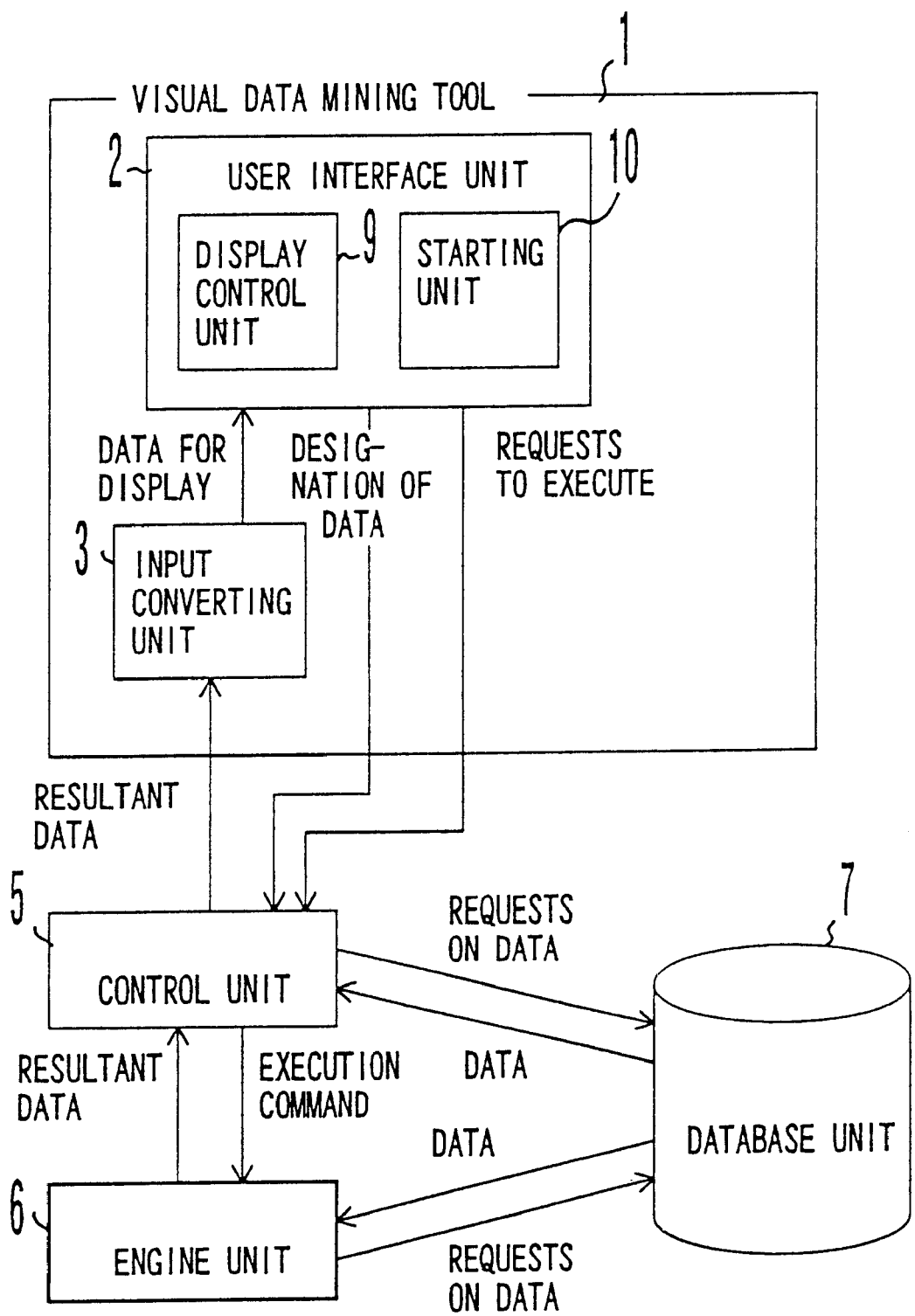
FIG. 2 is a block diagram showing the connections of the data mining engine.

The data display tool of the present invention is used in an apparatus for displaying multi-dimensional data as a graph, and displays the result of a data mining process in the same format as the graph. The result of the data mining process is displayed by adding it to the graph or by changing a part of the graph. Usually the data format of the data mining result differs depending on its analyzing method. The data display tool of the present invention provides a user with a common display absorbing the differences due to analyzing methods. The data display tool of the present invention transmits data selected from a displayed graph to the data mining engine, so as to have the data mining engine execute a data mining process on the selected data.

FIG. 1 is a diagram showing the theory of the present invention. A visual data mining tool (data mining visualizing tool) 1 comprises a user interface unit 2, an input converting unit 3 and an output converting unit 4.

The user interface unit 2 comprises a display control unit 9 and a starting unit 10. The display control unit 9 displays the multi-dimensional data extracted from a database 7 on a display unit 8 such as a display screen, etc. The starting unit 10 notifies an engine unit 6 of the target range of the data mining process according to the instructions from the user, and starts the engine unit 6 to execute the process. Furthermore, the user interface unit 2 outputs the instruction to convert the multi-dimensional data or the result of the data mining process displayed on the display unit 8 to the output converting unit 4 according to the user's instructions.

The input converting unit 3 converts the data received from a control unit 5 to the predetermined format, if necessary, and passes it to the user interface 2. The output converting unit 4 converts the data or the result of the data mining process displayed on the display unit 8 to data in the format designated by the user interface unit 2 and outputs it.

The control unit 5 extracts data from the database 7 according to the requirements set by the user interface unit 2, and transfers the extracted data to the user interface unit 2. The control unit 5 also starts the engine unit 6 according to the instructions from the user interface unit 2, and has the engine unit 6 execute the data mining process. It also converts the result of the data mining process to data in the format acceptable to the visual data mining tool 1, and outputs it. At this moment, the control unit 5 adds the predetermined information to the result of the data mining process, if necessary. Furthermore, the control unit 5 notifies the visual data mining tool 1 of the progress of the process in the engine unit 6.

The engine unit 6 executes the data mining process on the data designated by the control unit 5, and passes the result to the control unit 5. The engine unit 6 includes a plurality of data mining engines, and executes an analyzing process using a data mining engine designated by the user. For data mining engines, it is provided with an engine for association rule generation, an engine for a decision tree, an engine for clustering, an engine for MBR, an engine for neuro-analysis, etc.

Figure 3:
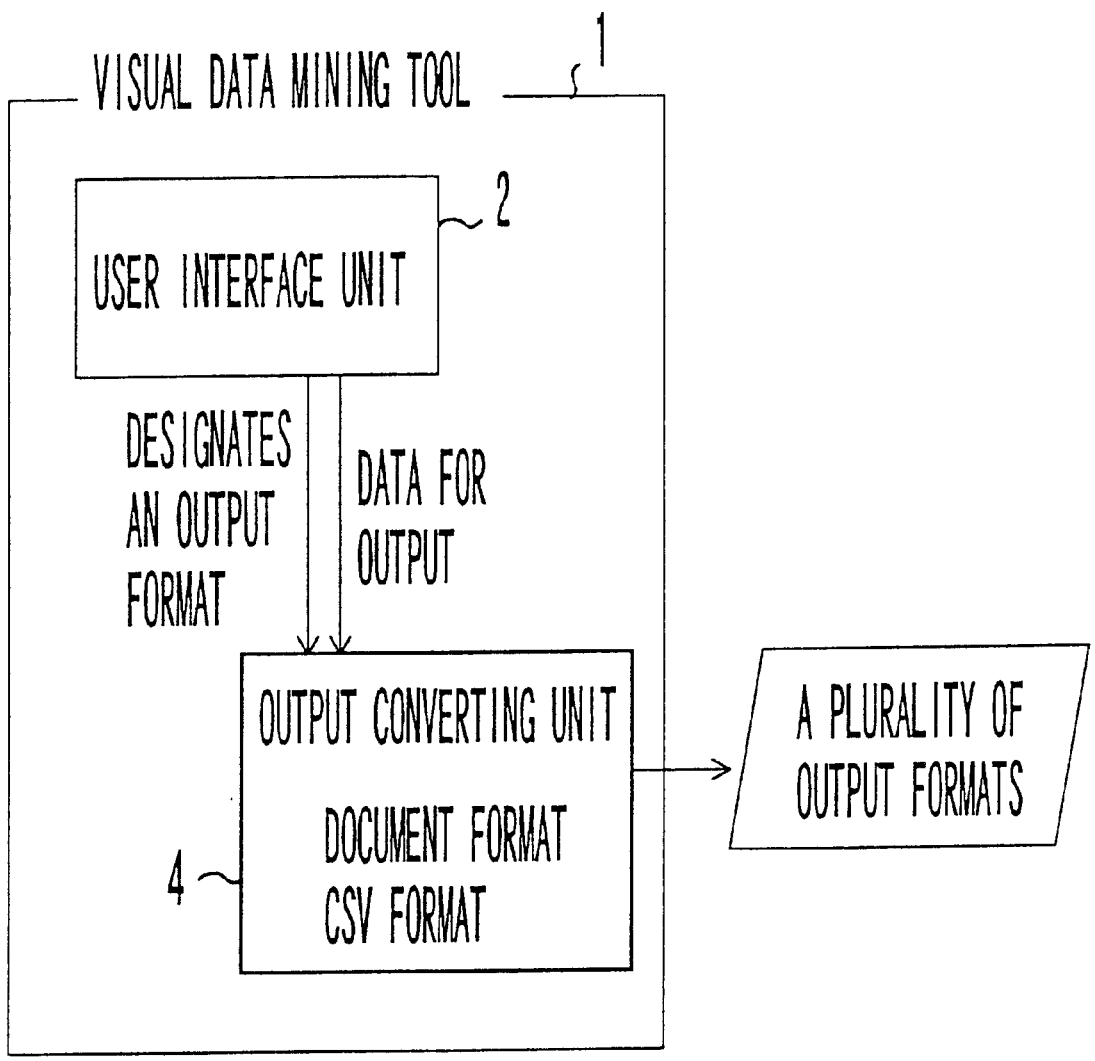
FIG. 3 is a block diagram showing the conversion of an output format.

The operation of the data display tool with the above configuration is briefly described below referring to FIGS. 2 to 4. FIG. 2 is a diagram explaining the joint operation between a visual data mining tool and a data mining engine. FIG. 3 is a drawing explaining the output converting operation. FIG. 4 is a flowchart of the entire processing of the data display tool.

When executing a data mining process, the user inputs the target data range (data designation) of the data mining process. As shown in FIG. 4, when the starting unit 10 of the user interface unit 2 detects the user's instructions, in step S1 it sends out an instruction on data designation and a request for the execution of the processing of an engine to the control unit 5.

Steps S2 and S3 are the processes of the control unit 5. When the control unit 5 receives the instruction on data designation and the request for the execution of the processing of an engine, it executes a pre-processing of the data, if necessary, and starts the engine unit 6. At this moment, the target data range of the data mining process is notified to the engine unit 6. The pre-processing of the data is described later.

In step S4, the engine unit 6 executes the data mining process and outputs the result. In step S5, the control unit 5 converts the result of the data mining process received from the engine unit 6 to data in the format acceptable to the visual data mining tool 1 and outputs it. At this moment, the control unit 5 reports in detail the progress of the process in the engine unit 6 to the visual data mining tool 1.

In step S6, the input converting unit 3 converts the display format of the result data received from the control unit 5 and passes it to the interface unit 2. Then, in step S7, the display control unit 9 of the interface unit 2 displays the result of the data mining as a graph on a display unit 8.

When a user wants to store a graph, etc. displayed on the display unit 8, in steps S11 and S12, the user interface unit 2 determines the state of the graph, etc. when it detects the user's request for storing it, and writes it to a memory or a hard disk, not shown in the drawing. The graph, etc. includes the multi-dimensional data extracted from a database unit 7 and the data mining results.

When the data displayed as a graph on the display unit 8 is converted to data in another format and is output, in step S21, the user interface unit 2 notifies the output converting unit 4 of the output format designated by the user and requests its output. In steps S22 and S23 the output converting unit 4 converts data to be output to data in the designated format and outputs it. The output converting unit 4 can convert data to data in a document or CSV format.

Its detailed embodiment is described below.

FIG. 5 shows an example of the target data of a data mining process. It is assumed here that data on the function, etc. of an automobile is the target. The data shown in FIG. 5 is the data extracted from the database unit 7 shown in FIG. 1. As the data configuration, one record (data string) is assigned to each model of an automobile as shown in FIG. 5. For its data items, fuel consumption, number of cylinders, horse power, weight, year and country of origin are set. Each of these items is called a "field". When each record includes a plurality of data items in this way, the data strings are called multi-data (multi-dimensional data).

Figure 6:
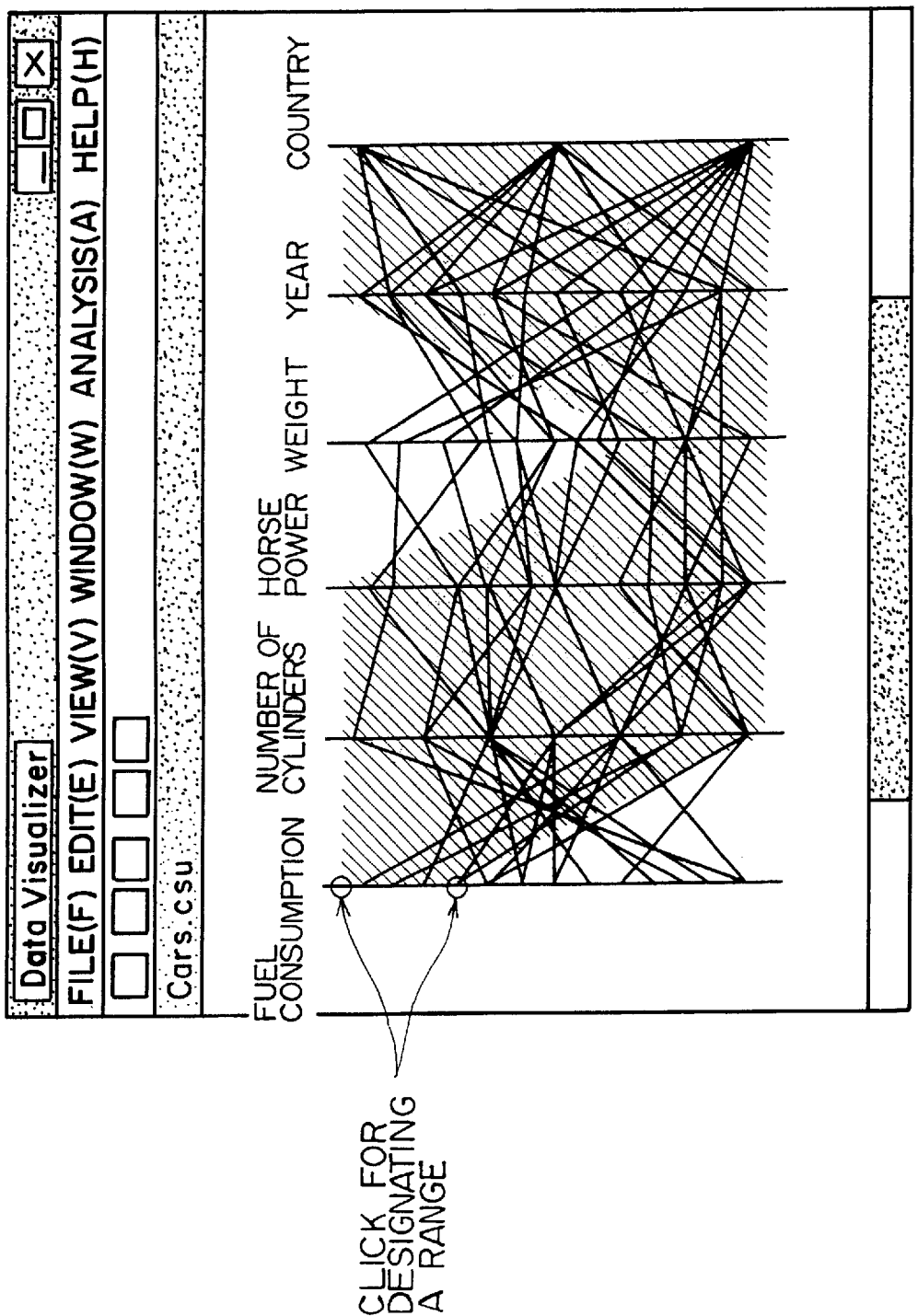
FIG. 6 shows an example of the multi-dimensional data displayed as a graph using a parallel coordinate axis.
Figure 7:
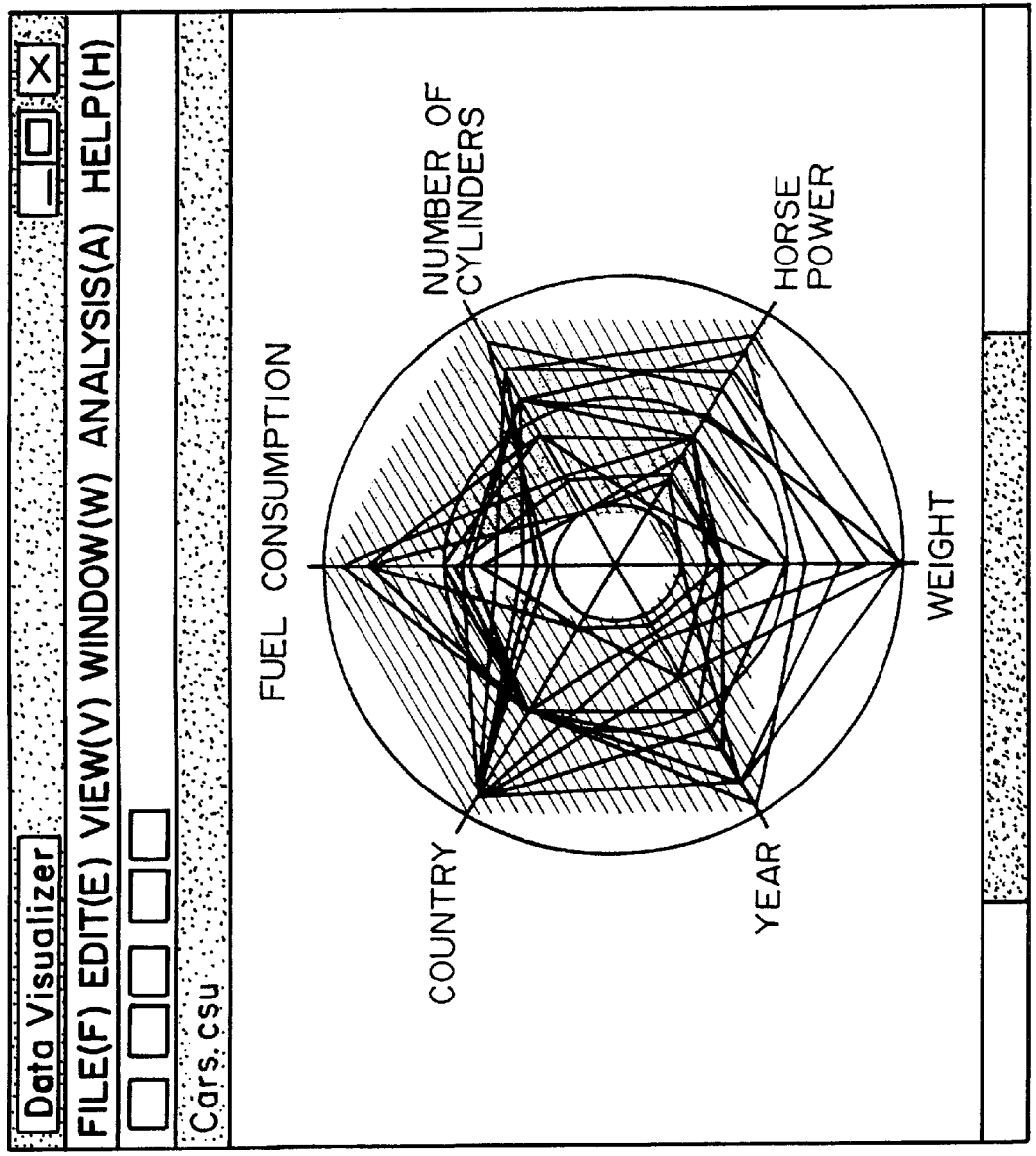
FIG. 7 shows an example of the multi-dimensional data displayed as a graph using radial coordinate axes.

FIGS. 6 and 7 show examples of displaying the multi-data shown in FIG. 5 as graphics. In the displaying method shown in FIG. 6, the multi-data is displayed using a plurality of parallel coordinate axes. Namely, each field (item) is displayed on one coordinate axis. The data on each record is displayed graphically as lines connecting the points on those coordinate axes. Although in this embodiment the process of converting and displaying the multi-data shown in FIG. 5 to the graph shown in FIG. 6 is executed by the user interface unit 2, it can also be executed by another graphic display tool.

The converting process for the graphic display includes the following procedures (1) Detecting the number of fields. In the examples shown in FIGS. 5 and 6 the number of fields is "6".
(2) Displaying the same number of parallel coordinate axes as the number of fields detected in (1) above. Namely, displaying a coordinate axis corresponding to each field. It is assumed that the upper limit and lower limit of each coordinate axis on the screen are an upper limit (gmax) and a lower limit (gmin), respectively.
(3) Searching the entire record and obtaining the maximum and minimum values for each field. For example, in "fuel consumption", the fuel consumption of the automobile with the lowest fuel consumption and the fuel consumption of the automobile with the highest fuel consumption are detected. However, in the fields in which the data cannot be expressed numerically (for example, "country") the number of kinds of data is detected.
(4) Creating a map with data and coordinates on the coordinate axis for each field. As an example of the mapping method, the maximum and minimum values obtained for each field in (3) above are corresponded to the upper limit (gmax) and the lower limit (gmin) of each coordinate axis set in (2) above, or a fair margin may be allowed for them in place of matching the maximum and minimum values of each field to the upper limit (gmax) and the lower limit (gmin), respectively.
(5) Assigning the data on the coordinate axis for each field by referring to the map in (4) above.

(6) Connecting the data points assigned for each record with a line.

The method of displaying multi-dimensional data in the above-described format of a graph, for example, is disclosed in U.S. Pat. No. 5,546,516. The U.S. Pat. No. 5,546,516 does not take into consideration the display of the results of a data mining process.

The visual data mining tool of this preferred embodiment displays the result of a data mining process related to multi-dimensional data on a graph for displaying the multi-dimensional data. The method of displaying multi-dimensional data as a graph in this preferred embodiment is not limited to the method shown in FIG. 6. Namely, the graph in which parallel coordinate axes shown in FIG. 6 are used, is only a single embodiment, and, for example, the visual tool of this preferred embodiment can be applied in the method using radial coordinate axes as shown in FIG. 7. However, its embodiment is described below presuming the use of a graph in which parallel coordinates are used.

The user interface unit 2 is provided with a function of enabling the user to designate a data range on the display screen. For example, when the user designates a desired range using a mouse, etc. while displaying the graph shown in FIG. 6 on the display unit 8 (the designated range is shown as the shaded area in the drawing), the user interface unit 2 can distinguish the data contained in the range from other data, for example, by displaying it as high-lighted. The user notifies the user interface unit 2 of the desired data range, for example, by clicking two desired points in each field.

Figure 8:
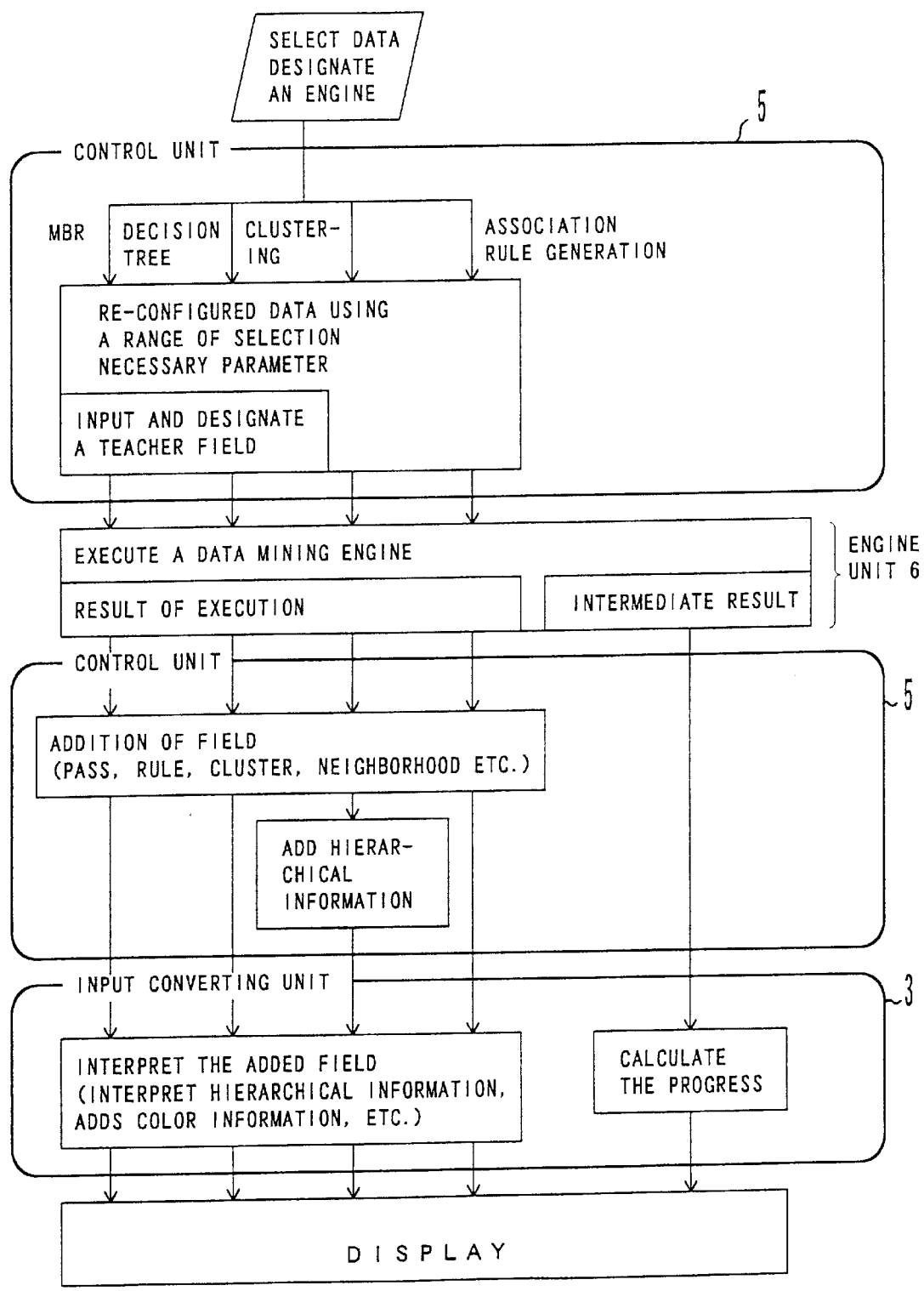
FIG. 8 is a diagram showing the flow of processes ranging from the request for a data mining process to the display of the result of a data mining process.

The outline of the process of a request for a data mining process and of displaying the result is described below referring to FIG. 8. Here, the flow of the process in the case where the user designates the desired data mining method and a target data range while displaying multi-dimensional data as a graph on the display unit 8, is shown.

When the visual data mining tool 1 recognizes a user's instruction, it transfers the instruction to the control unit 5. The data transferred at this moment is shown in FIG. 9. When the user interface unit 2 recognizes the data range designated by the user, it notifies the control unit 5 of the record or field contained in the range as a "selected record" or "selected field", respectively. When the user interface unit 2 recognizes the data mining method designated by the user, it also notifies the control unit 5 of the "name of engine" of the data mining engine corresponding to the method. When "teacher value" is needed in the data mining process, it also notifies the control unit 5 of the value and its field, together with the "name of engine".

The engine unit 6 executes the data mining process on the designated data range using the designated engine, and sends out the result to the control unit 5. The engine unit 6 also notifies the control unit 5 of the intermediate result of the executed data mining process periodically.

When the control unit 5 receives the data mining result obtained by the engine unit 6, it creates additional information if necessary and sends it to the visual data mining tool 1 together with the result data. This additional information is, for example, hierarchical information, color information, rule number, pass number, axis-adding instruction information, etc., though this varies depending on the data mining method. The details of the additional information are described in each embodiment described later. The control unit 5 converts the intermediate result received from the engine unit 6 to "progress data" sequentially, and sends it to the visual data mining tool 1.

The input converting unit 3 interprets the additional information received from the control unit 5, and converts a format of the resultant data of the data mining process to a predetermined data format according to the additional information so that the user interface unit 2 may display the result of the data mining process as a graph with respect to the additional information. The user interface unit 2 also displays the result of the data mining process received from the input converting unit 3 by adding it to the graph displayed before or by changing part of the graph. Thus, the result of the data mining process designated by the user is shown on the graph.

Next, the process of converting the multi-dimensional data displayed in a graph format to data in another format and outputting it, is described below. Although an example of converting multi-dimensional data to data in a document format and outputting it, and an example of converting data to data in a CSV format and outputting it, are shown here, it can also be converted to data in another format.

Figure 10:
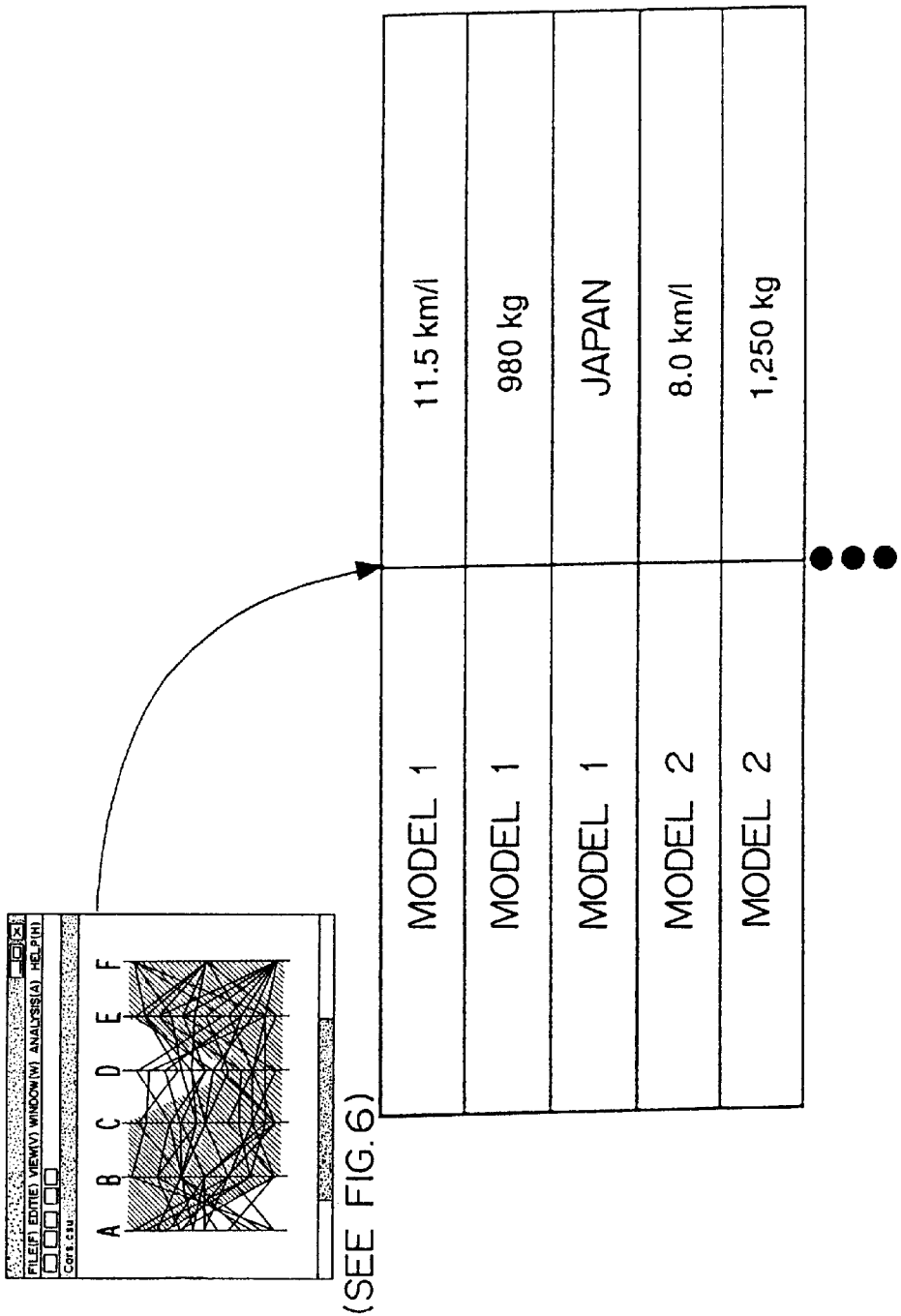
FIG. 10 shows an example of the output converted from a graph to a document format.

FIG. 10 shows an example of the result of converting the displayed data to data in a document format. The user can designate the range for outputting a document using the graph currently being displayed. For example, a specific field can be designated or a data range can be designated for each field as shown in FIG. 6. In the latter case only records belonging to the designated range are extracted as targets to be converted. FIG. 10 shows an example of the conversion result in the case where a user designates "fuel consumption", "weight" and "country" in the graph shown in FIG. 6.

Figure 11:
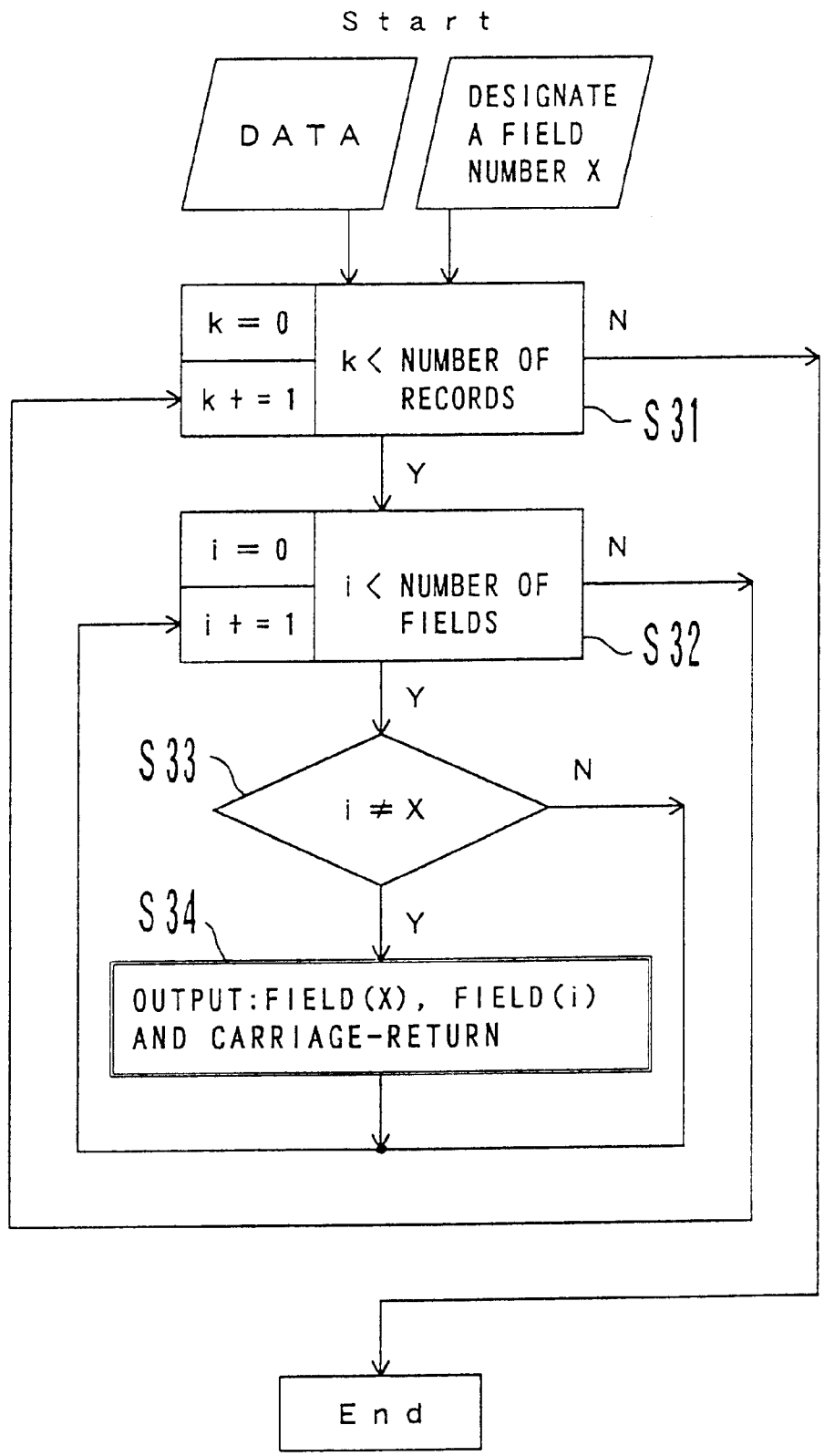
FIG. 11 is a flowchart explaining the process of converting multi-dimensional data to data in a document format and outputting it.

FIG. 11 is a flowchart explaining the process of converting multi-dimensional data to data in a document format. Here, the case where the user has designated a specific field, is shown.

Step S31 is the process of extracting records of the target to be converted one by one and executing steps S32 and after for each record. It is assumed here that the record number of each record is "k". The initial value of the record number is "0", and after that the value is incremented by one until it reaches the total number of records. Step S32 is the process of extracting the displayed fields one by one and executing steps S33 and after for each displayed field. It is assumed here that the field number of each field is "i". The initial value of the field number is "0", and after that the value is incremented by one until it reaches the total number of fields.

In step S33 it is judged whether or not the field extracted in step S32 coincides with the field X designated by the user. If they coincide with each other, the flow proceeds to step S34, and if they do not coincide with each other, it returns to step S32. In step S34, a name of the record extracted in step S31 and data on the field belonging to the extracted record is output, and then a command indicating "line feed" is output.

In this way, the designated data is converted to data in a document format by dividing the multi-dimensional data into two items comprising a name of a record and data in the designated field in all records. When the user designates a data range for each field (the shaded area shown in FIG. 6), the process shown in FIG. 11 is executed only for the records in that range.

Figure 12:
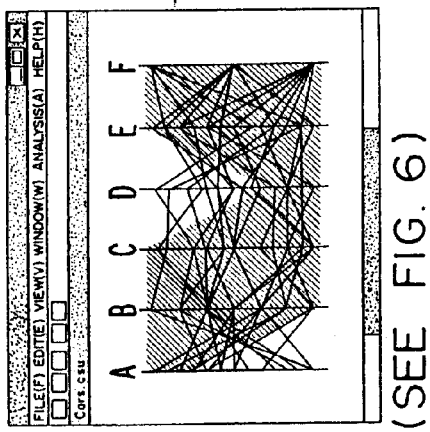
FIG. 12 shows an example of the output converted from a graph to a comma separated value (CSV) format.

FIG. 12 shows an example of converting the displayed data to data in a CSV format. The data designation by the user is the same as that in the case of a document format. FIG. 12 shows an example of the conversion result in the case where the user designates "fuel consumption", "weight", "number of cylinders", "horse power" and "country" in the graph shown in FIG. 6.

Figure 13:
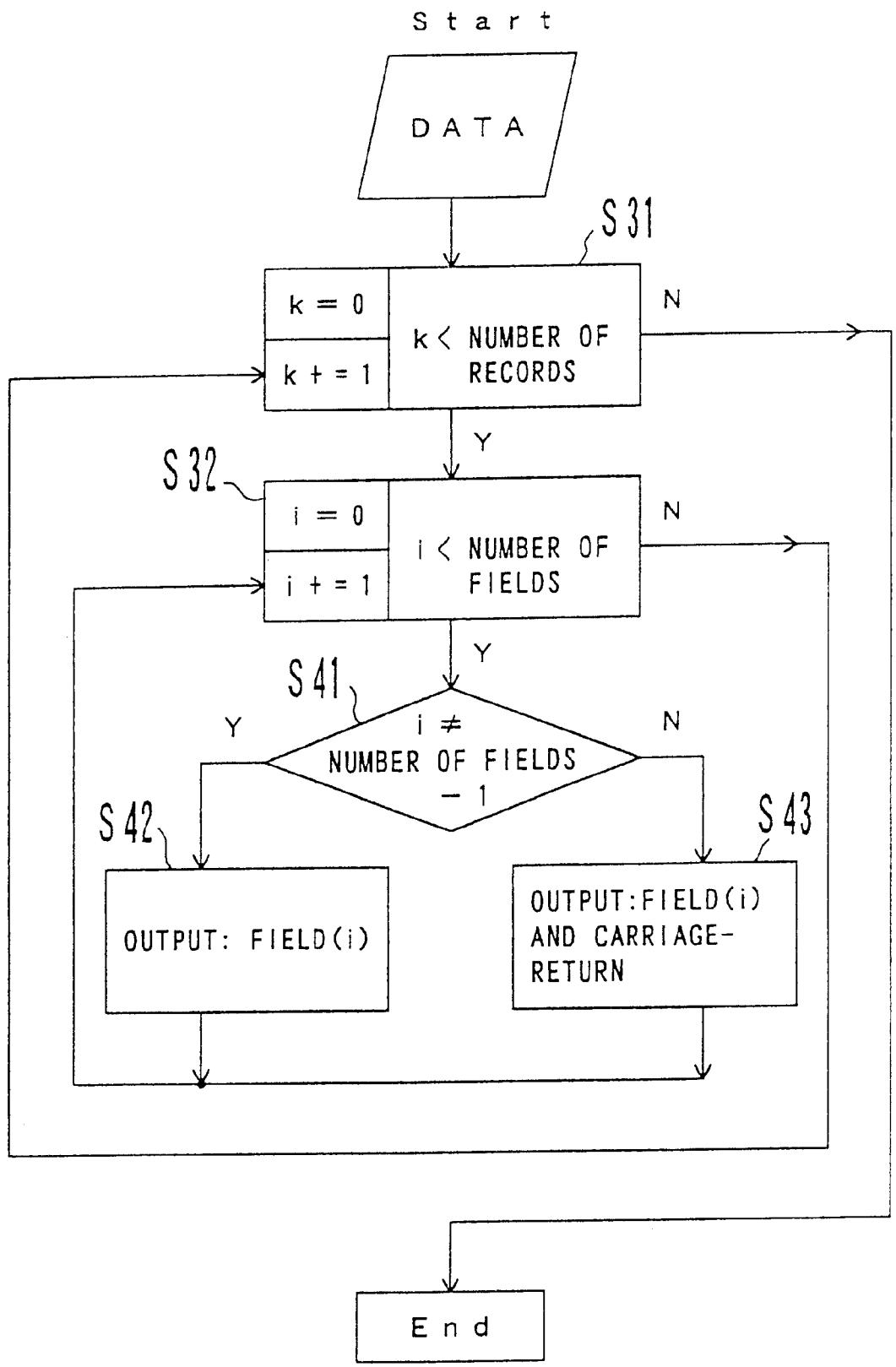
FIG. 13 is a flowchart explaining the process of converting multi-dimensional data to data in a CSV format and outputting it.

FIG. 13 is a flowchart explaining the process of converting multi-dimensional data to data in a CSV format. Steps S31 and S32 are the same as those in the case of a document format shown in FIG. 11.

In step S41, it is judged whether or not the field extracted in step S32 is a final field in the extracted record. If it is not final, the flow proceeds to step S42, and if it is final, it proceeds to step S43. In step S42 the data on the field extracted in step S32 is output, and "," is output following the data. On the other hand, in step S43, the data on the field extracted in step S32 is output, and a command indicating "line feed" is output following the data.

In this way, the designated data is converted to data in a CSV format by developing each record arranging a field data and a comma (,) alternately for each designated field.

Next, the process of selecting part of the multi-dimensional data displayed as a graph on the display unit 8 and having the data mining engine execute the data mining process on the selected data, is described below. It is assumed here that a data mining process is executed for data of a specific record which satisfies specific conditions out of the displayed data. As an example it is assumed in FIG. 6 that a data mining process is executed for a "model with 13 km/l or more in fuel consumption and 1,100 kg or less in weight". In this case, the user inputs the maximum and/or minimum values of the range which he or she wants to designate on the coordinate axes corresponding to the "fuel consumption" and "weight" using a mouse, etc. Then, he or she inputs an instruction to start the engine corresponding to the data mining method which he or she wants to use.

Figure 14:
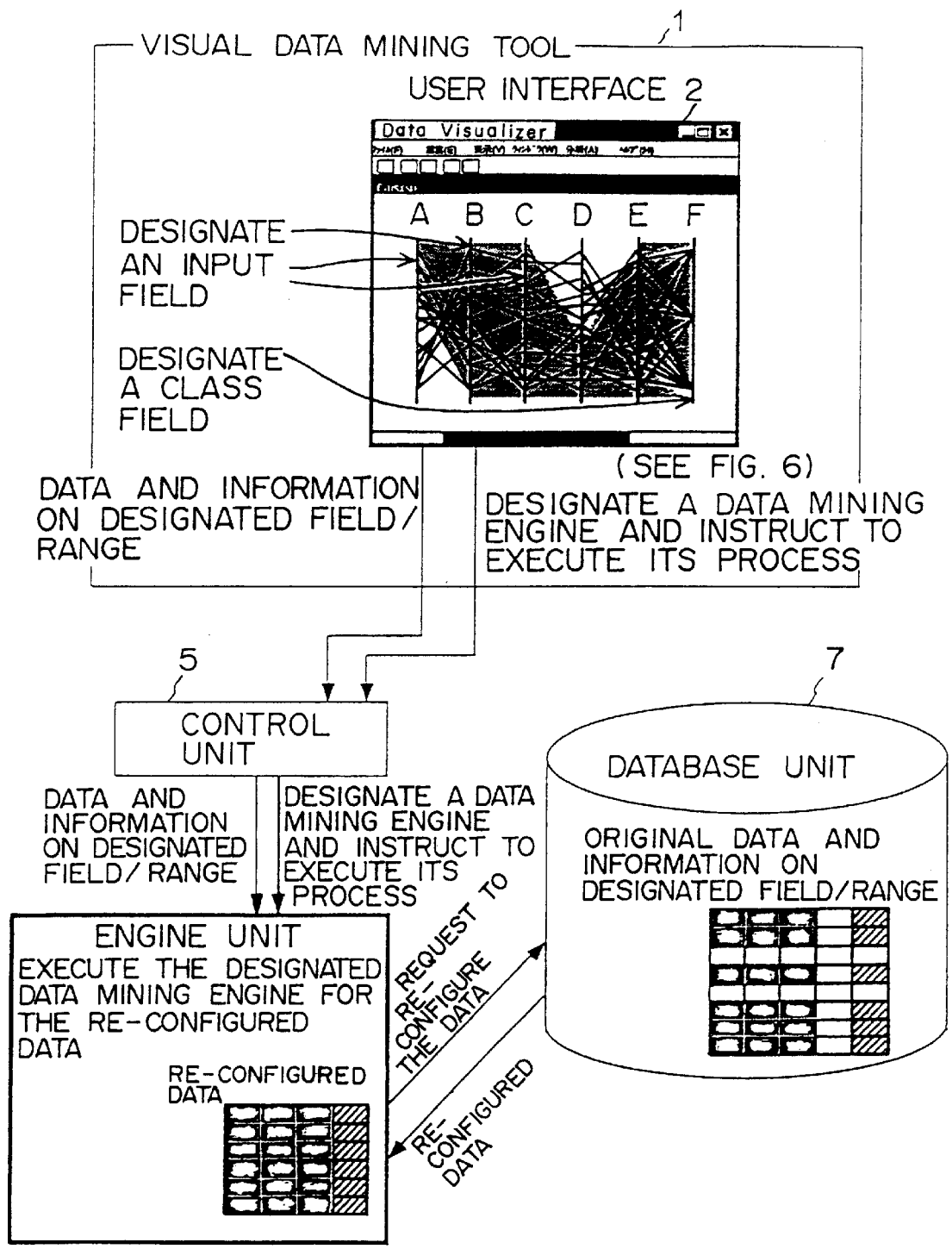
FIG. 14 is a diagram explaining the concept on the process of executing a data mining process on the designated data.

FIG. 14 is a diagram explaining the concept of the process of having a data mining engine execute the data mining process on the designated data. When the user interface unit 2 detects the designation of a data mining engine input by the user, its start command, the target data range of the data mining process, etc., the user interface unit 2 notifies the engine unit 6 of these through the control unit 5.

The engine unit 6 accesses the database unit 7 according to the information received from the user interface unit 2 through the control unit 5. The database unit 7 re-configures the requested data and sends it to the engine unit 6. Then, the engine unit 6 executes the data mining process on the re-configured data.

In this way, in this embodiment the user can obtain a result of the data mining process on the designated data range by designating the desired range on the graph. The graph to be displayed on the display unit 8 is represented by dot data composing a screen. Therefore, the data designated on the graph by the user is input to the user interface unit 2 as dot data.

On the other hand, the engine unit 6 operates not taking into consideration the screen configuration of the display unit 8. Therefore, if the engine unit 6 receives the data range information represented by dot data composing the screen of the display unit 8, it cannot recognize the data range for the data mining process. For example, when the user has input "13 km/l or more" for the range of "fuel consumption" on the screen displaying the graph shown in FIG. 6, an instruction of "range from the Y1-th dot to the Y2-th dot" is input to the user interface unit 2. However, if this information is passed to the engine unit 6 as it is, the engine unit 6 cannot recognize it. Therefore, the user interface unit 2 (or the user interface unit 2 and the control unit 5) converts the range information represented by dot data to data recognizable by the engine unit 6. The converting method is described below.

Figure 15:
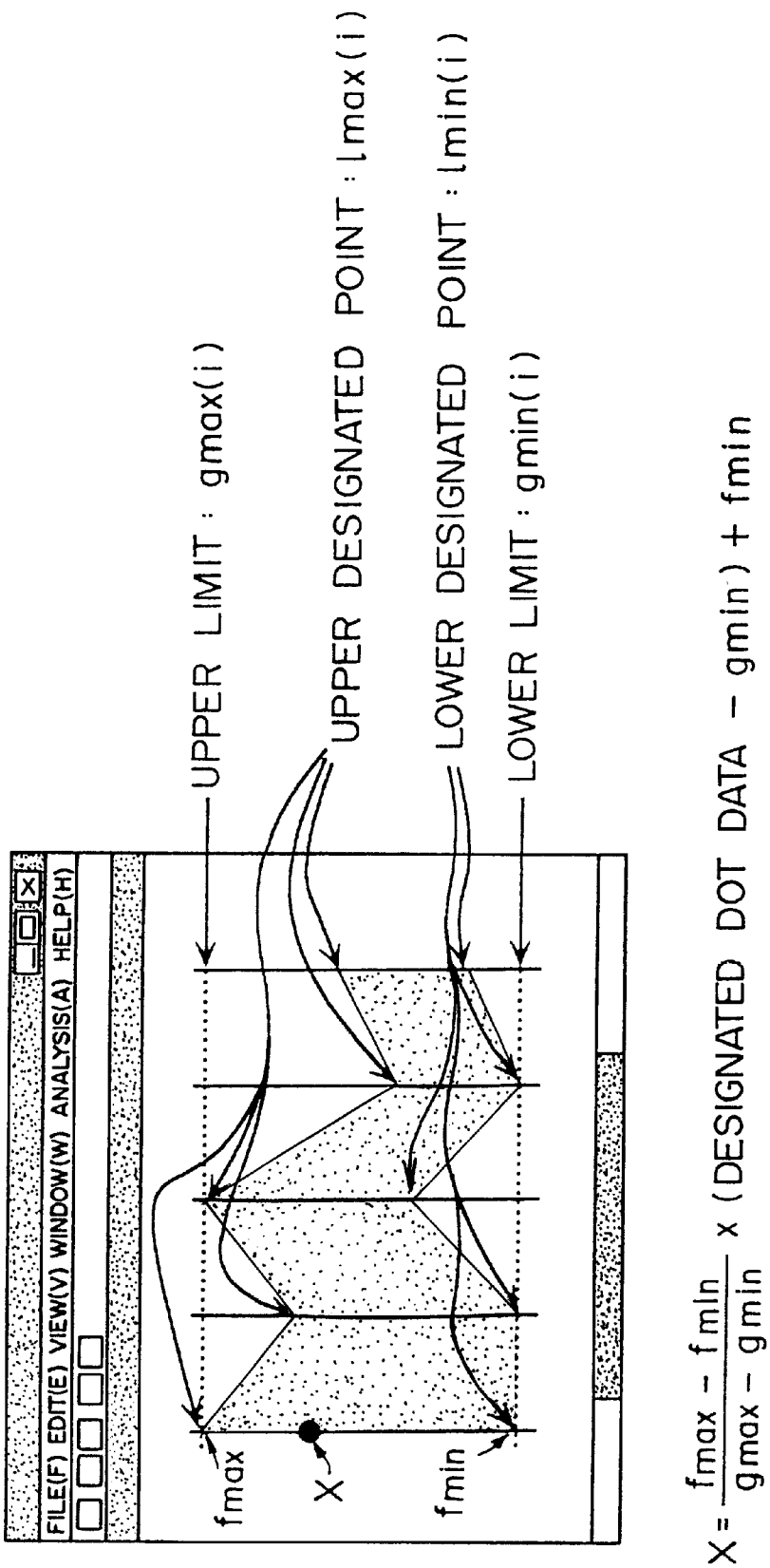
FIG. 15 is a diagram explaining the conversion from dot data on the screen to data values for each field.

FIG. 15 is a diagram explaining the conversion from the dot data on the screen to a data value for each field. When displaying the multi-dimensional data as a graph, the top and bottom position of the coordinate axis corresponding to each field are set as the upper limit value (gmax) and the lower limit value (gmin). Both the upper and lower limit values are represented by dot data. The maximum value [fmax(i)] and the minimum value [fmin(i)] of the data for each field are corresponded to the upper limit and the lower limit, respectively This correspondence relation, for example, is set as a table in a memory, not shown in the drawing. The data value for each field corresponding to any coordinate point on the coordinate represented by dot data is calculated using a conversion ratio based on the corresponding relation. Namely, the data value $x0$ for each field corresponding to the point in which the dot data on the coordinate axis is $y0$, is expressed by the following equation.

$$(gmax-gmin):(y0-gmin)=(fmax-fmin):(x0-fmin)$$

$$\therefore x0=(y0-gmin)\times\{(fmax-fmin)/(gmax-gmin)\}+fmin$$

For example, when the upper limit value and the lower limit value of the coordinate axis are "100 (dot)" and "900 (dot)", respectively, and when the maximum value and the minimum value of "fuel consumption" are "16" and "6", respectively, the data x positioned in the 500th dot on the coordinate axis of "fuel consumption" can be obtained by the following equation.

$$x=(16-6)\times\{(500-100)/(900-100)\}+6=11 \text{ km/l}$$

The process of converting the dot data to a data value for each field is, for example, executed by the user interface unit 2. Namely, when the user designates the desired point on the coordinate axis corresponding to each field using a mouse, etc., the user interface unit 2 converts the dot data at the designated point to a data value in the relevant field.

FIG. 16 is a diagram explaining the process of extracting a record contained in the data range when a desired coordinate axis is selected, and a data range is designated on the coordinate axis by the user. It is assumed here that the user designates two points on the coordinate axis on the screen, where a graph is displayed, for the upper limit and the lower limit values of the data range.

In this case, the user interface unit 2 notifies the control unit 5 of information identifying the coordinate axis selected by the user (axis number). The user interface unit 2 also converts the dot data of the upper designated point and the lower designated point designated on the screen to data values for each field, and notifies the control unit 5 of the field range maximum value [fmax(i)] and the field range minimum value [fmin(i)], respectively.

When the control unit 5 receives this notice, it executes steps S51 to S55. Steps S51 and S52 are the same as steps 31 and S32 shown in FIG. 11, respectively. Namely, they are the processes for extracting fields one by one for each record and executing steps S53 to S55. In step S53, it is judged whether or not the field number extracted in step S52 coincides with the field number selected by the user. If they coincide with each other, the flow proceeds to step 354, and if they do not coincide with each other, it returns to step S52 and the next field is extracted.

In step S54, it is judged whether or not the data in the field extracted in step S52 is between the field range maximum value and the field range minimum value notified by the user interface unit 2. Namely, it is judged whether or not the data of the relevant record is within the range designated by the user. At this time, the control unit 5 recognizes the data of the entire record. As a result of this judgement, if the data of the relevant record is within the designated range, the flow returns to step S52 and the next field is extracted, and if it is out of the range, it returns to step S51 and the next record is extracted.

According to steps S52 to S54, only when the data of the relevant record is within the range designated by the user in all the fields s elected by the user, the flow proceeds to step S55. In step S55, only the record number extracted in step S51 is held.

For example, as shown in FIG. 6, when the user selects "fuel consumption" and "weight", and designates a range for these fields, the data of "fuel consumption" and "weight" are taken out for each record and it is judged whether or not those extracted data are within the designated range by the user. And when each data is within the designated range in each field, only the record number of the record is held in step S55.

When the process of steps S52 to S55 finishes for all records, the held record number is notified to the engine unit 6, and a data mining engine is started. The engine unit 6 executes the data mining process on only the records within the range designated by the user.

In this way, in this embodiment, a data mining process is executed for only the records within the range by designating the desired field and data range using the displayed graph. Although the dot data designated on the screen is converted to data recognizable to the engine unit 6 by the joint operation between the user interface unit 2 and the control unit 5 in the above configuration, it can also be configured so that all the processes are executed by the user interface unit 2. In this configuration, the user interface unit 2 is also provided with a function of notifying the engine unit 6 of the data mining method designated by the user and a function of notifying the engine unit 6 of the teacher value used in the data mining process if necessary.

Figure 17:
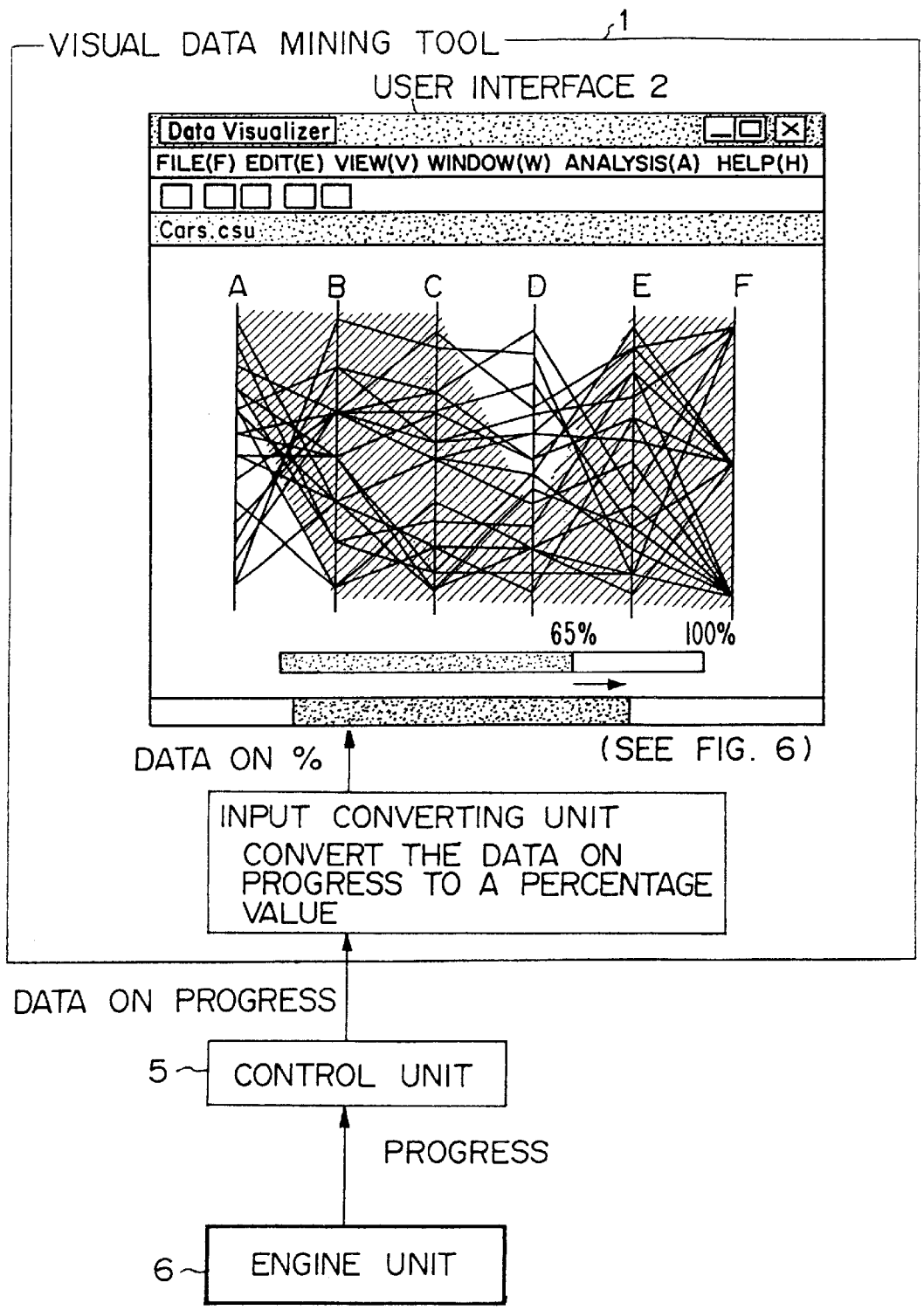
FIG. 17 is a diagram showing the process of displaying the progress of a data mining process.

FIG. 17 is a diagram showing the process of displaying the progress of the data mining process. It is assumed here that the engine unit 6 can recognize the progress of a data mining process. The progress is detected by one of the following three methods.

(1) Running time which has passed against estimated finish time
(2) Number of processes which have been executed against estimated total number of processes (or maximum number of processes)
(3) Data volume which has been processed against volume of target data The engine unit 6 periodically detects one piece of this information, and transfers it to the input converting unit 3 through the control unit 5 as the progress data. The input converting unit 3 converts the progress data to a percentage value if needed by the user, etc. and passes it to the user interface unit 2. Then, the user interface unit 2 displays the converted progress data on the display unit 8 in real time.

Figure 18:
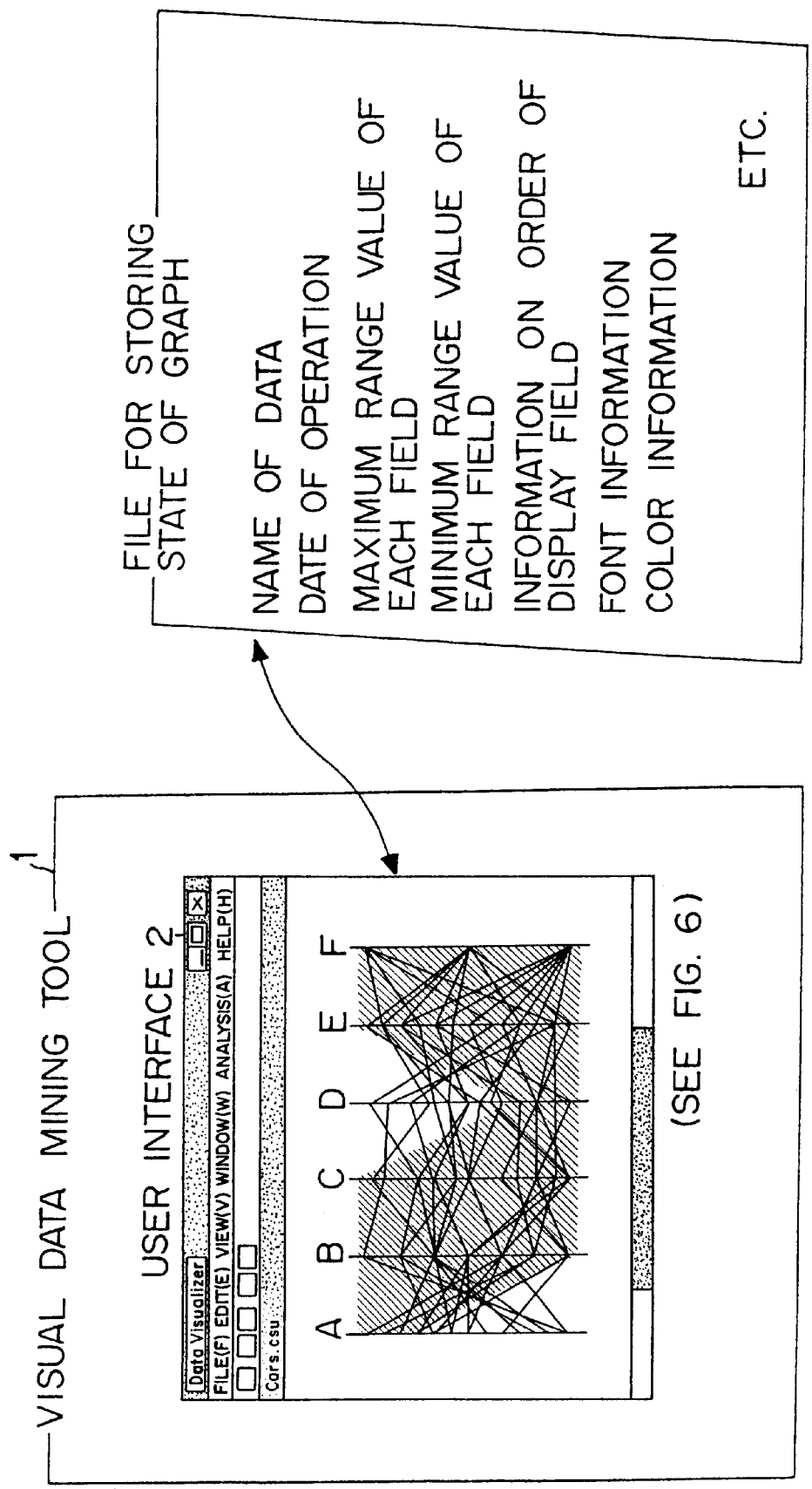
FIG. 18 is a diagram explaining the process of holding a displaying state, etc.

FIG. 18 is a diagram explaining the process of storing the displayed state of a graph. The user interface unit 2 can store various kinds of information set for the visual data mining tool itself in a memory or hard disk, not shown in the drawing, automatically or according to a user's instruction. The various kinds of information to store include, for example, the name of the data, date of operation, range information in each field (the maximum and minimum values), information such as the order of each field, etc., font and color information, etc. The user can easily obtain the displayed state of the graph which was finished the last time by reading this information.

Next, the process of displaying the result of a data mining process on the graph in the same format as that of the graph which has already been displayed is described below.

Figure 19:
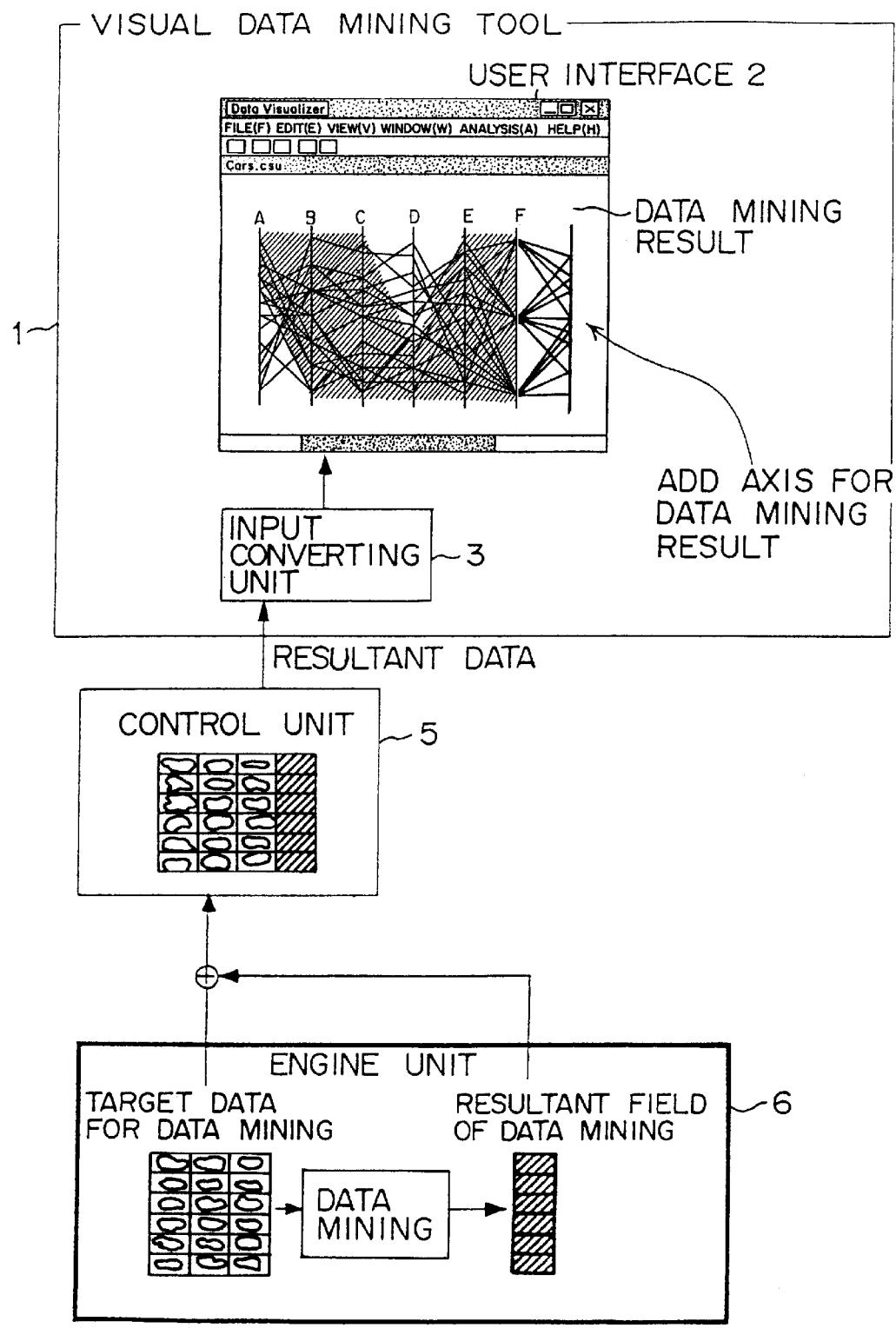
FIG. 19 is a diagram showing the embodiment in which the result of a data mining is added to a graph as a new field.

FIG. 19 shows an embodiment of adding the result of a data mining process to the graph as a new field.

As an analysis result of input data, a data mining method of outputting the attribute of each record is known. For example, a clustering process outputs information on which class out of a plurality of classes each record belongs to. In this case, the result of the data mining process (cluster number in a clustering process) corresponds to one field data for each record. Besides the clustering process, there is another data mining method in which its analysis result becomes one or more field data for each record.

In this embodiment, the result of a data mining process is handled as one or more field data. Namely, when the engine unit 6 executes the data mining process on a target data and obtains its result, it relates the result data to the target data and transfers them to the control unit 5. When the control unit 5 receives this data, it incorporates the data mining result into the target data as one or more field data. Then, the control unit 5 transfers the data into which the data mining result is incorporated to the user interface unit 2 through the input converting unit 3.

The user interface unit 2 displays the data mining result expressed as a new field in the same format as that of other fields displayed before. Namely, the user interface unit 2 adds the necessary number of coordinate axes corresponding to the data mining result and displays the data mining result using these coordinate axes. The line corresponding to each record is drawn so as to reach the corresponding point on the coordinate axis displaying the data mining result. Although the coordinate axis corresponding to the data mining result is provided at the right end in FIG. 19, it can be positioned in any place by a user's instruction.

In this way, when the data mining result on the multi-dimensional data is obtained in the state of displaying multi-dimensional data as a graph, the data mining result is displayed in the same format as that of the displayed graph. Therefore, if the user is familiar with the graph, he or she can understand the data mining result easily.

In the above configuration, not only the result of a data mining process but also the target data of the data mining process are transferred from the engine unit 6 to the user interface unit 2. However, if the user interface unit 2 or the input converting unit 3 is provided with a memory unit, and is so configured that information on the data currently being displayed is stored in the memory unit, only the result of the data mining process is sent from the engine unit 6 to the user interface unit 2 and it can be displayed additionally to the graph.

Figure 20:
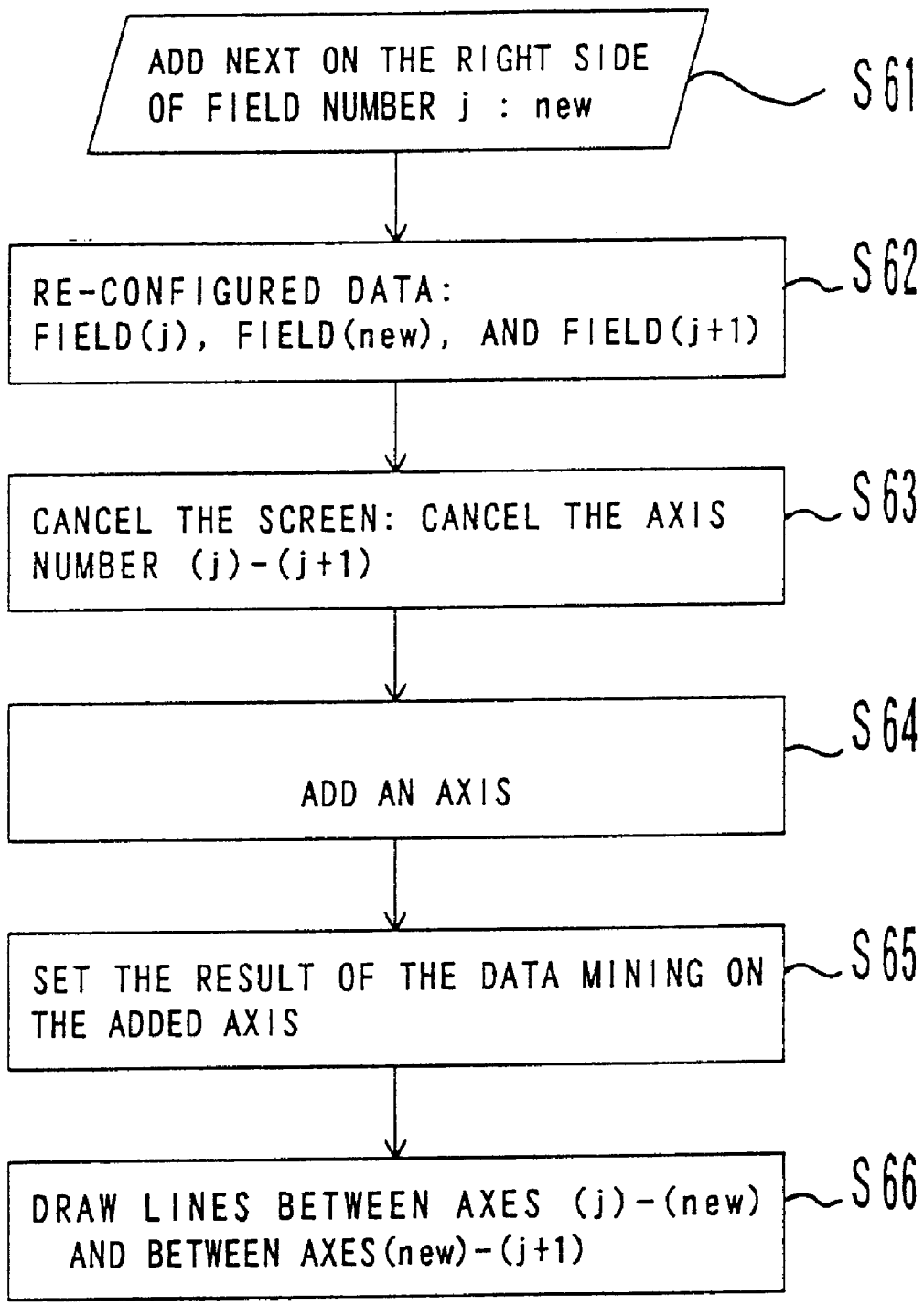
FIG. 20 is a flowchart showing the process of adding a coordinate axis corresponding to the data mining result and displaying the result obtained by the data mining process using it.

FIG. 20 is a flowchart showing the process of adding a coordinate axis corresponding to the result of the data mining process and displaying the result of the data mining process using it. The process of this flowchart is executed by the user interface unit 2. Here, the case where one coordinate axis corresponding to the result of a data mining process is added while a plurality of coordinate axes is being displayed, is shown.

Figure 21:
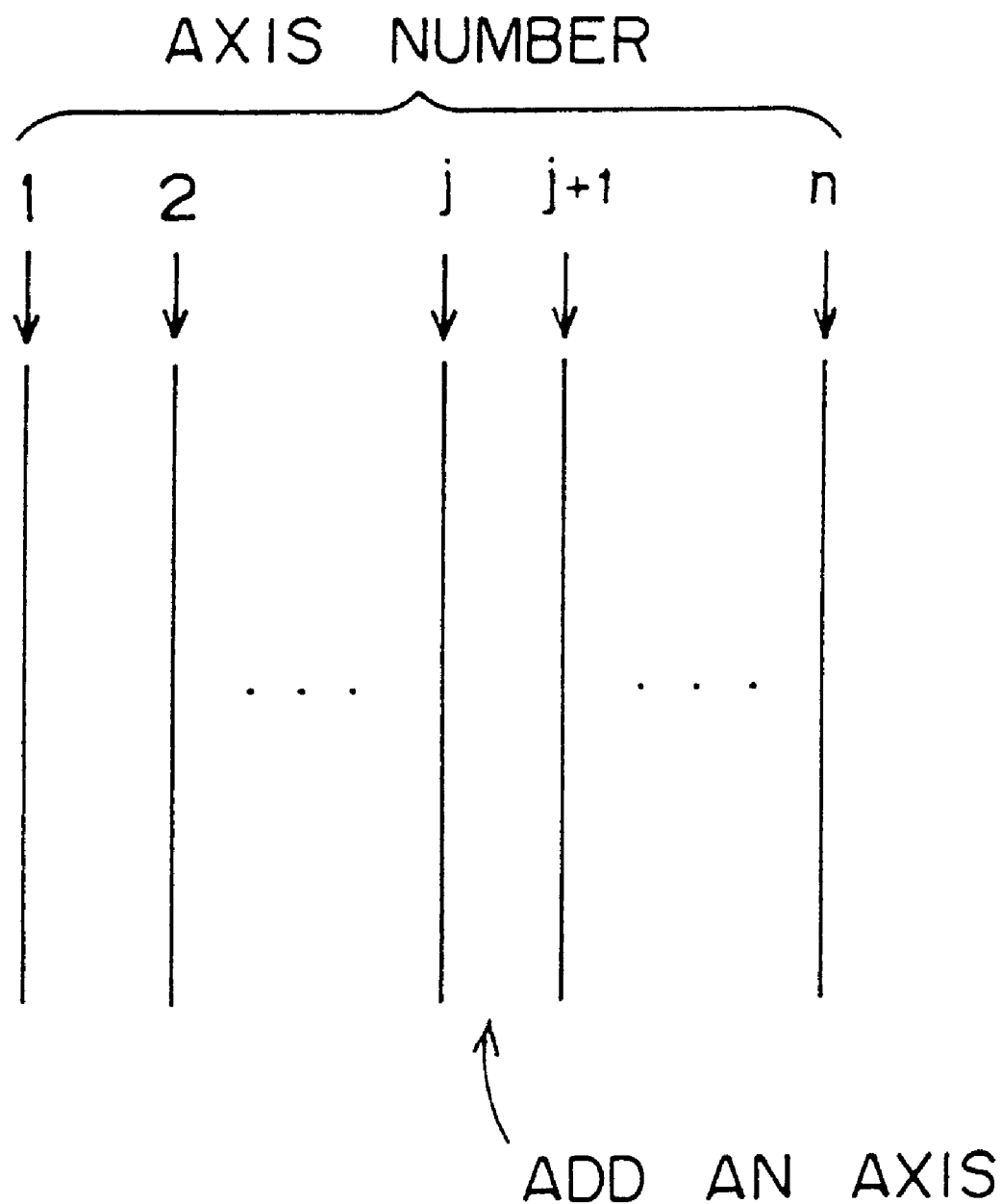
FIG. 21 is a diagram for explaining the flowchart shown in FIG. 20.

In step S61, a user's instruction is detected. It is assumed here, as shown in FIG. 21, that the user inputs an instruction that a coordinate axis corresponding to the result of the data mining process is added next on the right side of the coordinate axis to which an axis number j is assigned. The coordinate axis to which the axis number j is assigned is an axis for displaying the data of the field to which a field number J is assigned. The field number is a number for distinguishing a plurality of fields from each other.

Figure 22:
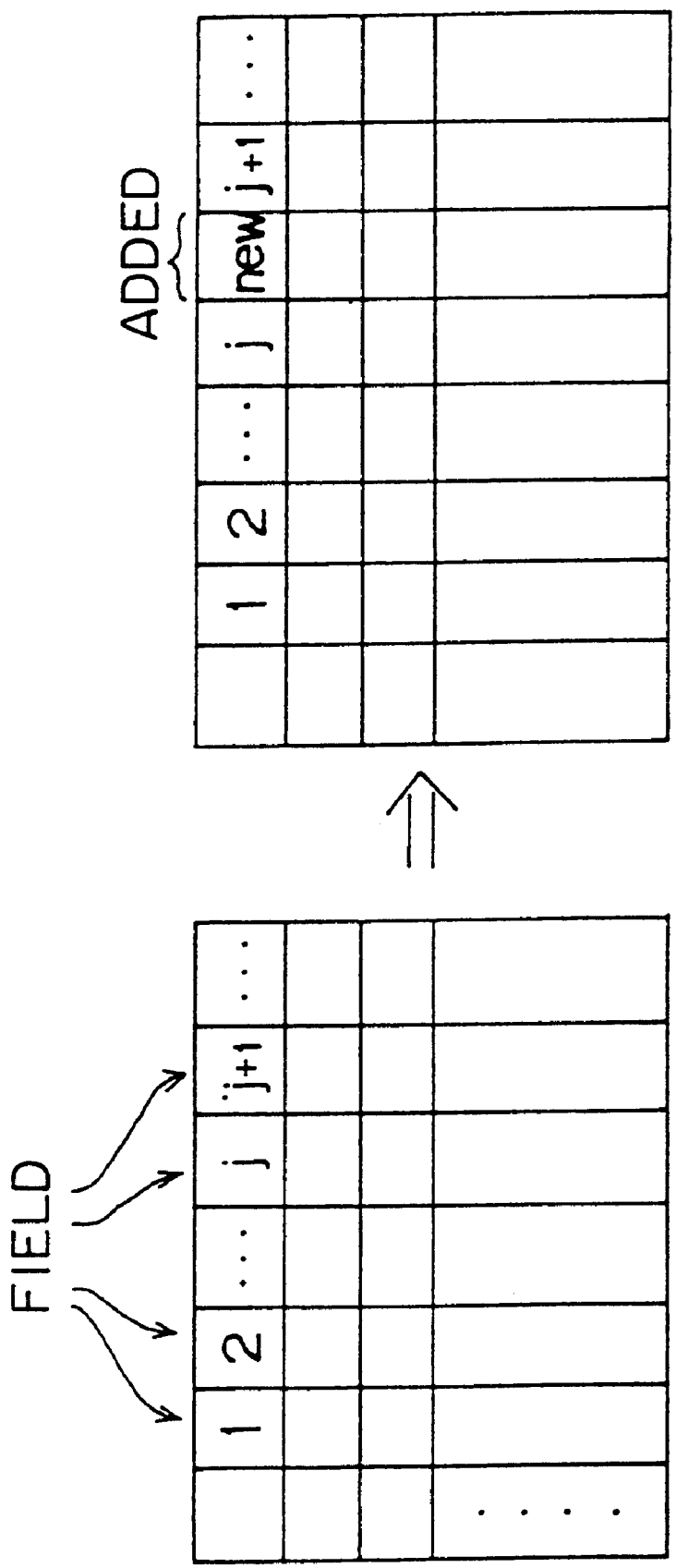
FIG. 22 is a diagram for explaining the flowchart shown in FIG. 20.
Figure 23:
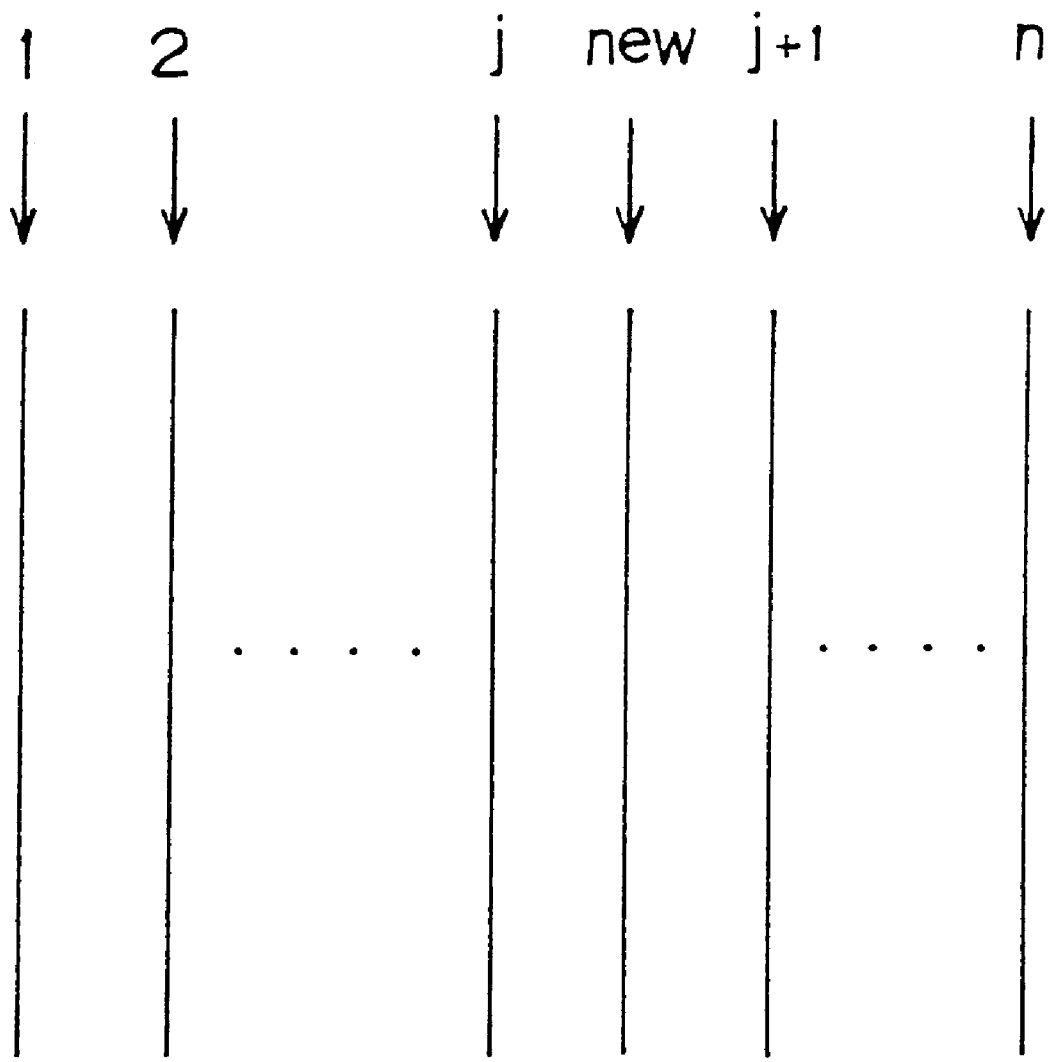
FIG. 23 is a diagram for explaining the flowchart shown in FIG. 20.

In step S62, data is re-configured as shown in FIG. 22. Namely, a field (new) for displaying the result of the data mining process is provided between a field (j) and a field (j+1), and the data mining result is written in the newly provided field. In step S63, lines for each record drawn between a coordinate axis (j) and a coordinate axis (j+1) are deleted. In step S64, the coordinate axis (new) corresponding to the result of the data mining process is displayed between the coordinate axis (j) and the coordinate axis (j+1) as shown in FIG. 23. At this moment, the axes (1) to (j) or axes (j+1) to (n) and lines for each record drawn between these axes may be moved to secure a proper interval between the coordinate axes (j) to (new) and the coordinate axes (new) and (j+1).

In step S65, the result of the data mining process of each record is set on the coordinate axis (new) added in step S64. In step S66, lines between the coordinate axes (j) and (new), and the coordinate axes (new) and (j+1) are drawn for each record.

In this way, the result of the data mining process is displayed in the same format as that of the graph displayed before. When a plurality of fields are added as the result of the data mining process, the process shown in FIG. 20 is repeated.

Although the process of converting a data format and outputting it has been described referring to FIGS. 11 and 13, the result of the data mining process can also be output in a document or CSV format, if these conversion processes are executed while a coordinate axis for displaying the result of a data mining process is incorporated in the graph. Although the process of storing the displaying state of the graph has been described with reference to FIG. 19, the result of the data mining process is stored at the same time if this storing process is executed while a coordinate axis for displaying the result of a data mining process is incorporated in the graph.

In multi-dimensional data, there is the case where a plurality of fields exist in the same concept. Furthermore, there is the case where hierarchical relation exists between the plurality of fields belonging to the same concept. For example, in multi-dimensional data on an automobile, "price" and "price range" belong to the same concept. In this case, "price" is a lower order field of "price range". The displaying method of the multi-dimensional data in the case where a plurality of fields belonging to the same concept exist is described below.

Figure 24:
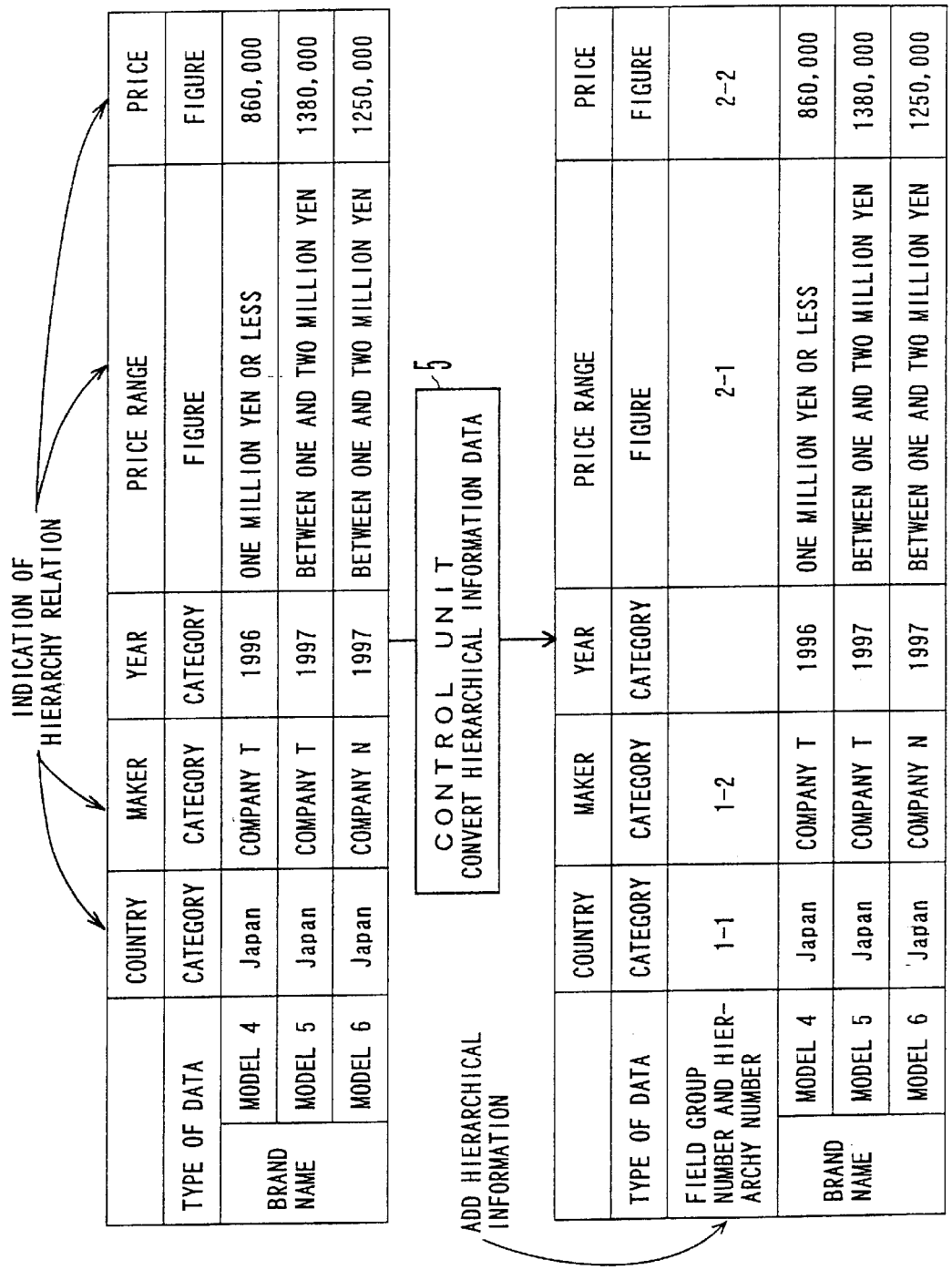
FIG. 24 is a diagram showing the data format in which hierarchical information is added.

FIG. 24 is a diagram explaining the process of adding hierarchical information. This process is executed by the control unit 5. When the control unit 5 receives multi-dimensional data, it judges whether or not there is the case where a plurality of fields belong to the same concept. If there is such a case, it judges on the hierarchical relation. The hierarchical relation may be designated as part of the multi-dimensional data. Or a dictionary can be prepared in which hierarchical relation about various kinds of "words" is defined beforehand, and the control unit 5 can be made to judge it by referring to the dictionary.

The control unit 5 adds hierarchical information to the multi-dimensional data. The hierarchical information is composed of a field group number and a hierarchical number. One field group number is assigned to a plurality of fields belonging to the same concept. In the example shown in FIG. 24, "maker" and "country" belong to the same field group, and "1" is assigned as their field group number. Further "price range" and "price" belong to the same field group, and "2" is assigned as their field group number.

The hierarchical number represents a vertical relation among fields in each field group. In the example shown in FIG. 24, since "maker" is a lower order hierarchy of "country", the hierarchical numbers "1" and "2" are assigned to the "country" and "maker", respectively. In the same way, the hierarchical numbers "1" and "2" are assigned to "price range" and "price", respectively. In this way, the smaller the hierarchical number, the higher the hierarchy represented, and the wider the range of target data becomes. The field group number and the hierarchical number are connected to each other using a hyphen. When there is no field belonging to the same concept, the column for hierarchical information becomes blank.

The multi-dimensional data with the hierarchical information added is passed to the user interface unit 2 through the input converting unit 3. The user interface unit 2 displays the multi-dimensional data as a graph on the display unit 8 using the hierarchical information.

Figure 25:
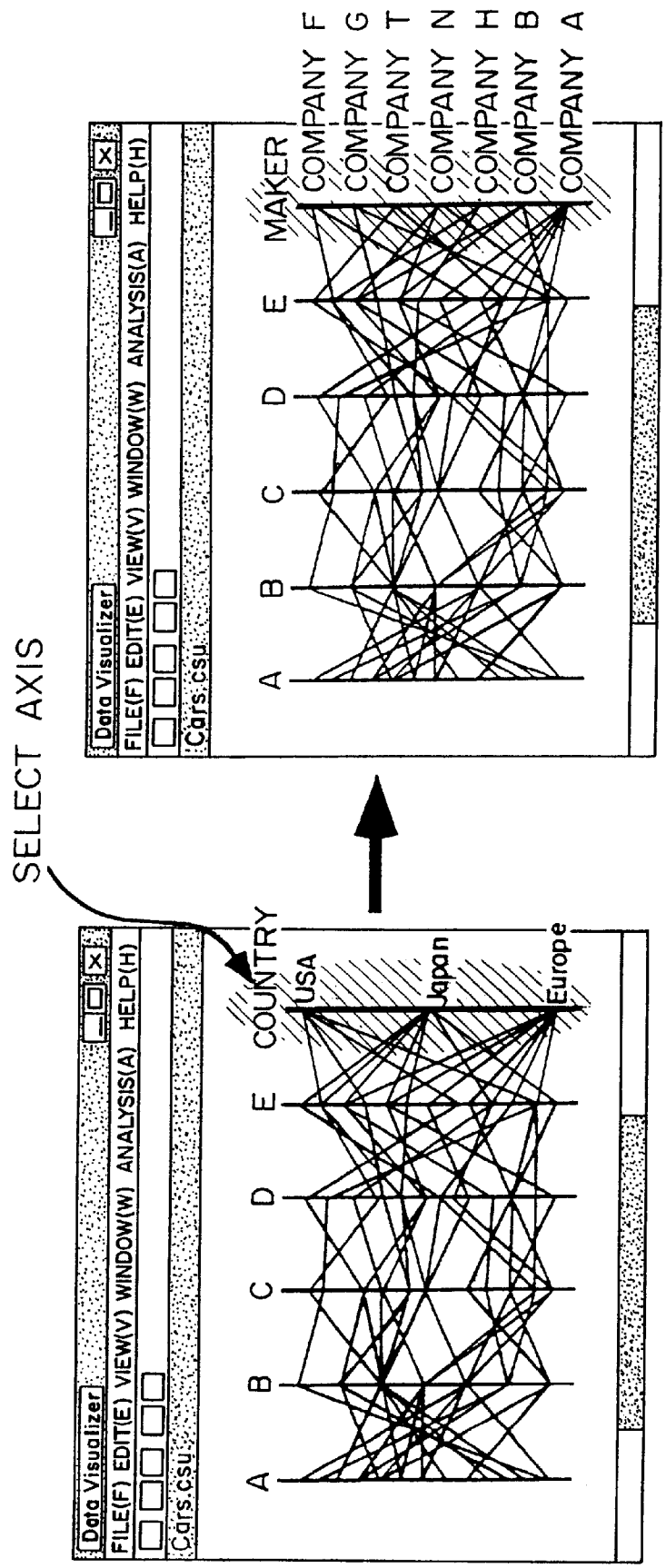
FIG. 25 is a diagram showing the switch-over of a hierarchy.

FIG. 25 is a diagram showing the switch-over of hierarchy. When there are a plurality of fields belonging to the same concept, the user interface unit 2 selects and displays one of the fields. In the example shown in the left of FIG. 25, out of "country" and "maker" belonging to the same concept, only "country" is displayed.

When the user wants to switch over the hierarchy to be displayed, he or she selects the coordinate axis corresponding to the field which he or she wants to switch over using a mouse, etc., and inputs an instruction on which of the higher and lower order hierarchies he or she wants to display. Besides the configuration in which an instruction is directly input on the graph, it can also be configured so that a menu screen is prepared for inputting an instruction to switch over hierarchy.

When the user interface unit 2 detects the instruction, it switches over the display according to the instruction. In FIG. 25 "country" is selected, and "maker", its lower order hierarchy, is displayed.

Figure 26:
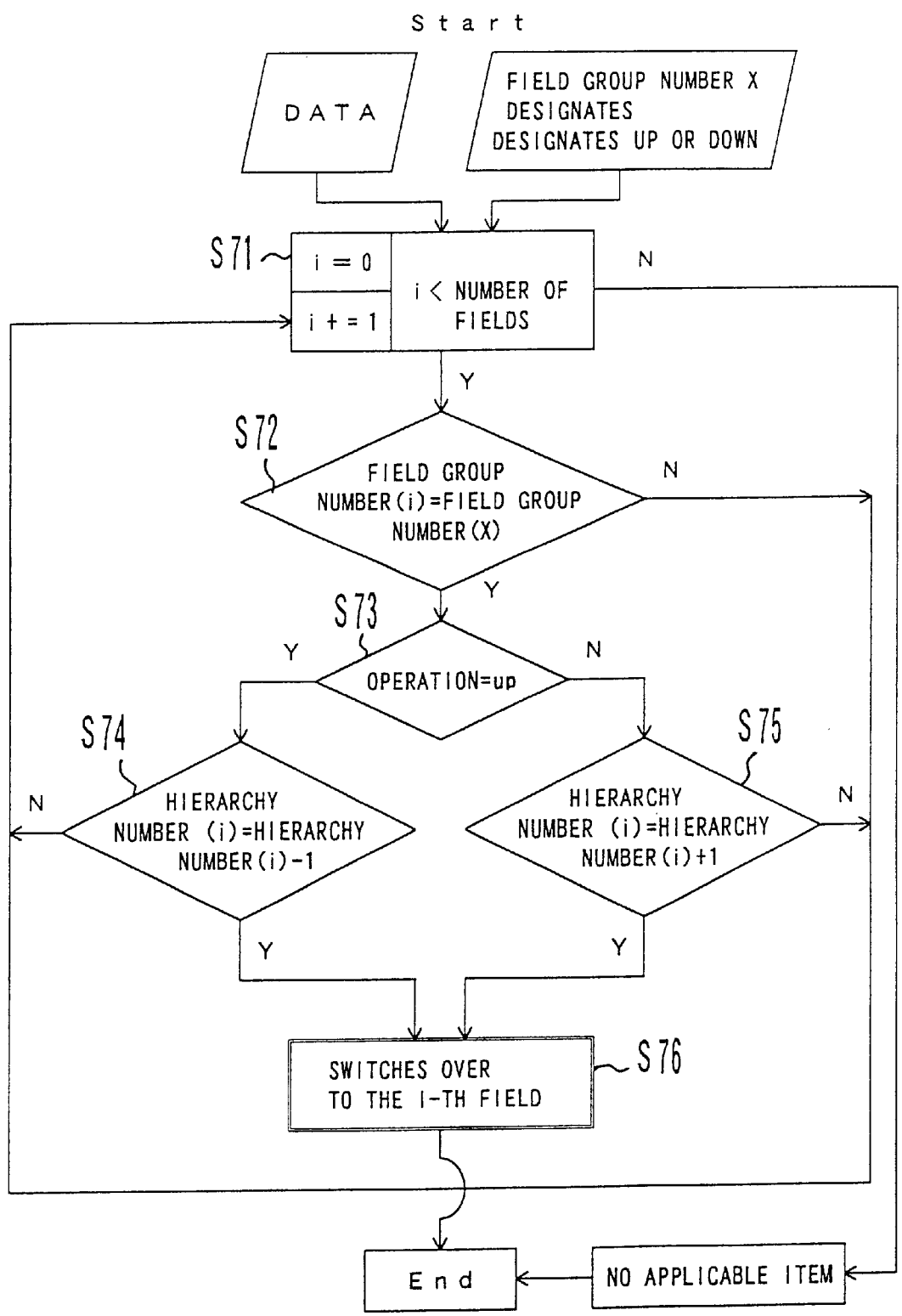
FIG. 26 is a flowchart showing the process of switching over the hierarchy of a displayed field.

FIG. 26 is a flowchart showing the process of switching over the hierarchy of the displayed field. The process of this flowchart is executed by the user interface unit 2. It is assumed here that the user selects a coordinate axis of which the field number is "X". "Up" and "down" are instructions to display higher and lower order hierarchies, respectively.

Step S71 shows the process of extracting each of the fields one by one and executing the process of steps S72 and after. In step S72, the field group number added as hierarchical information for the field extracted in step S71 is detected, and it is judged whether or not the detected field group number coincides with the field group number corresponding to the axis selected by the user. If they coincide with each other, the flow proceeds to step S73, and if they do not coincide with each other, it returns to step S71 and the next field is extracted.

In step S73, it is judged whether or not the user's instruction is "up". If it is "up", the flow proceeds to step S74, and if it is not "up", it is judged that the user's instruction is "down", and it proceeds to step S75. In step S74, it is judged that the hierarchical number of the hierarchical information added to the field extracted in step S71 can be decremented. Then, if the hierarchical number can be decremented, it is decremented. If the hierarchical number cannot be decremented, the flow returns to step S71. On the other hand, in step S75, it is judged that the hierarchical number of the hierarchical information added to the field extracted in step S71 can be incremented. Then, if the hierarchical number can be incremented, it is incremented. If the hierarchical number cannot be incremented, the flow returns to step S71. In step S76, the data on the field with the hierarchical number updated in step S74 or S75 is displayed on the coordinate axis selected by the user.

The examples shown in FIGS. 24 and 25 are described below by referring to the above flowchart. Namely, the case where the user selects "country" and displays its lower order hierarchy is described below. First, the user interface unit 2 refers to the multi-divisional data shown at the bottom of FIG. 24 and detects that the field group number corresponding to the coordinate axis selected by the user is "1" (step S71 and S72). Then, when the user interface unit 2 recognizes that the user's instruction is "down", it increments the hierarchical number of the hierarchical information added to "country" and obtains "1–2" (steps S73 to S75). Then, the user interface unit 2 extracts "maker" as the field of which the hierarchical information is "1–2", and switches over the axis selected by the user from "country" to "maker".

Next, an example for displaying the result of an association rule generation as one method of the data mining process is described below. In the upper table of FIG. 27, an example showing the result of the association rule generation obtained by the engine unit 6 is shown. In this example, the probability of obtaining the "result" estimated beforehand when a certain "condition" is satisfied, etc., is calculated. For example, in the first record "support value" and "degree of confidence" are calculated as data showing the correlation between people who buy bread and butter, and people who buy milk and jam.

In this embodiment, when the control unit 5 receives the result of the association rule generation obtained by the engine unit 6, it adds "rule number" as a new field for displaying the analysis result as a graph. Here, "rule" corresponds to the combination between "condition" and "result" used in the association rule generation, and each record corresponds to one of the rules. In the example shown in the upper table of FIG. 27 rule numbers "1" and "2" are assigned to the first and second records, respectively. When there are a plurality of elements (called "items" in the association rule generation) in the condition or result part of each rule, the control unit 5 analyzes those, and develops them into a plurality of records. The same rule number is assigned to each record developed from one rule. The output of the control unit 5 is shown in the lower table of FIG. 27.

Figure 28:
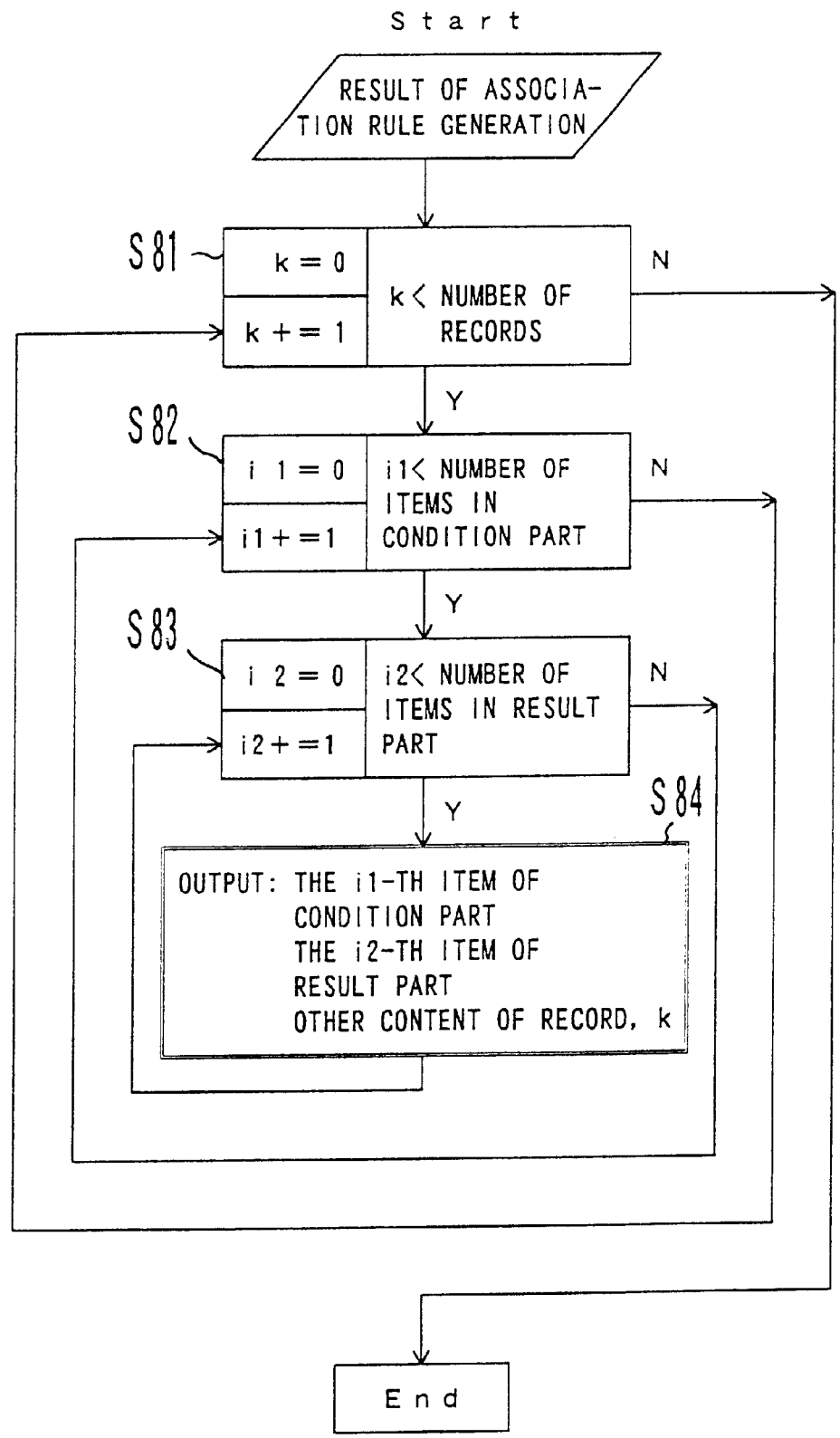
FIG. 28 is a flowchart showing the data converting process executed to display the result of an association rule generation as a graph.

FIG. 28 is a flowchart showing the data converting process executed to display the result of the association rule generation as a graph. The process in this flowchart is executed by the control unit 5.

Step S81 shows the process of extracting records of the analysis result one by one, and executing steps S82 and after. Step S82 shows the process of extracting items from the condition part of the records extracted in step S81 one by one, and executing steps S83 and after. Step S83 shows the process of extracting items from the result part of the records extracted in step S81 one by one, and executing steps S84 and after. In step S84, the items extracted in steps S82 and S83, the succeeding contents in the records extracted in step S81, and the record number of the records extracted in step S81, are output.

The flowchart shown in FIG. 28 is described below using the example shown in FIG. 27. First, in step S81 the first record is extracted, in step S82 "bread" is extracted from the condition part of the record as the first condition item and in step S83 "milk" is extracted from the result part of the record as the first result item. In step S84, together with these items, "support value =0.40", "degree of confidence=0.50" and "record number=1" are also output. This record number is a rule number.

Figure 29:
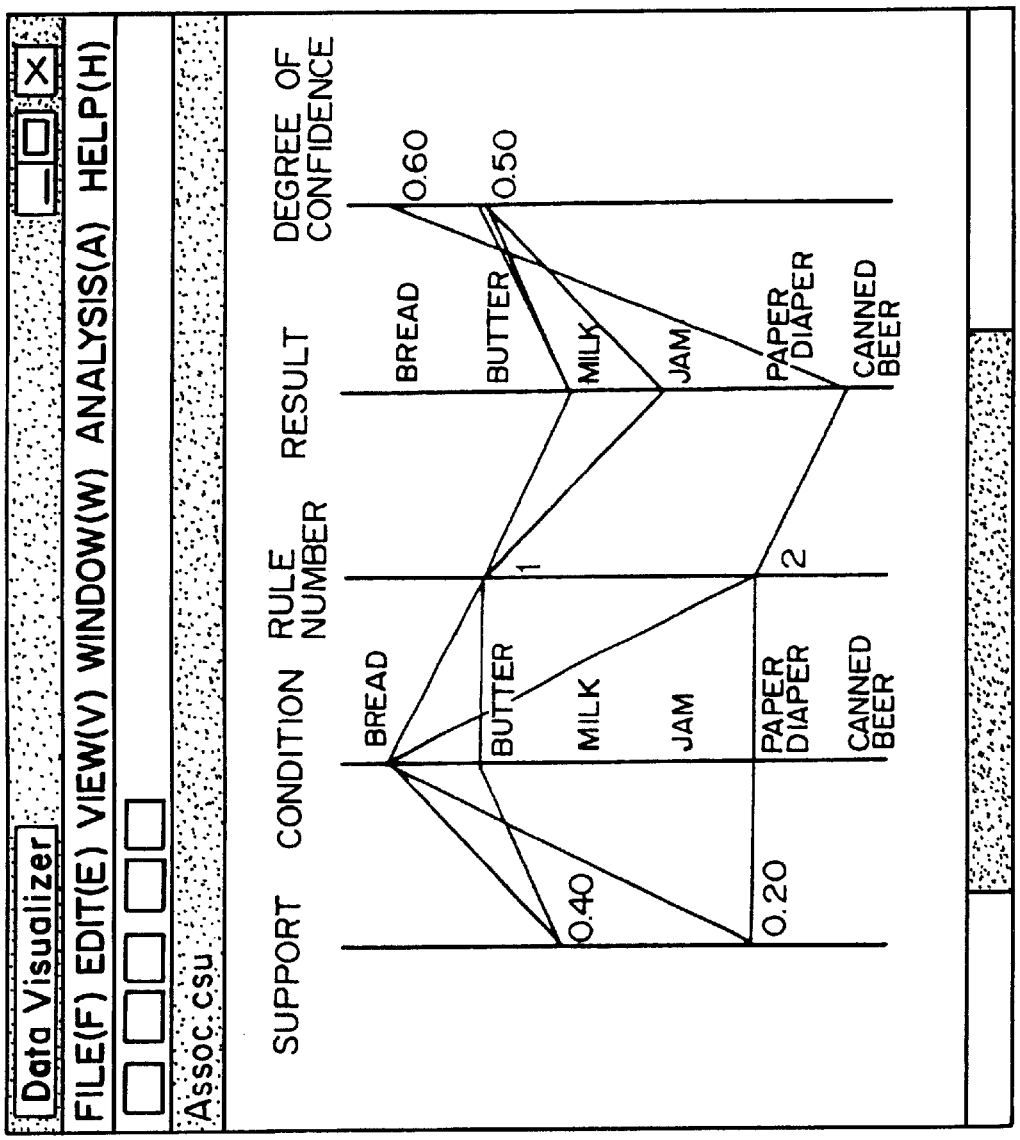
FIG. 29 shows an example of a display of the result of an association rule generation as a graph.

FIG. 29 shows an example of displaying the result of the association rule generation as a graph. This graph is displayed by the user interface unit 2 based on the output of the control unit 5. As shown in FIG. 29, the graph displaying the result of the association rule generation is provided with a coordinate axis corresponding to the rule number assigned by the control unit 5, and a line for each record passes through the rule number corresponding to the record. Each rule is also developed for each item in the displayed graph. Although a support value and degree of confidence are taken as the result of an association rule generation h ere, information volume (entropy), etc. can also be calculated in the association rule generation. In this case, the information volume can also be displayed as a graph together with both the support value and degree of confidence.

Figure 31:
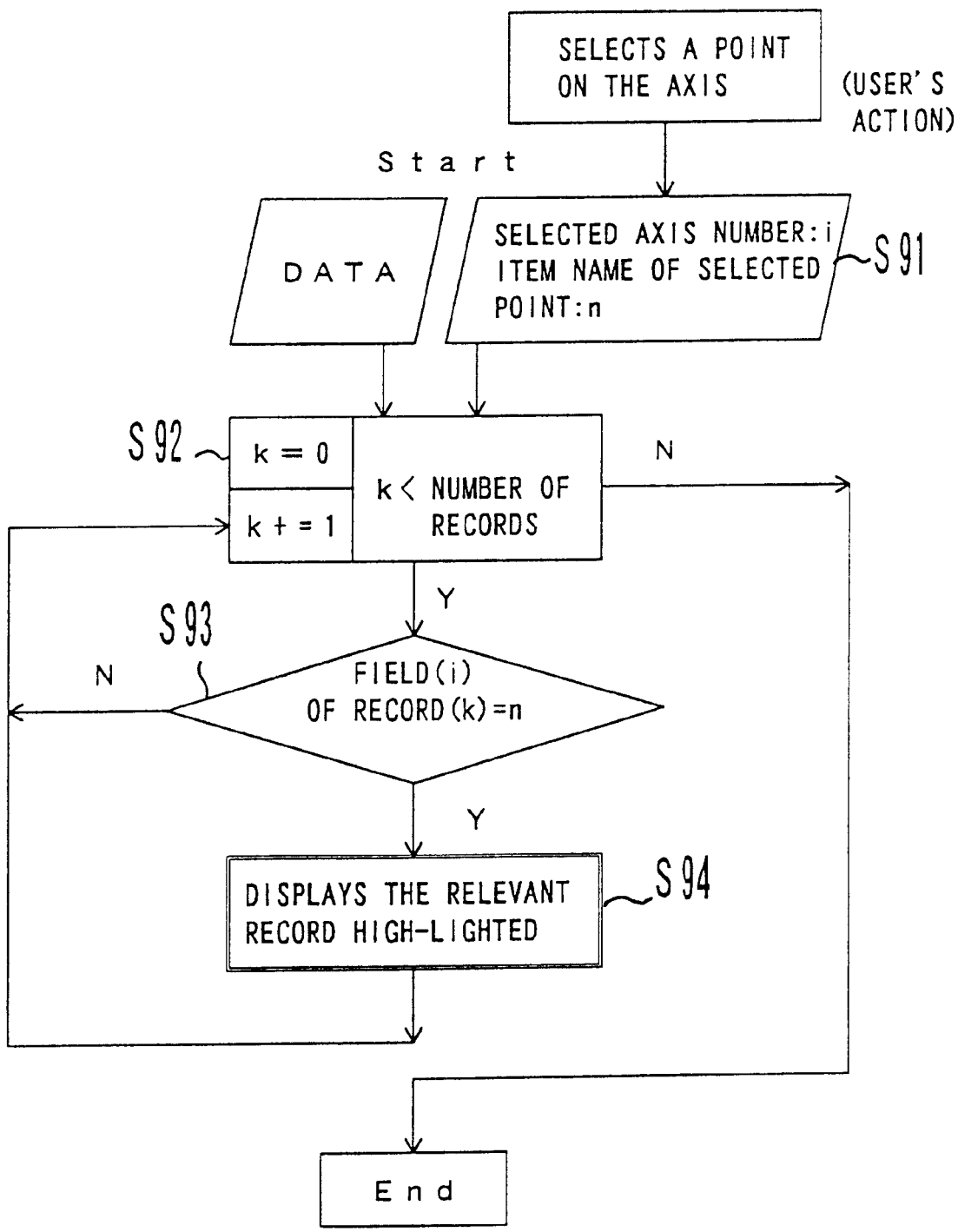
FIG. 31 is a diagram explaining the flow of the process of displaying a record with a predetermined value high-lighted in a specific field.

FIGS. 30 and 31 are diagrams explaining the process of displaying the record with a predetermined value in a certain specific field high-lighted. In the graph of this embodiment, each field is displayed as a coordinate axis, and a value in each field is displayed as a point on the coordinate axis. Namely, the desired value in the specific field is displayed as a point on the coordinate axis of the graph. Therefore, to select a desired value in the certain specific field, the user may designate a point corresponding to the desired value on the coordinate axis corresponding to the field, or a menu for inputting the desired point in the screen can also be prepared and used.

FIG. 30 is a diagram showing the process procedures of the user interface unit 2 at the time when the user selects the desired point on the coordinate axis of the graph. First, the user interface unit 2 detects that any point has been selected on the displayed coordinate axis. Namely, the user interface unit 2 detects the selected field and a value in the selected field. Here, the user interface unit 2 has a map for arranging data composing each record on the coordinate axis as explained referring to FIGS. 5 and 6. The user interface unit 2 extracts records passing through the point selected by the user using this map. Then, the user interface unit 2 displays each of extracted records high-lighted.

Figure 33:
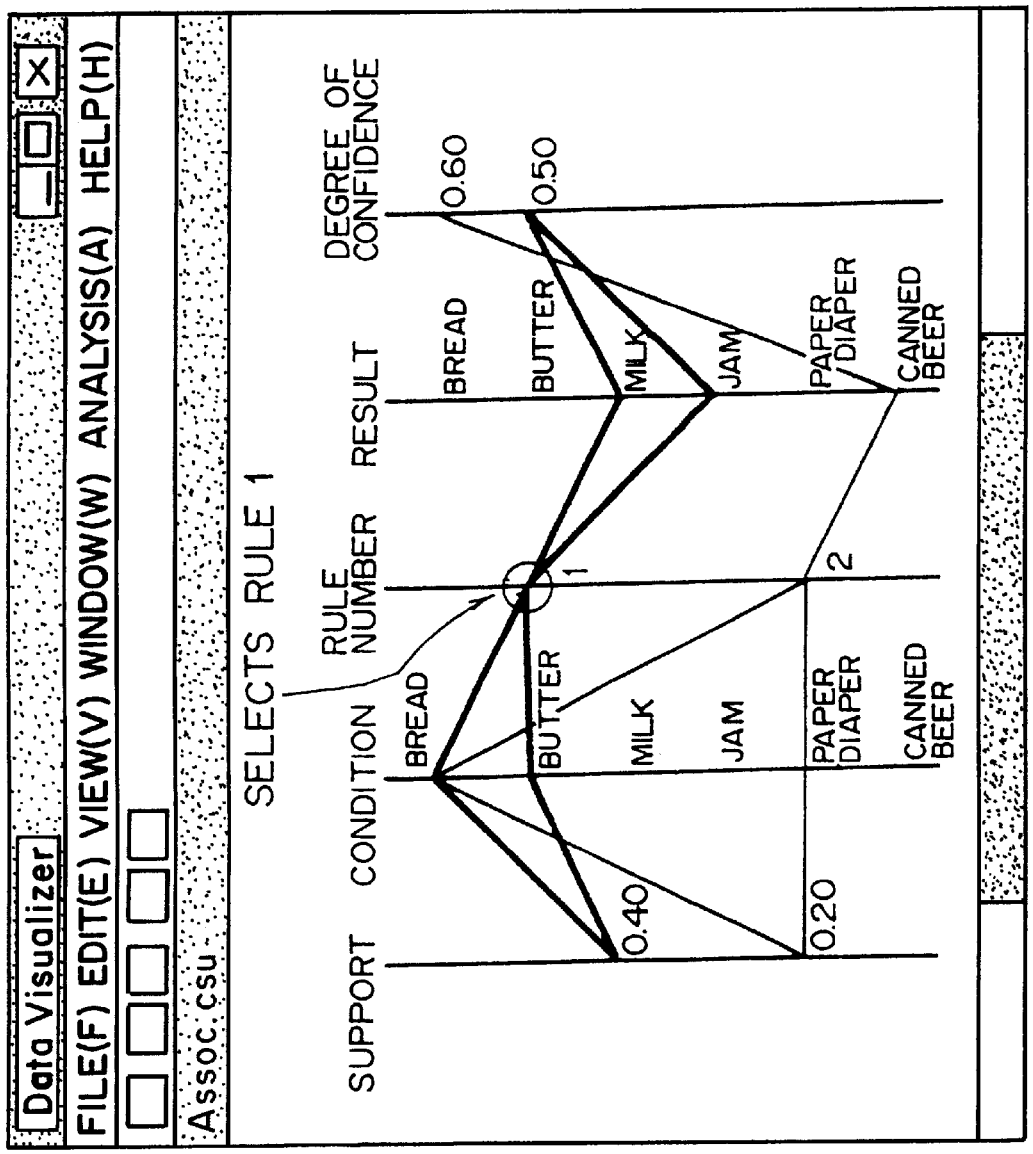
FIG. 33 shows an example (No.2) of the high-lighted display.

Examples of the high-lighted display are shown in FIGS. 32 and 33. In the drawings, high-lighted records are displayed by a thick line. When displaying the relevant record high-lighted, for example, the color and lightness of a line displaying a record are made different from those of other records. FIG. 32 shows an example of the high-lighted display in the case where the user designates "bread" on the coordinate axis corresponding to "Condition". FIG. 33 shows an example of the high-lighted display in the case where the user designates "1" on the coordinate axis corresponding to "rule number".

Since by introducing a displaying method such as this, it becomes possible to display a record with a specific element (commodity in FIG. 32) or a specific rule number distinguishing it from other records, the displaying method such as this becomes helpful when analyzing the relation between a record and the characteristics of the record based on its elements. Particularly, a displaying method such as this is useful for the result analysis of the association rule generation.

FIG. 31 is a flowchart explaining the procedures shown in FIG. 30. This flowchart shows the process of the user interface unit 2 after the user's selection of the desired point on the coordinate axis of the graph.

In step S91, the user's instruction to select is detected. Namely, the number of the selected axis (field number) i and the name of the selected item n (or data value) are detected. Step S92 shows the process of extracting records displayed in a graph one by one, and executing steps S93 and after. In step S93, it is judged if the data in a field i in the record extracted in step S92 coincides with the item name n detected in step S91. If they coincide with each other, in step S94, the record is displayed high-lighted. On the other hand, if they do not coincide with each other, the flow returns to step S92 and the next record is extracted.

Figure 34:
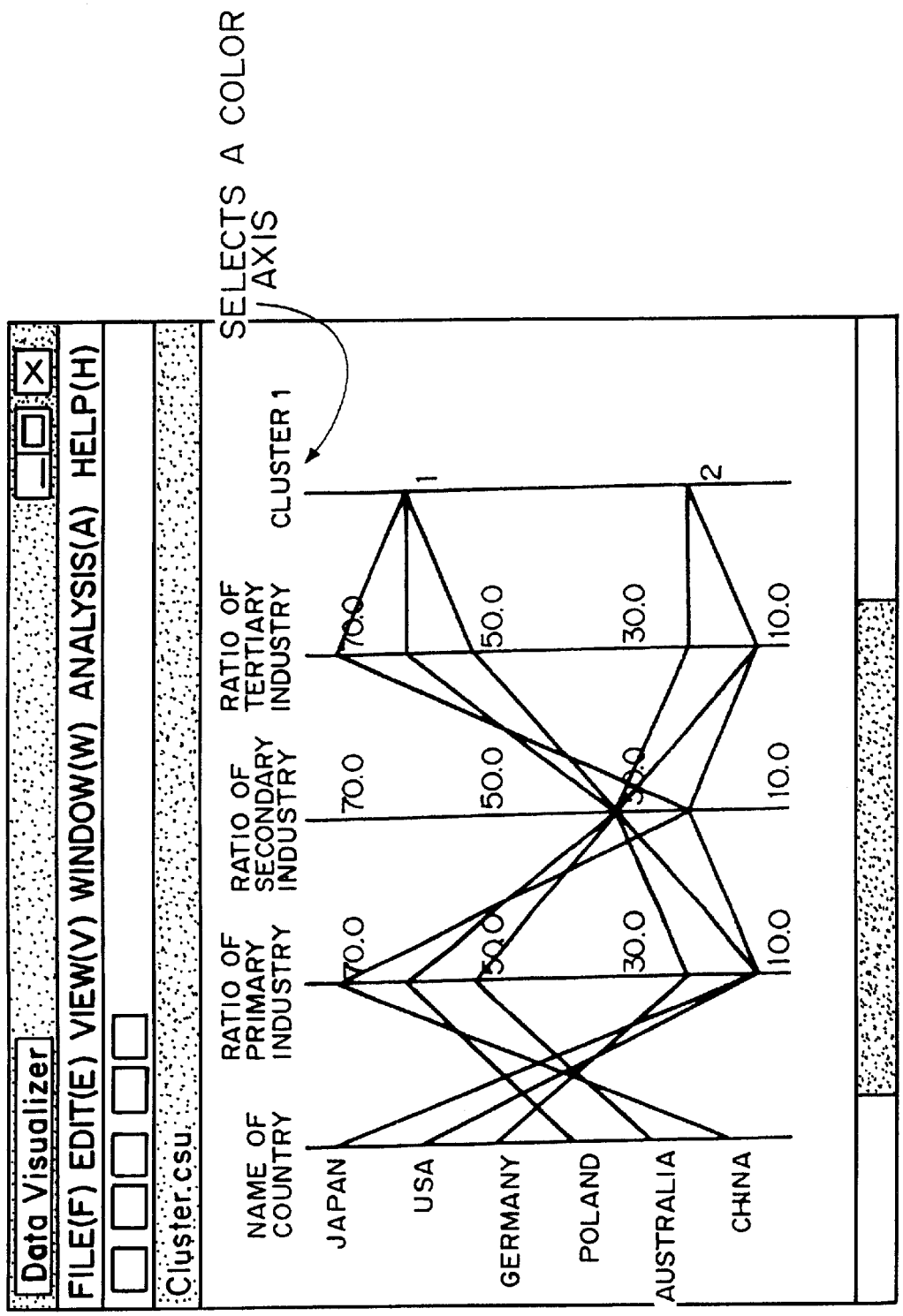
FIG. 34 shows an example (No.1) of the colored display of a clustering result.

FIG. 34 shows a display example showing the result of a clustering process, one of the data mining methods. In a clustering process, target records are divided into two or more classes according to the designated class value (teacher value). In the example shown in FIG. 34, six records are divided into two classes. The coordinate axis to the right (cluster 1) is added as an axis representing the result of the clustering process. The process of adding a coordinate axis has already been described in FIGS. 19 to 23.

Figure 35:
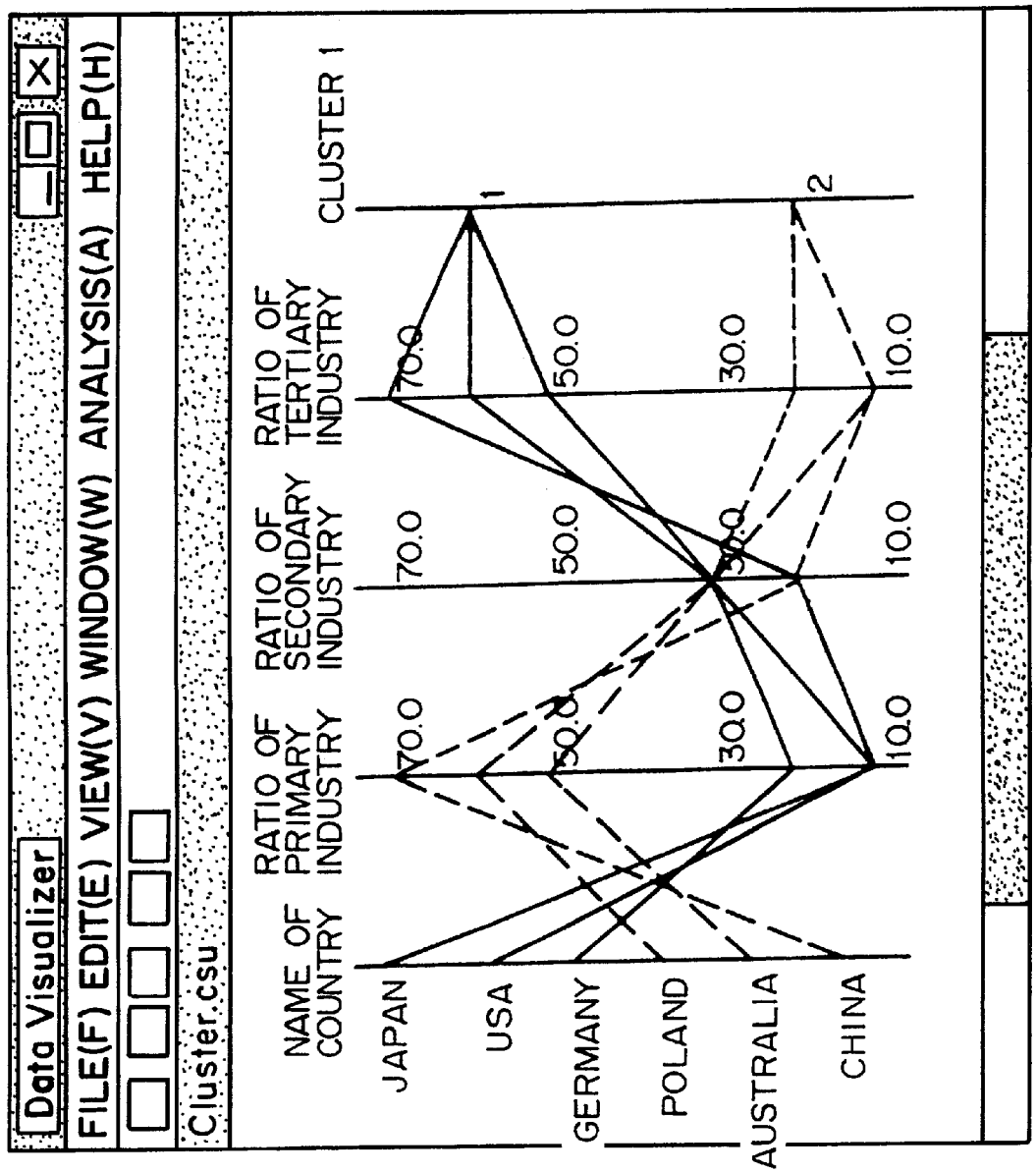
FIG. 35 shows an example (No.2) of the colored display of a clustering result.

In this embodiment, the color of a line representing a record can be changed according to a data mining result. In this case, as shown in FIG. 34, the user selects a coordinate axis (in this case, the coordinate axis of "cluster 1") and inputs an instruction that he or she wants to display in a different color. FIG. 35 shows an example in which lines representing each cluster of records are displayed in different colors according to the result of the clustering. In FIG. 35, different colors are represented by both solid lines and broken lines.

Figure 36:
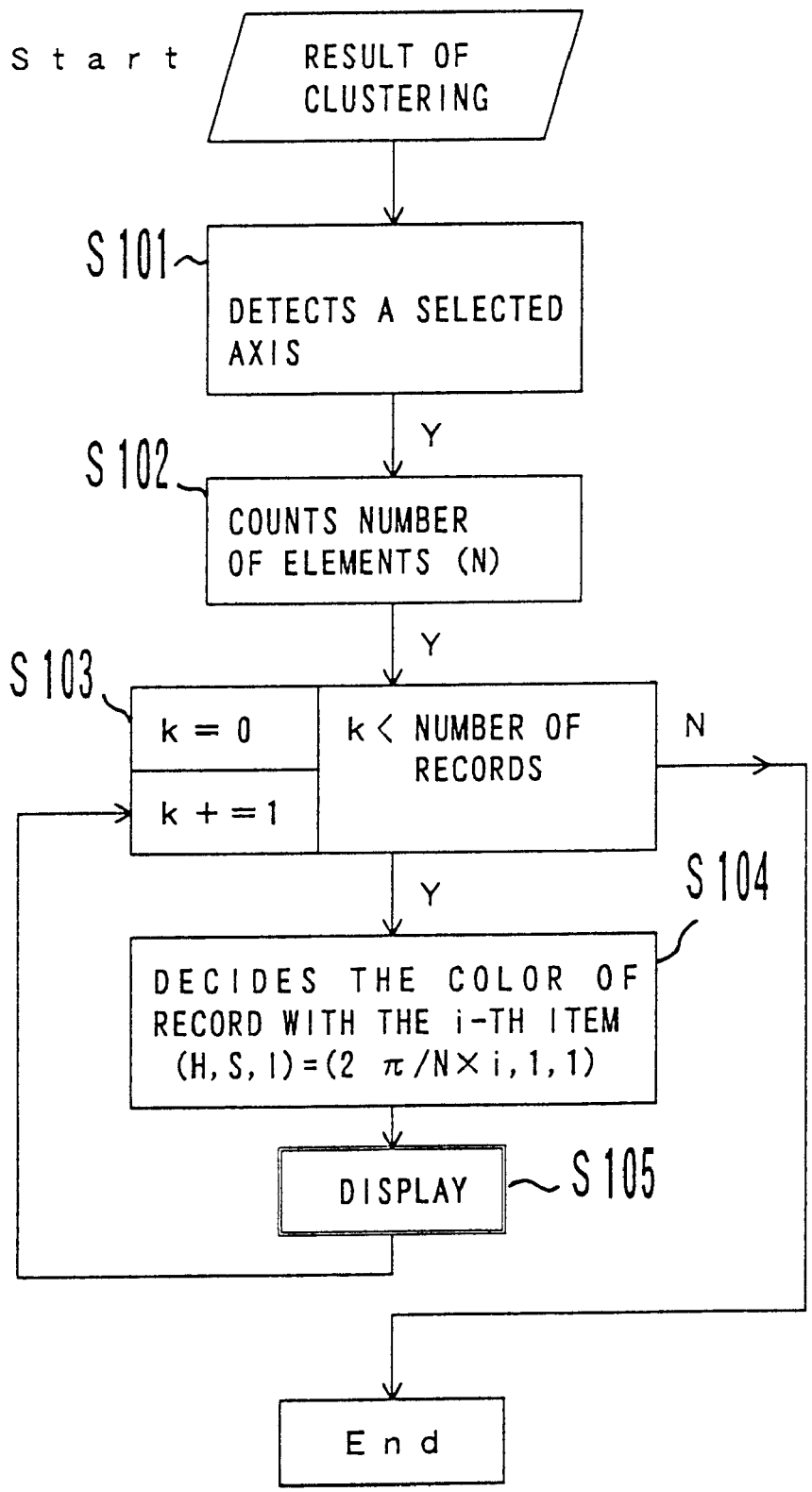
FIG. 36 is a flowchart showing the colored-displaying process based on the clustering result.

FIG. 36 is a flowchart explaining the process of a color display. The process in this flowchart is executed by a user interface unit 2. This flowchart shows the process after the user's selection of a desired coordinate axis while displaying the result of a clustering.

In step S101, the coordinate axis selected by the user is detected. In step S102, the number of the elements on the coordinate axis detected in step S101, is counted. The number of the detected elements is assumed to be N. An element number (1 to N) is attached to each element. Step S103 shows the process of extracting records one by one, and executing steps S104 and after. In step S104, a color is decided for displaying each extracted record. Here, out of three color elements (H: hue, S: saturation, I: lightness) its hue is decided to be adjusted. For example, to represent a record including the i-th element, its hue is "$2\pi i/N$". For saturation and lightness of the color, the maximum values are set. In step S105, the relevant record is displayed according to the values of H, S and I decided in step S104. Since records belonging to different classes are represented by different colors, if the color and color elements of each record are decided as described above, the distribution of the entire cluster is easy to understand when the result of the clustering is displayed in different colors.

The flowchart is explained using the example shown in FIGS. 34 and 35. When "cluster 1" is selected in the state shown in FIG. 34, in step S102 the number of elements, "2" is counted. Then, in step S104 (H, S, I)=($\pi$, 1, 1) and (H, S, I)=($2\pi$, 1, 1) are set for records belonging to classes 1 and 2, respectively. By drawing lines representing each cluster of records according to these values of H, S and I, the records are displayed in different colors according to their classes.

Although in this embodiment lines representing a cluster of records are displayed in different colors based on the result of the clustering, the display in different colors can also be made based on other field elements. For example, when "country name" is selected, six colors are used to display each record, and a line representing each record is displayed in a different color. Although in this embodiment, clusters of records are displayed in different colors based on the result of the clustering, each record can also be displayed in a different color based on the analysis result obtained by another data mining method.

Figure 37:
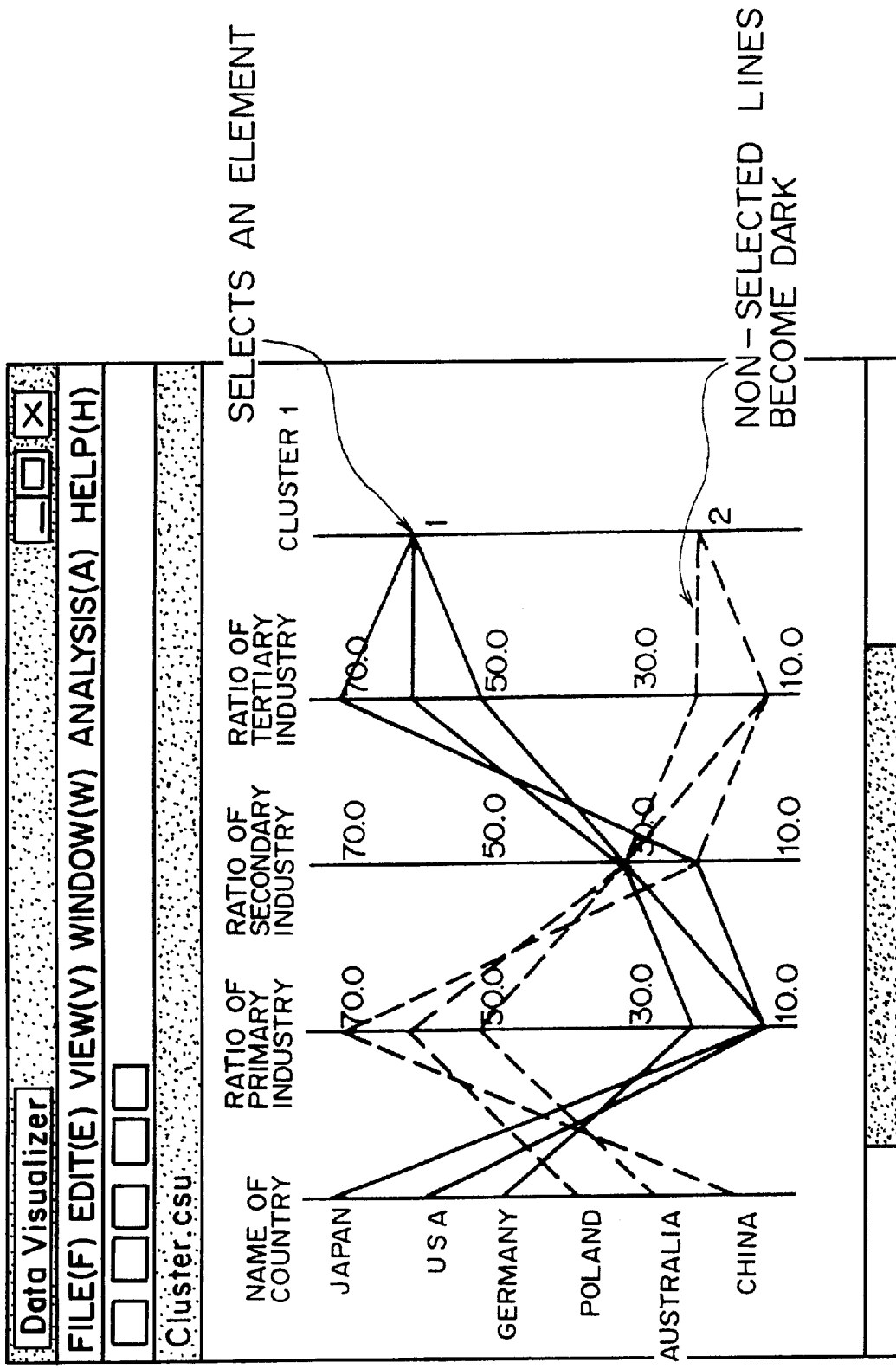
FIG. 37 shows a display example displaying a record distinguished according to a selected element.

In this embodiment, by selecting an element obtained from the result of the data mining process, records with the selected element can be displayed distinguished from other records. For example, when the user has selected "class 1" on the coordinate axis of "cluster 1", the lightness or saturation of records other than the records belonging to class 1 are reduced and records other than the records belonging to class 1 are displayed by dark lines. FIG. 37 shows a display example of selecting class 1. In FIG. 37, a solid line and a dotted line represent normal lightness and reduced lightness (dark lines), respectively.

FIG. 38 is a flowchart showing the process of displaying records distinguished according to the selected element. The process in this flowchart is executed by the user interface unit 2. This flowchart also shows the process after the user's selection of the desired element while displaying the result of a clustering process.

The step S111, the element selected by the user (in the case of clustering records) is detected. Step S112 is the process of extracting records one by one and extracting steps S113 and after. In step S113, it is judged whether or not the extracted record includes the element selected by the user. If the selected element is included in the record in step S114, the values of H, S and I corresponding to the record are set without being changed. If the selected element is not included, in step S115, the value of lightness or saturation corresponding to the record is reduced by half. Here, the value of the lightness is multiplied by 0.5. In step S116, the relevant record is displayed according to the values of H, S and I decided in step S114 or S115.

Using the above process, records including the selected e seem to be displayed high-lighted. A display like this is particularly effective when a specific cluster is focused on while displaying the result of a clustering process.

Although in this embodiment, the case where a specific element is selected while displaying records in different colors for each class, the present invention does not necessarily presume the state where records are displayed in different colors for each class beforehand. Although in this embodiment, a clustering process is used, this can also be applied to the results obtained by other data mining methods.

In the data mining methods, there is a method such as a clustering in which a plurality of results with different hierarchies are obtained. In the clustering process, the result can be displayed as a tree diagram. In the tree diagram shown in FIG. 39, record numbers are arranged horizontally and the degree of scattering (for example, dispersion value) in the case of grouping a plurality of records together is displayed vertically. Namely, this tree diagram shows the fluctuations of the degree of scattering in grouping records into clusters.

By designating a proper threshold of the degree of scattering in the tree diagram, the desired number of clusters can be obtained. In the examples shown in the center and right tree diagrams in FIG. 39, two clusters (four records on the left side and seven records on the right side) and three clusters (four records on the left side, three records in the middle and four records on the right side) are obtained, respectively.

As described above, the control unit 5 adds each result of the data mining process to the multi-dimensional data as one field. When a plurality of data mining results with different hierarchies are obtained, the control unit 5 attaches hierarchical information to the target multi-dimensional data of the data mining process. This hierarchical information is the same as the information already described referring to FIGS. 24 to 26.

Figure 39:
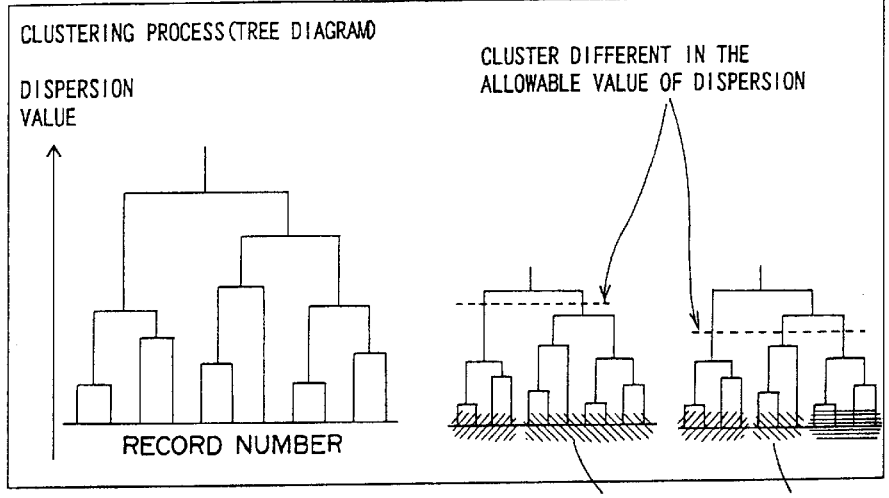
FIG. 39 is a diagram explaining an example of adding the clustering result of a different hierarchy as hierarchical data.

The output of the control unit 5 is shown in the table at the bottom of FIG. 39. Here, each clustering result in the highest order hierarchy and the second highest order hierarchy is added to the multi-dimensional data as one field. The highest and the second highest order hierarchies are the results obtained by classifying all records into two clusters and three clusters, respectively. Although only two hierarchies are shown in FIG. 39, a far lower hierarchy can also be obtained. Each of these hierarchies is added to the multi-dimensional data as one field. As described above, the output of the control unit 5 is transferred to the user interface unit 2 through the input converting unit 3. The user interface unit 2 displays the clustering result on a display unit 8 according to the received data.

Figure 40A:
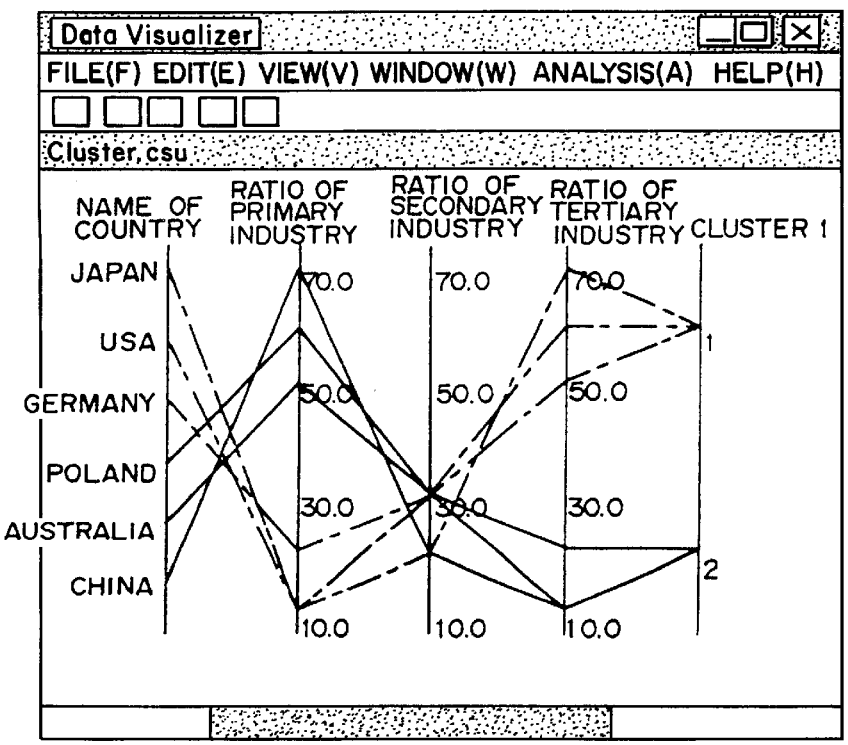
FIGS. 40A and 40B show examples of switching over between and displaying a plurality of clustering results.
Figure 40B:
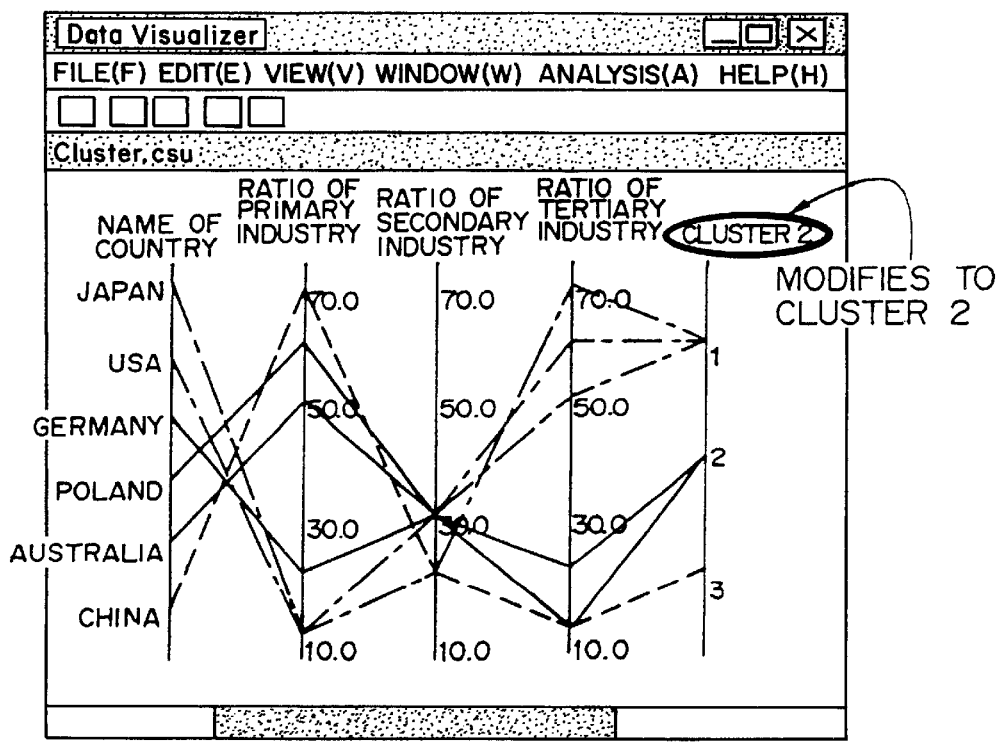

FIGS. 40A and 40B show an example of-switching over between and displaying the clustering results with different hierarchies. In FIGS. 40A and 40B, the results of higher and lower order hierarchies, respectively, are shown When "cluster 1" is selected and an instruction is input to display its lower order hierarchy in the display state shown in FIG. 40A, the screen is switched over to the display shown in FIG. 40B. On the contrary, when "cluster 2" is selected and an instruction is input to display the higher order hierarchy in the display state shown in FIG. 40A, the screen is switched over to the display shown in FIG. 40B.

FIG. 41 is a flowchart showing the process of switching over between and displaying the clustering result with different hierarchies. This process is basically the same as the process shown in FIG. 26 and is executed by the user interface unit 2. However, in FIG. 41, the coordinate axis currently being displayed as a result of the clustering process is selected by the user.

Generally speaking, to decide the number of clusters so as to show the characteristics of multi-dimensional data in a clustering process, trial and error processing is required. It is also often necessary to judge the separation and combination of clusters due to a change in the number of clusters. In this embodiment, since it is configured that a clustering result with different hierarchies is stored in a visual data mining tool, and the results are switched over and displayed by the user's instruction, the attribute, etc. of each record in the case where the number of clusters is changed, can be shown immediately. For this reason the user can get the desired analysis result quickly.

Figure 43:
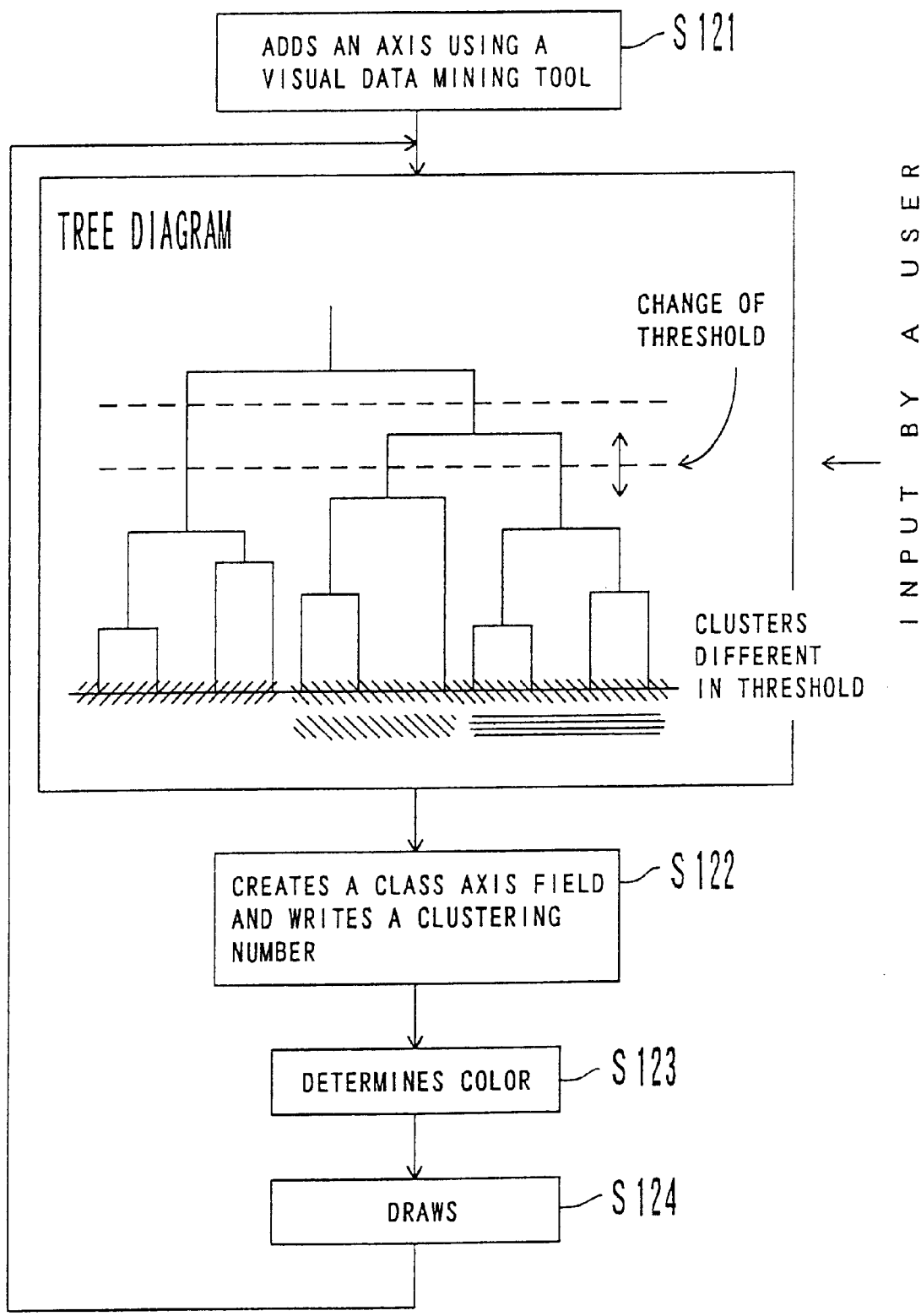
FIG. 43 is a flowchart showing the process of changing a graphic display in conjunction with a change of the set limit on a tree diagram.

FIGS. 42 and 43 show applied examples of the embodiment shown in FIGS. 39 to 41. In the embodiment shown in FIGS. 42 and 43, the tree diagram of the clustering result is displayed on the display unit 8, on the screen of which the user can set a threshold to decide the number of clusters. Then, when the cluster configuration is changed by the user's changing of the threshold using a mouse, etc., the graphic display of multi-dimensional data is changed dynamically in conjunction with the change of the threshold.

FIG. 43 is a flowchart showing the process of changing the graphic display in conjunction with the change of the threshold set for the tree diagram. The process in this flowchart is executed by the user interface unit 2.

Step S121 is the process of adding a coordinate axis to display the result of the data mining process, and is the same as the process described in FIGS. 19 to 23.

The process in steps S122 and after is executed by changing the threshold set for the tree diagram displayed on the display unit 8, whereby the cluster configuration changes.

In step S122, a cluster field corresponding to the new cluster configuration is created. This field is displayed on the coordinate axis added in step S121. A point corresponding to each cluster obtained from the new class configuration is provided on the coordinate axis. Each cluster is provided with a cluster number. In step S123, the color to be displayed is decided for each group of records belonging to each cluster. The process of the color determination is the same as the process described referring to FIGS. 34 to 36. In step S124 each record is drawn based on the color information determined in step S123.

In this embodiment, by modifying the threshold in the tree diagram which is displayed on the screen as the clustering result to the desired value, the display can be easily switched over as shown in FIG. 40. Namely, since the clusters are gradually split, for example, when the threshold is changed downward in FIG. 42, a situation in which the group of records displayed in the same color first breaks into two groups, etc.; can be dynamically seen. Accordingly, the detailed relation between the multi-divisional data and the tree diagram can be seen.

Figure 44:
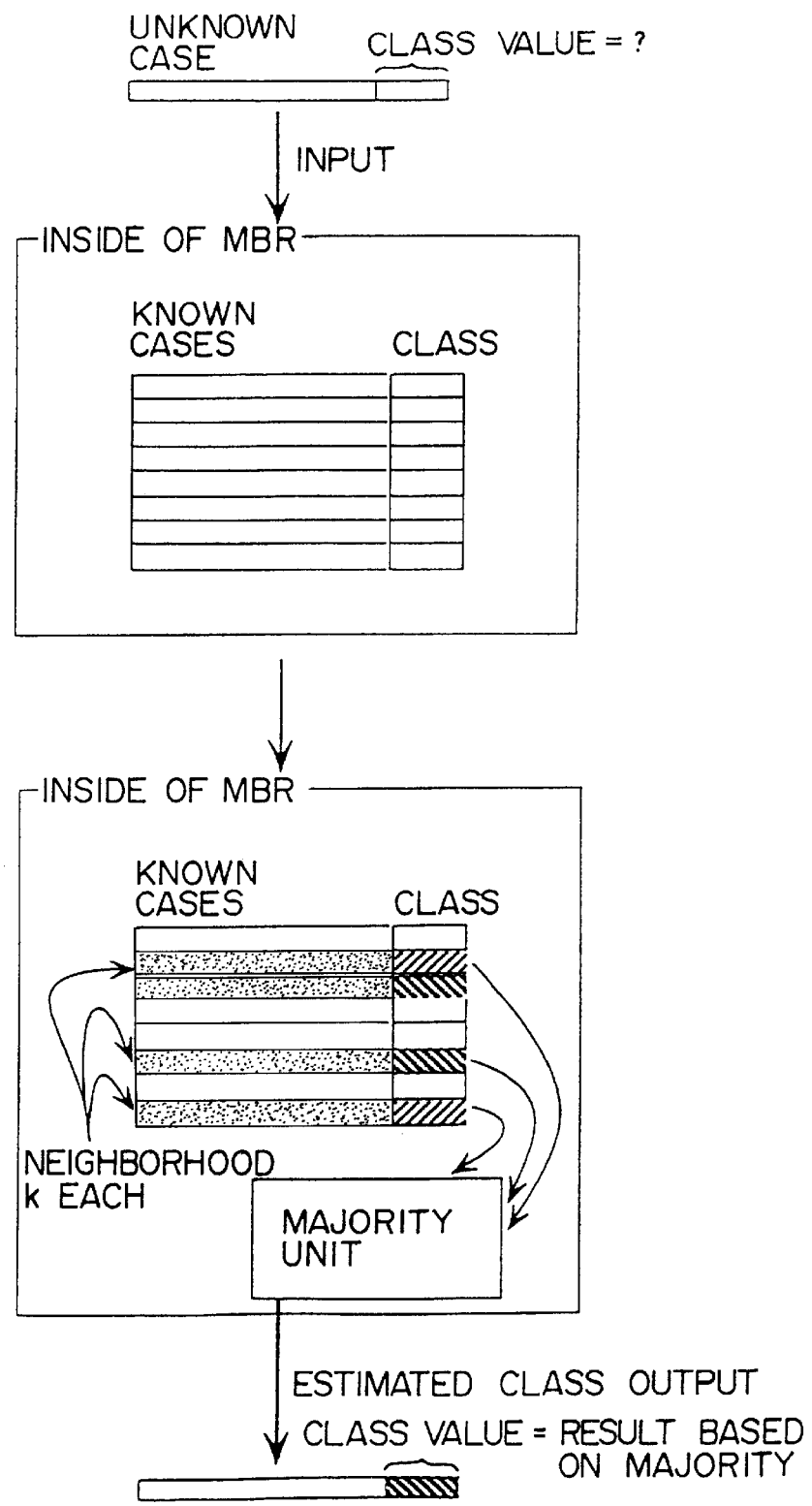
FIG. 44 is a diagram explaining an MBR process.

Next, an example of displaying the result obtained by a memory based reasoning (MBR), another one of the data mining methods, as a graph, is described below. MBR is one analyzing method for estimating the class value of an unknown case with an unknown class value, by which k cases similar to the unknown case are extracted from the known cases analyzed before, and the class value of the unknown case is judged based on the class value of the extracted known cases. At this moment k extracted cases are output as information (reasons) for judging the class value of the unknown case. FIG. 44 shows the general processes of the MBR. When the class value of the unknown case is judged from k extracted known cases, for example, a majority unit is used.

Figure 45:
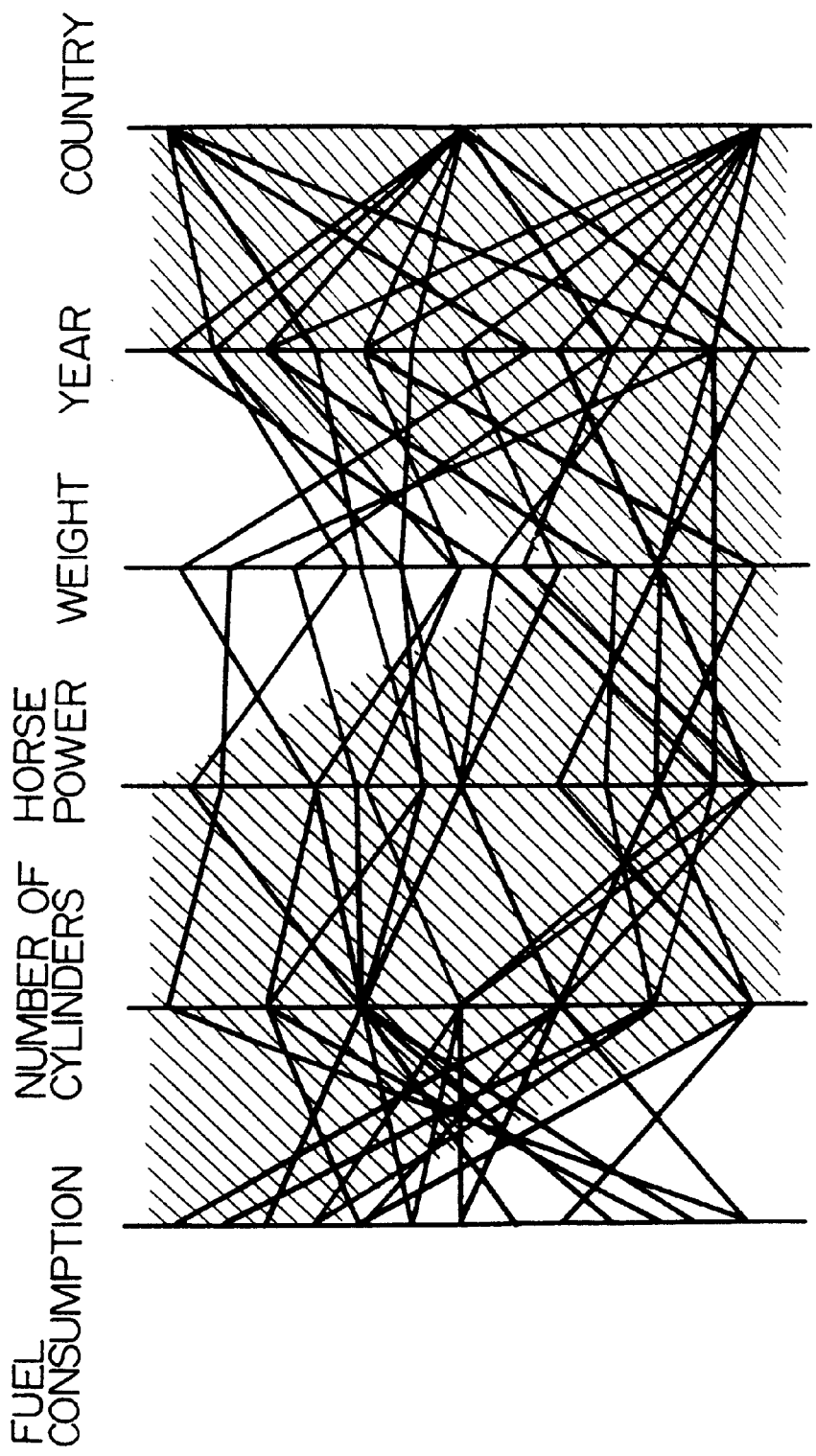
FIG. 45 is a diagram (No.1) explaining the process of displaying an MBR result as a graph.
Figure 46:
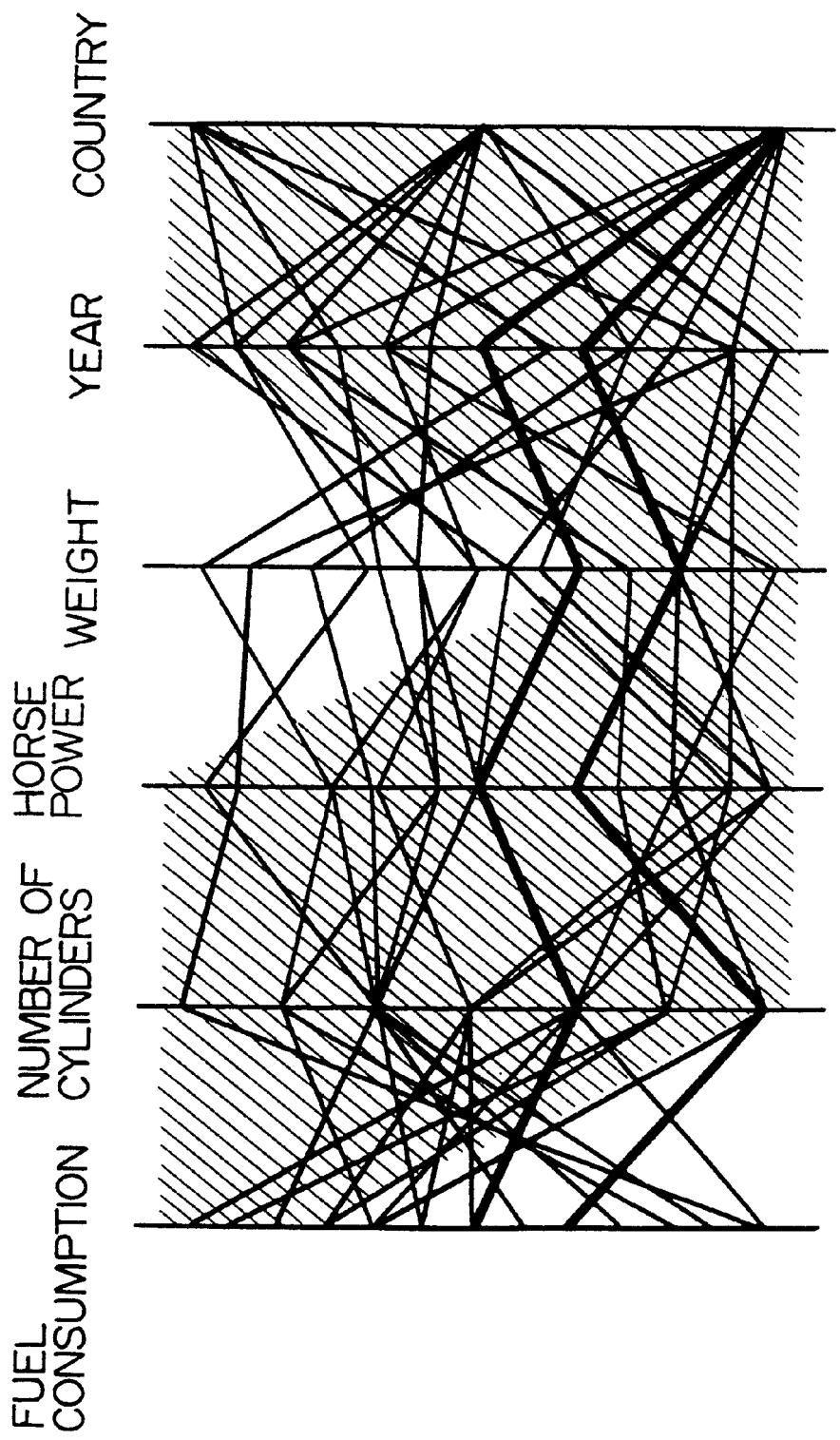
FIG. 46 is a diagram (No.2) explaining the process of displaying an MBR result as a graph.
Figure 47:
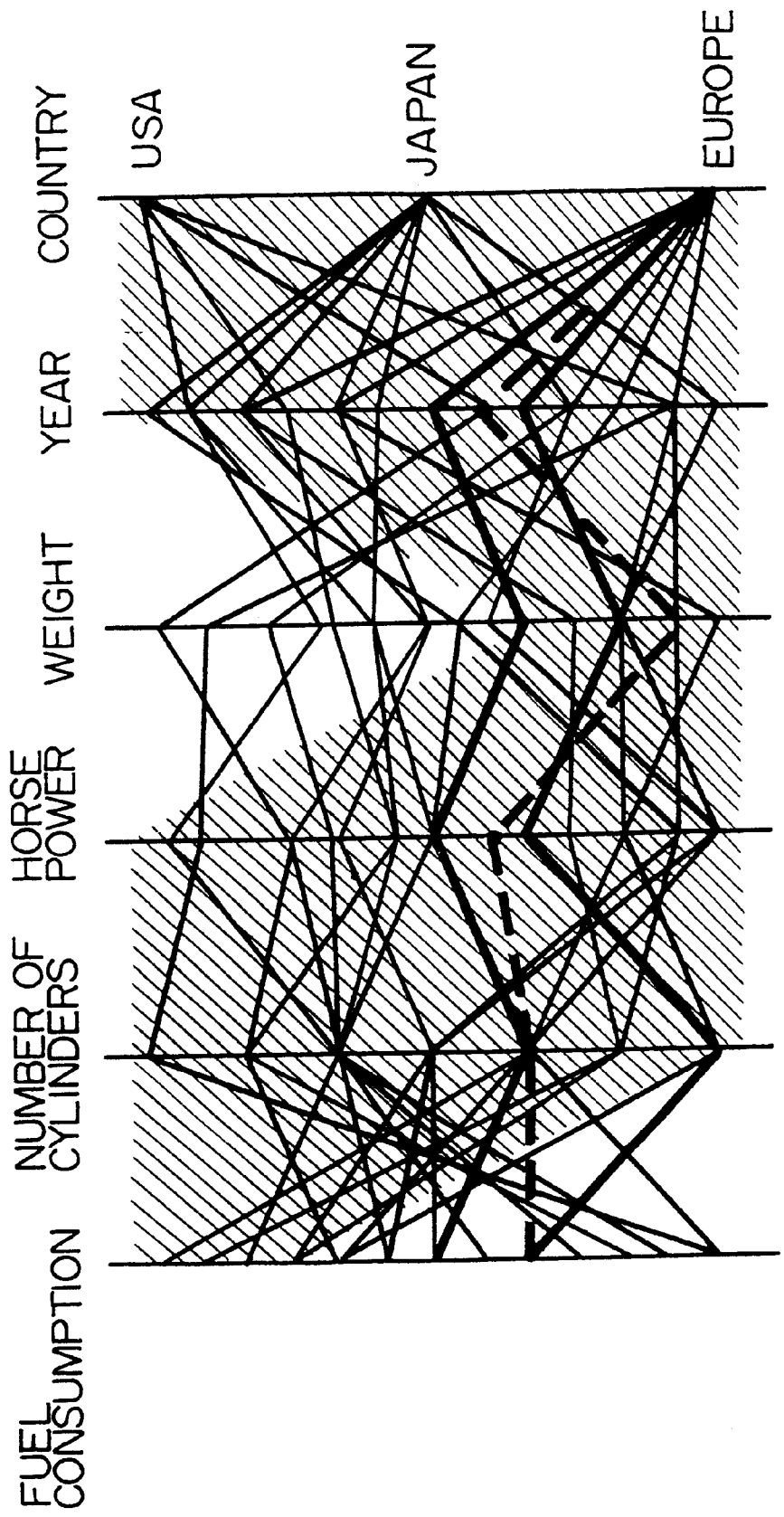
FIG. 47 is a diagram (No.3) explaining the process of displaying an MBR result as a graph.

FIGS. 45 to 47 are diagrams showing the process of displaying the MBR result as a graph. When the MBR result is displayed on a visual data mining tool, records of known cases are displayed beforehand, as shown in FIG. 45.

It is assumed here that in the unknown case "fuel consumption" to "year" are known and "country (or district)" is unknown. In this case, "country" corresponds to "class" shown in FIG. 44. If an unknown case is given, k records similar to the unknown case are extracted from the known cases analyzed before. Then, "country" is taken out of k extracted known cases, and the data most reliable as "country" is searched using the majority unit. It is assumed here that the result of the majority unit search is "Europe". The above process is executed by the engine unit 6. The engine unit 6 transfers this result to the visual data mining tool 1 through the control unit 5.

When the user interface unit 2 receives the analysis result of the MBR from the engine unit 6, it displays k extracted known cases distinguished from other known cases (thick solid lines in the drawing) as shown in FIG. 46. The user interface unit 2 also draws the record of the unknown case on the graph judging that "country" of the unknown case is the result of the determination by the engine unit 6 (i.e., Europe) as shown in FIG. 47. This unknown case is displayed distinguished from other cases, for example, in different colors (broken lines in the drawing).

In this embodiment, the result of the MBR can be displayed uniformly on the visual data mining tool. Since the information (k known cases) used when judging on the class of an unknown case are also displayed, the process of the judgement and its reasoning can also be obtained.

Figure 48A:
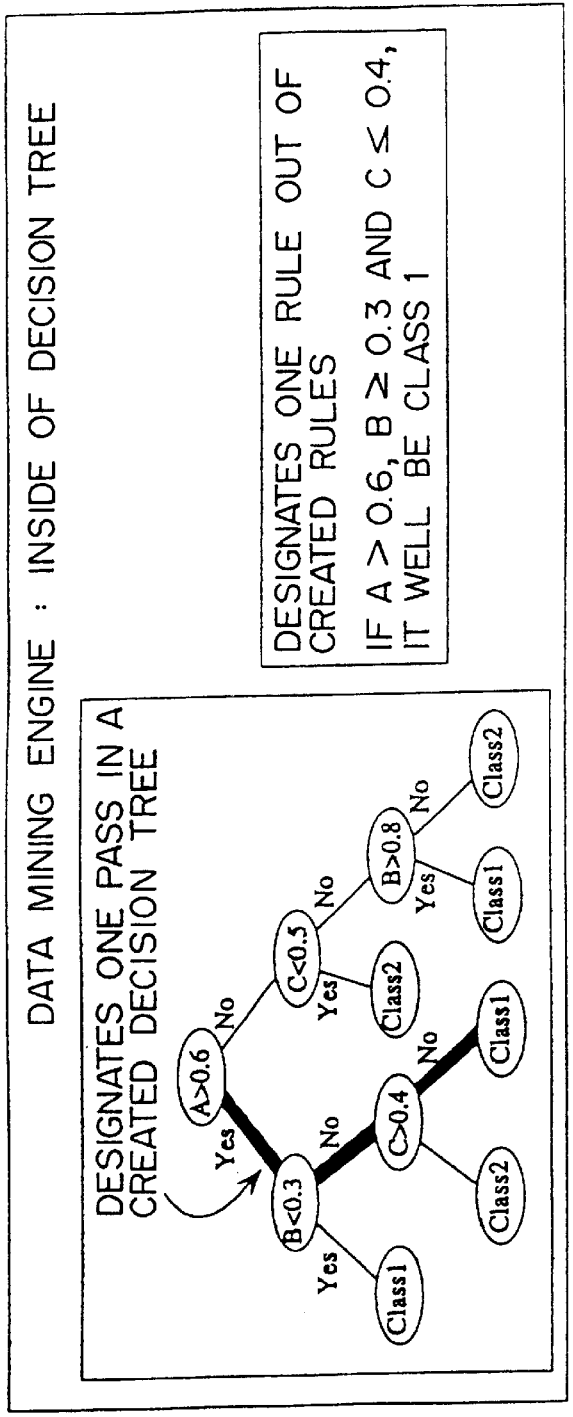
FIGS. 48A and 48B are diagrams showing the process of converting the result of a decision tree analysis to range information on a graph.

Next, an example of displaying the result of a decision tree analysis, another of the data mining methods, is described below. In the decision tree analysis, a multi-branch tree with one node for a branch-point or a plurality of "rules" grouped and expressed in the form of "if~then" can be obtained as shown in FIG. 48A. In this embodiment, a specific area on the displayed graph can be designated based on a decision tree pass obtained from the result of the decision tree analysis, or by one rule.

The decision tree analysis is executed by the engine unit 6 and its output is passed to the control unit 5. The result of the decision tree analysis is expressed by one or more decision tree passes or rules in the form of an if-sentence. It is assumed here that one pass or rule is designated and output from these decision tree passes or rules. In the example shown in FIG. 48, each of A to C corresponds to one field, and "class" is also handled as one field.

Figure 48B:
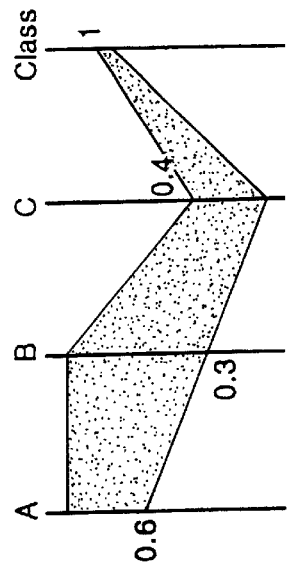

When the control unit 5 receives one pass or rule as a result of the decision tree analysis, it creates range information on the graph displaying multi-dimensional data, based on it. An example of this information is shown in FIG. 48B. The control unit 5 transfers this range information to the visual data mining tool 1.

Figure 49:
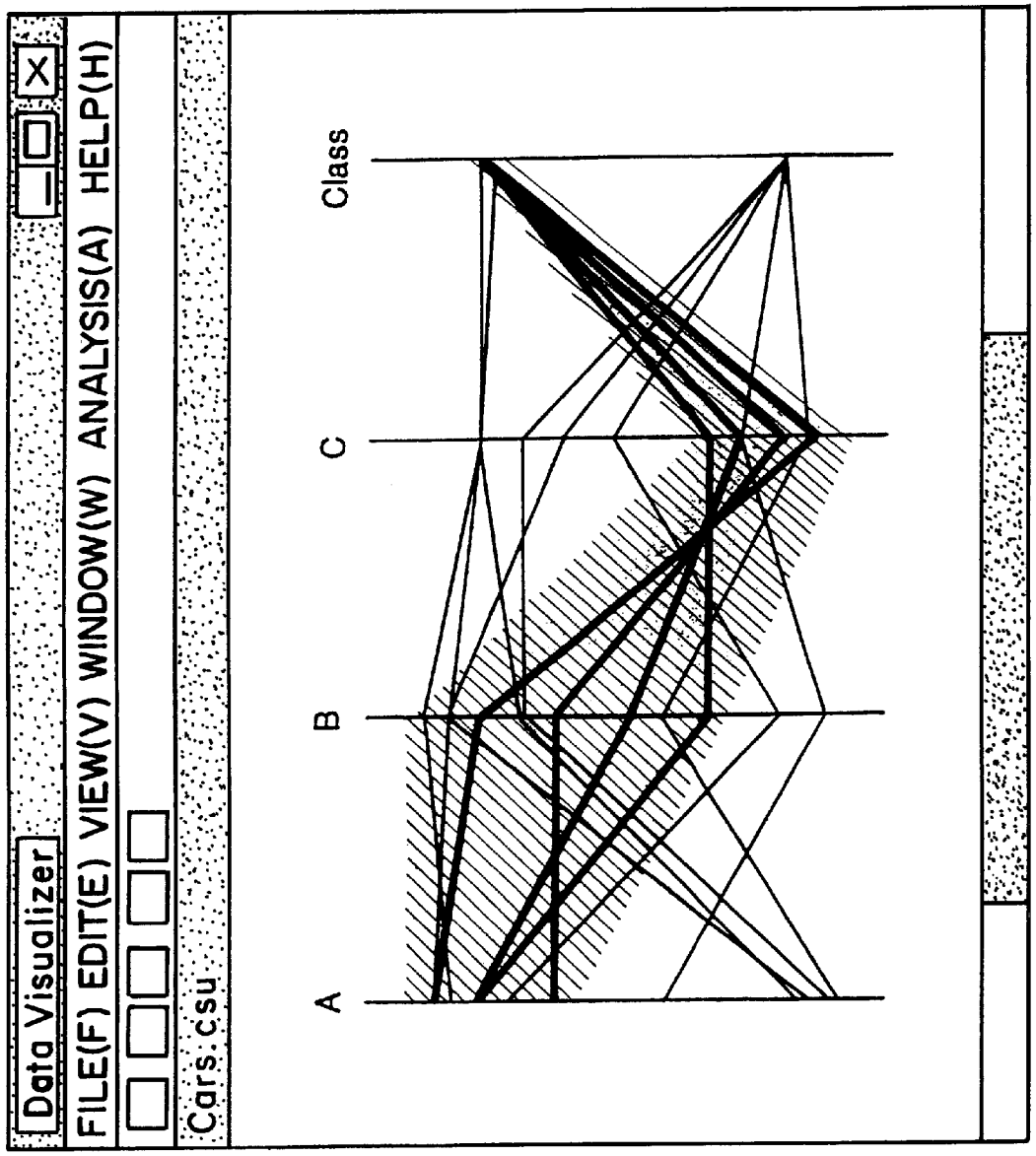
FIG. 49 shows an example displaying the result of a decision tree analysis as a graph.

When the user interface unit 2 receives the range information, it converts the range information to dot data on the screen of the display unit 8. Namely, the user interface unit 2 maps the range provided by the range information on the graph displaying the multi-dimensional data. Then, as shown in FIG. 49, the user interface unit 2 extracts records existing in the mapped range, and displays the extracted records by distinguishing them from other records (thick lines in the drawing).

In this way, in this embodiment, the relation between the decision tree pass or rule obtained by the data mining process and the data of the actual records, can be displayed visually.

As described above, as a result of the decision tree analysis, a plurality of decision tree passes or rules can be obtained. In this embodiment, the distribution of the decision tree can be displayed on the graph based on each of the passes or rules.

Figure 50:
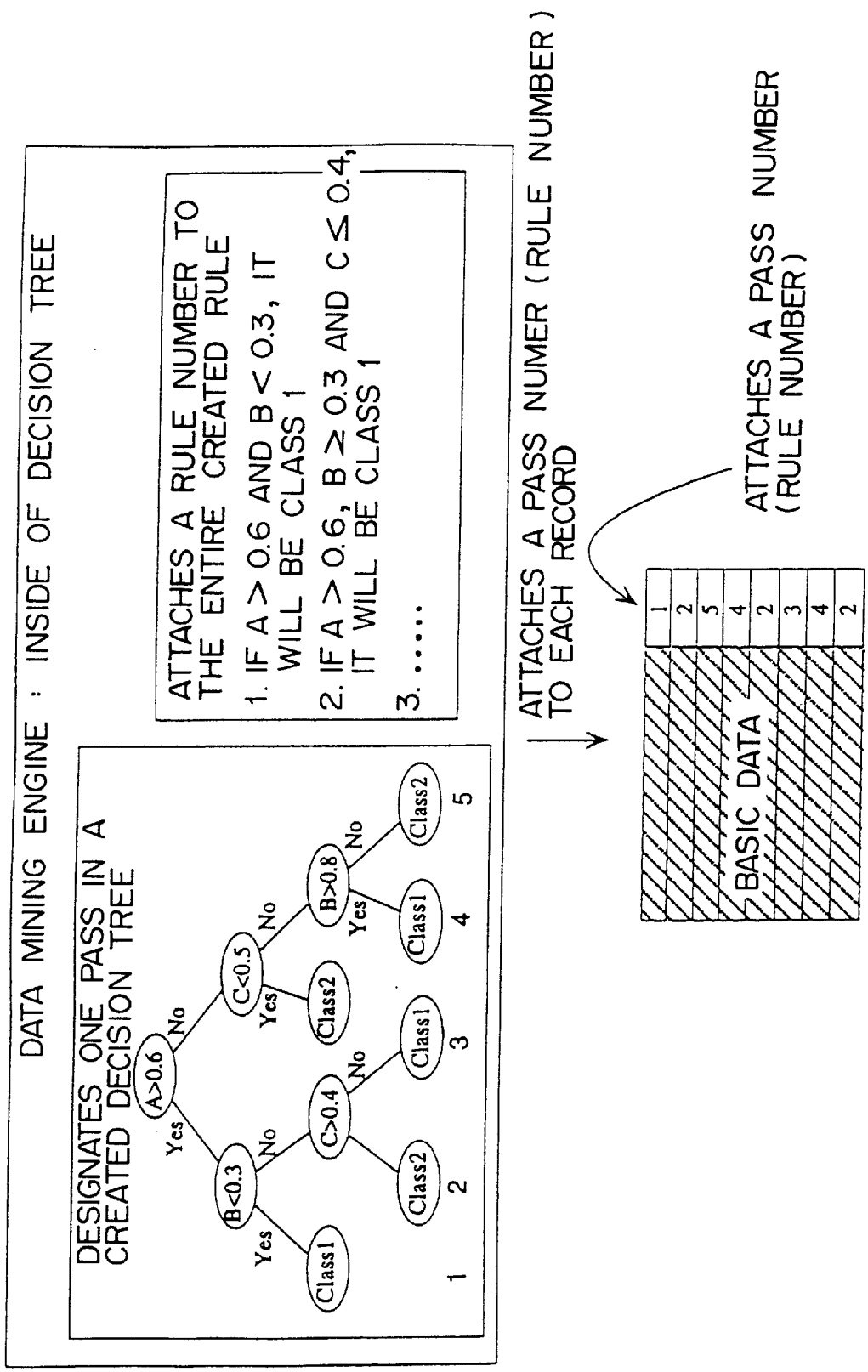
FIG. 50 is a diagram explaining the process of adding a pass number to the result of a decision tree analysis.

When the engine unit 6 outputs a plurality of decision tree passes or rules as a result of the decision tree analysis, as shown in FIG. 50, it attaches an identification number (pass number or rule number) to each decision tree pass or rule. The decision tree pass and rule are basically the same target, displayed in different formats. This process is described below by using a decision tree pass.

When the control unit 5 receives the analysis result with its pass number added, it searches the relevant decision tree for each record. Namely, the control unit 5 takes out data on fields A to C for each record and judges to which decision tree pass the record corresponds. Then, the control unit 5 adds the field corresponding to "pass number" to the multi-dimensional data to be displayed, and writes the pass number defined in the decision tree analysis in the field. The control unit 5 transfers the multi-dimensional data with its pass number added to the visual data mining tool 1.

Figure 51:
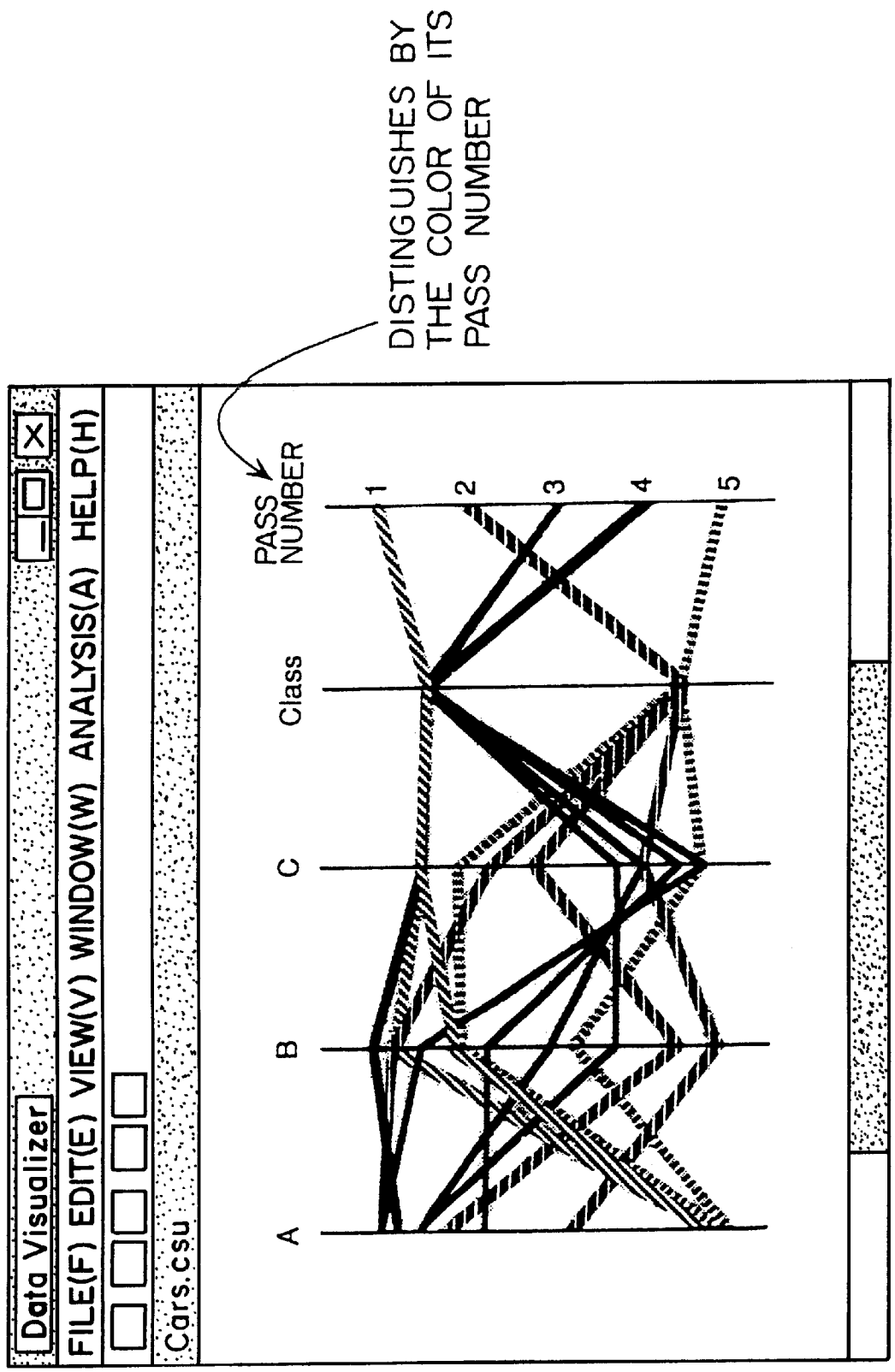
FIG. 51 is a diagram showing the process of displaying the distribution of a decision tree.

When the user interface unit 2 receives the multi-dimensional data with its pass number added, as shown in FIG. 51, it creates a coordinate axis corresponding to the pass number, and displays the multi-dimensional data and the pass number of each record on the coordinate axis. At this moment, each record is drawn in a different color for each pass number. The adjustment of the color is made by the process shown in FIG. 36.

In this embodiment, the distribution of the decision tree obtained as a result of the data mining process can be displayed visually and clearly. For this reason the relation between each record and the decision tree pass (or rule) corresponding to the record can be recognized at a glance.

Although in this embodiment the multi-dimensional data is displayed using a parallel coordinate axis, another form of a graph can also be used. For example, radial axes as shown in FIG. 7 can also be used. In this case, the processes of adding a coordinate axis in order to display the result of the data mining process, and the process of switching over between and displaying data with hierarchical relation, are basically the same as the processes for the graph in a parallel coordinate axis system. However, when adding a coordinate axis to a radial coordinate axes system, for example, when one field is newly added to the multi-dimensional data composed of five fields to display a result of the data mining process, the process of modifying the angle between the axes from 72 degrees to 60 degrees may become necessary.

Figure 52:
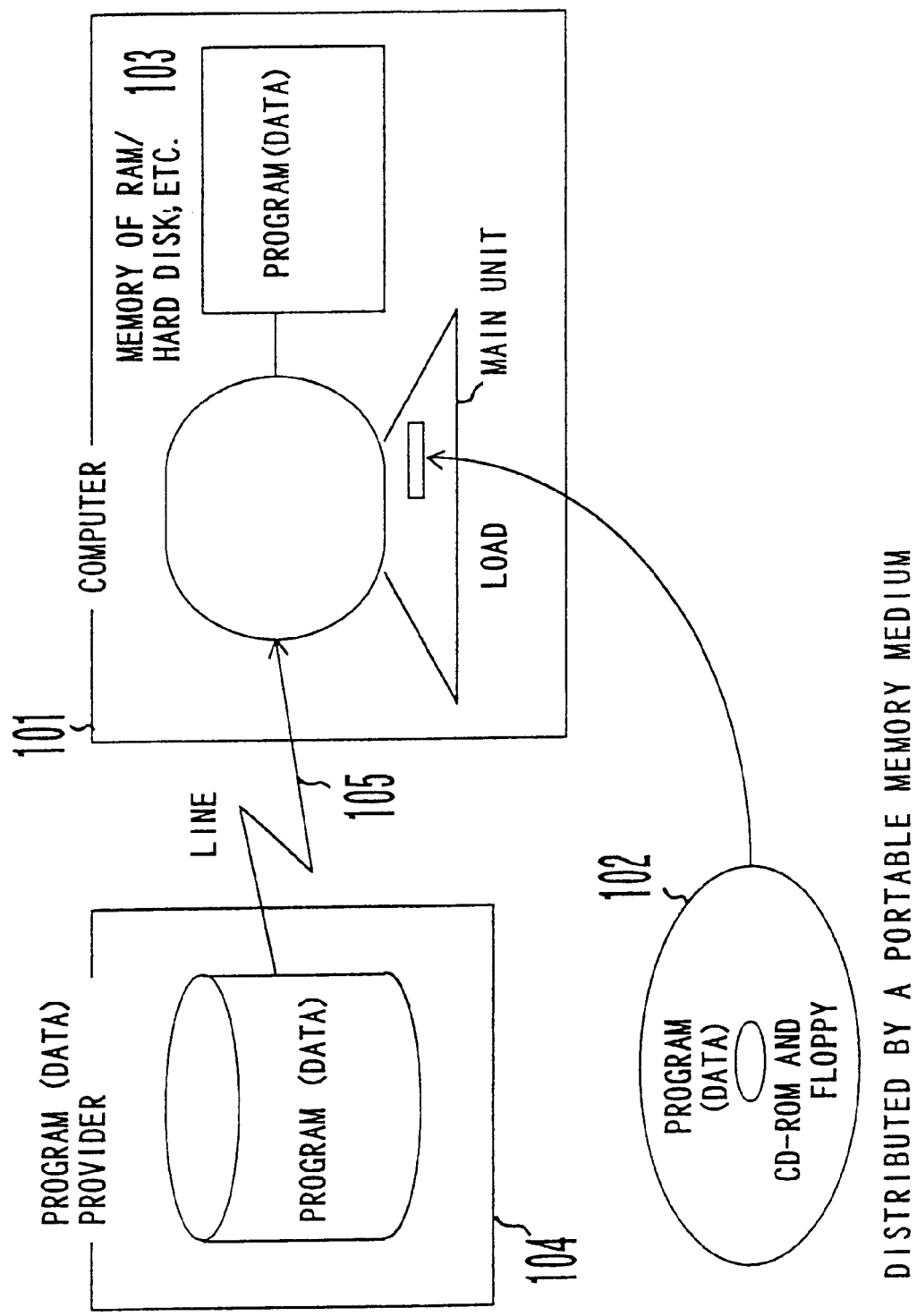
FIG. 52 is a diagram explaining a recording medium with a recorded program for realizing the functions of the preferred embodiment.

FIG. 52 is a diagram explaining a storage medium containing a recorded program to realize every function of this embodiment. Every function of this embodiment is obtained by executing the program described in a predetermined programming language using a computer system 101. This program, for example, is stored on a portable storage medium 102. The portable storage medium 102 includes a CD-ROM, floppy disk, semi-conductor memory, magnetic disk, optical disk, magneto-optical disk, etc. Or it can also be configured that the above program is stored in a memory 103 of the computer system 101 such as a RAM or hard disk, and is executed. Furthermore, it can also be so configured that the above program is stored in another unit (program (data) provider) 104 connected to the computer system 101 through a communication line 105, is down-loaded from the other unit 104 and is executed by the computer system 101.

Figure 53:
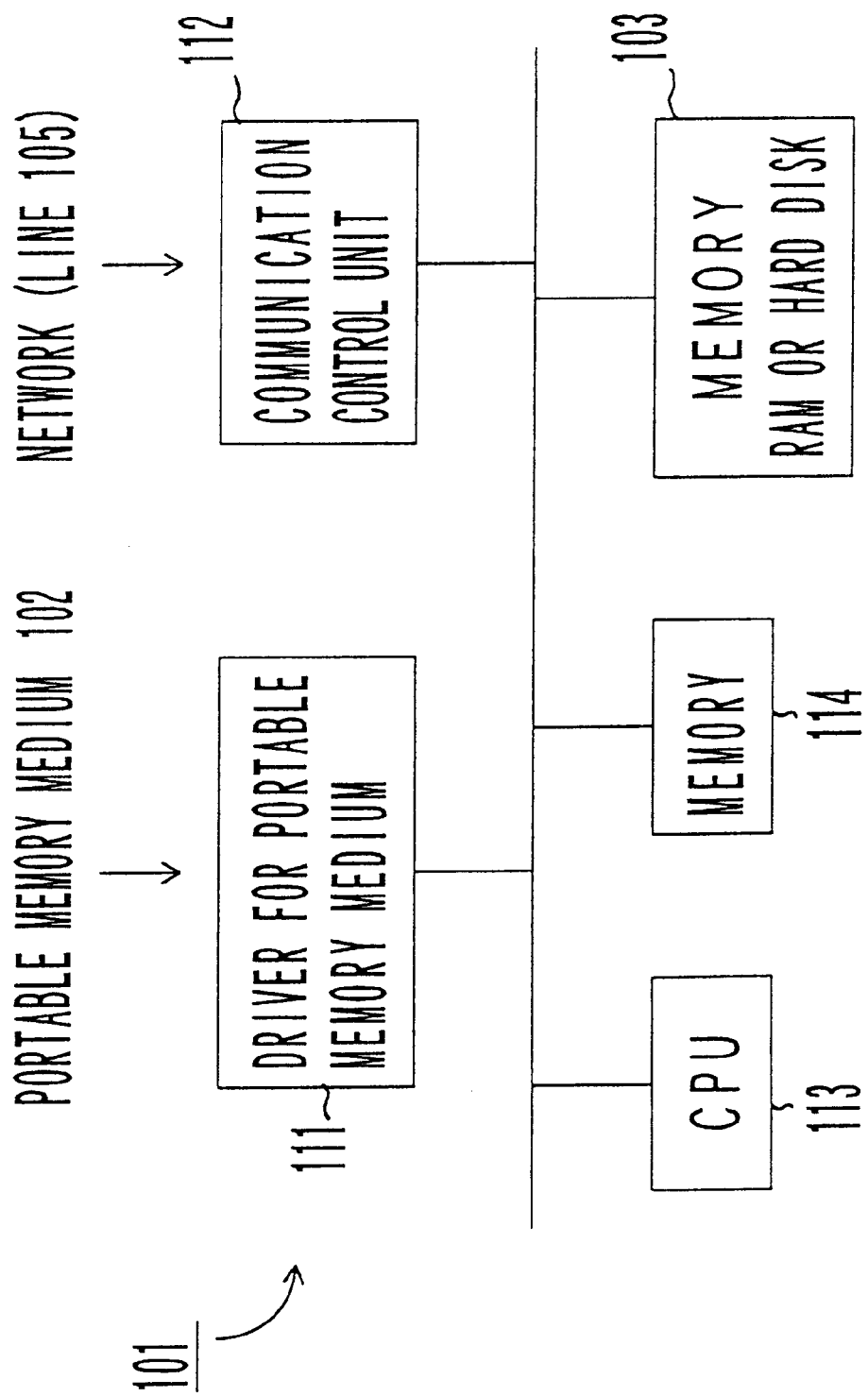
FIG. 53 is a block diagram of a computer for executing a program to realize the functions of the embodiment.

FIG. 53 is a block diagram of a computer system 101 for executing the program to realize every function of this embodiment. A driver for a portable storage medium 111 reads a program and data stored on the portable storage medium 102. A communication control unit 112 controls the sending and receiving of data to and from a network (communication line 105). When the program is received from the unit 104 (program (data) provider) shown in FIG. 52, this communication control unit 112 is started.

A CPU 113 loads a program, etc. from the memory 103, the portable storage medium 102, or the program (data) provider 104, to the memory 114 and executes the program. The program executed by the CPU 113 can be pre-installed in the computer system 101 at the time of manufacture. The CPU 113 can use a program and data stored in a unit 104 (program (data) provider) on the network.

Since an interactive visual data tool and data mining engines can be jointly connected with each other and the desired data mining engine can be started using a graph displayed in a predetermined format, several kinds of data mining engines can be used without a user having any expertise of them.

Furthermore, since the results of various kinds of data mining processes are displayed by the same display method, the results of several kinds of data mining processes can be easily understood without a user having any expertise of them.

In this way, using interactive procedures, the graphic display of data, the start of a data mining engine and the result display of a data mining process can be uniformly handled. Thus, the work load for obtaining the expected analysis result can be reduced.

What is claimed is:

1. A data display apparatus for displaying multi-dimensional data on a graph in a predetermined graphical format having a coordinate axis system, comprising:

starting means for receiving an instruction to start a data mining engine for automatically executing a data mining process related to the multi-dimensional data and starting the data mining engine according to the instruction; and display controlling means for receiving a result obtained by the data mining engine and displaying the result on the display apparatus on the same graph displaying the multi-dimensional data, wherein the graphical format used to display the multi-dimensional data is the same as the graphical format used to display the data mining result.

2. The data display apparatus according to claim 1, wherein
said display controlling means changes the graph displayed on the display apparatus according to the result obtained by the data mining engine.

3. The data display apparatus according to claim 1, wherein
said display controlling means displays the result obtained by the data mining engine as part of the graph on the display apparatus.

4. The data display apparatus according to claim 1, further comprising:
recognizing means for recognizing a designated data range using the graph displayed on the display apparatus; and
output format converting means for converting the data contained in the data range recognized by said recognizing means to a designated format and outputting the converted data.

5. The data display apparatus according to claim 4, wherein
said output format converting means converts data to be output to data in a document format.

6. The data display apparatus according to claim 4, wherein
said output format converting means converts data to be output to data in a CSV format.

7. The data display apparatus according to claim 1, further comprising
recognizing means for recognizing a designated data range using the graph displayed on the display apparatus,
wherein said starting means starts the data mining engine according to the data range recognized by said recognizing means.

8. The data display apparatus according to claim 1, further comprising
progress displaying means for detecting a process progress of the data mining engine started by said starting means and displaying the progress on the display apparatus.

9. The data display apparatus according to claim 1, further comprising:
storing means for storing information on the displaying state displayed on the display apparatus and information on a designated data range; and
reproducing means for reading the information stored in said storing means, and reproducing the displaying state and data range on the display apparatus.

10. A data display apparatus for displaying multi-dimensional data on a graph in a predetermined graphical format having a coordinate axis system, comprising:
starting means for receiving an instruction to select a plurality of data mining engines for automatically executing a data mining process by different analyzing methods, and starting one of the plurality of the data mining engines according to the instruction; and
display controlling means for receiving a result obtained by the started data mining engine, and displaying the result on the display apparatus on the same graph displaying the multi-dimensional data, according to the instruction, wherein the graphical format used to display the multi-dimensional data is the same as the graphical format used to display the data mining result.

11. A data display apparatus for displaying multi-dimensional data on a graph in a predetermined graphical format having a coordinate axis system, comprising:
input converting means for receiving an analysis result from automatically executing a data mining process on the multi-dimensional data and incorporating the analysis result into the multi-dimensional data to be displayed; and
display controlling means for displaying the analysis result on the display apparatus on the same graph displaying the multi-dimensional data, based on the output of said input converting means, wherein the graphical format used to display the multi-dimensional data is the same as the graphical format used to display the data mining result.

12. A data mining visualizing device with a front-end function of the data mining engine automatically executing a data mining process said data mining visualizing device being operated jointly with a unit for displaying multi-dimensional data on a display unit in a predetermined graphical format having a coordinate axis system, comprising:
starting means for starting the data mining engine according to an instruction to start; and
display controlling means for receiving a result of the data mining engine and displaying the result on the display unit in the same graphical format, wherein the graphical format used to display the multi-dimensional data is the same as the graphical format used to display the data mining result.

13. A data mining visualizing device with a front-end function of the data mining engine automatically executing a data mining process, said data mining visualizing device being operated jointly with a unit for displaying multi-dimensional data on a display unit in a predetermined format of a graph having a coordinate axis system, comprising:
input converting means for receiving a data mining result on the multi-dimensional data and incorporating the result into the multi-dimensional data to be displayed; and
display controlling means for displaying the result on the display unit in the predetermined graphical format having a coordinate axis system, based on the output of said input converting means, wherein the graphical format used to display the multi-dimensional data is the same as the graphical format used to display the data result.

14. A data display method for display multi-dimensional data on a graph in a predetermined graphical format having a coordinate axis system, comprising:
receiving an instruction to start a data mining engine for automatically executing a data mining process related to the multi-dimensional data and starting the data mining engine according to the instruction; and
receiving a result of the data mining engine and displaying the result on a display unit on the same graph displaying the multi-dimensional data, wherein the graphical format used to display the multi-dimensional data is the same as the graphical format used to display the data mining result.

15. A data display method for displaying multi-dimensional data on a graph in a predetermined graphical format having a coordinate axis system, comprising:

receiving a result from automatically executing a data mining process on the multi-dimensional data and incorporating the result into the multi-dimensional data to be displayed; and displaying the multi-dimensional data into which the result is incorporated on a display unit in the predetermined graphical format having a coordinate axis system, wherein the graphical format used to display the multi-dimensional data is the same as the graphical format used to display the data mining result.

16. A computer-readable storage medium, which is used with a data display apparatus for displaying multi-dimensional data on a graph in a predetermined graphical format having a coordinate axis system, for storing a program, whereby a computer provides the following operations by executing the program:

receiving an instruction to start a data mining engine for automatically executing a data mining process related to the multi-dimensional data and starting the data mining engine according to the instruction; and receiving a result obtained by the data mining engine and displaying the result on the display apparatus on the same graph displaying the multi-dimensional data, wherein the graphical format used to display the multi-dimensional data is the same as the graphical format used to display the data mining result.

17. A computer-readable storage medium, which is used with a data display apparatus for displaying multi-dimensional data in a predetermined graphical format having a coordinate axis system, for storing a program, whereby a computer provides the following operations by executing the program:

receiving a result from automatically executing a data mining process on the multi-dimensional data and incorporating the result into the multi-dimensional data to be displayed; and displaying the multi-dimensional data into which the result is incorporated, in the predetermined graphical format having a coordinate axis system, wherein the graphical format used to display the multi-dimensional data is the same as the graphical format used to display the data mining result.

18. A data display apparatus for displaying multi-dimensional data, comprising:

a unit receiving an instruction to automatically execute one of a plurality of data mining engines; and a display controlling unit receiving a result of the executed data mining engine and displaying the result in a predetermined graphical format having a coordinate axis system, wherein the graphical format used to display the multi-dimensional data is the same as the graphical format used to display the data mining result.

19. A method for displaying multi-dimensional data, comprising:

automatically executing one of a plurality of data mining engines;

incorporating a result of the executed data mining engine into the multi-dimensional data; and displaying the multi-dimensional data incorporating the data mining engine result in a predetermined graphical format having a coordinate axis system, wherein the graphical format used to display the multi-dimensional data is the same as the graphical format used to display the data mining result.

20. A method for displaying multi-dimensional data, comprising:

deriving, automatically, a trend from a set of data;

incorporating a result of said deriving a trend into the multi-dimensional data; and displaying the multi-dimensional data incorporating the result in a predetermined graphical format having a coordinate axis system, wherein the graphical format used to display the multi-dimensional data is the same as the graphical format used to display the result of said deriving a trend.

* * * * *